(12) United States Patent
Skeen et al.

(10) Patent No.: US 10,628,760 B2
(45) Date of Patent: *Apr. 21, 2020

(54) AUTOMATED, CONDITIONAL EVENT TICKETING, RESERVATION, AND PROMOTION TECHNIQUES IMPLEMENTED OVER COMPUTER NETWORKS

(71) Applicant: Opus Deli, Berkeley, CA (US)

(72) Inventors: Wayne Donald Maddock Skeen, Berkeley, CA (US); Howard Gregg Cockrill, Portland, OR (US); Toby Gabriner, San Francisco, CA (US); Mark Edward Koerner, San Rafael, CA (US)

(73) Assignee: Opus Deli, Inc., Berkeley, CA (US)

( * ) Notice: Subject to any disclaimer, the term of this patent is extended or adjusted under 35 U.S.C. 154(b) by 270 days.

This patent is subject to a terminal disclaimer.

(21) Appl. No.: 15/644,810

(22) Filed: Jul. 9, 2017

(65) Prior Publication Data

US 2019/0012612 A1    Jan. 10, 2019

(51) Int. Cl.
| | | |
|---|---|---|
| *G06F 16/00* | (2019.01) | |
| *G06Q 10/02* | (2012.01) | |
| *G06Q 30/06* | (2012.01) | |
| *G06Q 20/10* | (2012.01) | |
| *G06Q 20/04* | (2012.01) | |
| *G06Q 20/32* | (2012.01) | |

(52) U.S. Cl.
CPC .......... *G06Q 10/02* (2013.01); *G06Q 20/045* (2013.01); *G06Q 20/102* (2013.01); *G06Q 20/322* (2013.01); *G06Q 30/0643* (2013.01)

(58) Field of Classification Search
CPC ............ G06Q 10/02; G06Q 10/06311; G06Q 20/045; G06Q 20/0453; G06Q 20/0457; G06Q 20/201; G06Q 20/401; G06Q 30/0222; G06Q 30/0258; G06Q 30/0263; G06Q 30/0264; G06Q 30/0259; G06Q 30/0261; G06Q 30/0601; H04L 67/42; H04L 67/02; Y10S 707/944; Y10S 707/99943; G06F 16/335; G06F 16/262; G06F 16/686
See application file for complete search history.

(56) References Cited

U.S. PATENT DOCUMENTS

| | | | |
|---|---|---|---|
| 6,925,458 B2 | 8/2005 | Scaturro et al. | |
| 7,406,433 B2 * | 7/2008 | Mashimo | ............... G06Q 30/02 705/5 |

(Continued)

OTHER PUBLICATIONS

PCT International Search Report and Written Opinion, PCT Application No. PCT/US2013/064735, International Filing Date Oct. 12, 2013, Search report dated Aug. 4, 2014.

(Continued)

*Primary Examiner* — Cheryl Lewis
(74) *Attorney, Agent, or Firm* — Wolf IP Law, PLCC; Dean E. Wolf, Esq.

(57) ABSTRACT

Various techniques are described herein for providing ticketing reservation and purchasing functionality for enabling and/or facilitating users in performing activities/operations relating to group ticket reservations and/or automated conditional ticket purchases for various types of events which are scheduled to occur at one or more different venues.

19 Claims, 54 Drawing Sheets

(56) References Cited

U.S. PATENT DOCUMENTS

| | | | |
|---|---|---|---|
| 7,693,978 B2 | 4/2010 | Eliason et al. | |
| 7,720,871 B2 | 5/2010 | Rogers et al. | |
| 8,392,206 B2 | 3/2013 | Parekh et al. | |
| 8,463,629 B2* | 6/2013 | Neulight | G06Q 10/02 705/5 |
| 8,487,173 B2 | 7/2013 | Emmerson | |
| 8,655,692 B2 | 2/2014 | Junkin | |
| 8,700,659 B2 | 4/2014 | Skeen et al. | |
| 8,732,007 B2 | 5/2014 | Gibson | |
| 8,732,193 B2 | 5/2014 | Skeen et al. | |
| 8,732,195 B2 | 5/2014 | Skeen et al. | |
| 8,856,170 B2 | 10/2014 | Skeen et al. | |
| 8,935,279 B2* | 1/2015 | Skeen | H04L 65/4084 707/769 |
| 9,218,413 B2 | 12/2015 | Skeen et al. | |
| 9,349,108 B2 | 5/2016 | Skeen et al. | |
| 10,296,852 B2* | 5/2019 | Paleja | G06Q 10/02 |
| 2003/0076963 A1 | 4/2003 | Wells | |
| 2004/0093325 A1 | 5/2004 | Banerjee et al. | |
| 2007/0022055 A1 | 1/2007 | Eliason et al. | |
| 2007/0156664 A1 | 7/2007 | Norton et al. | |
| 2007/0233743 A1 | 10/2007 | Rosenberg | |
| 2008/0104627 A1 | 5/2008 | Avedissian | |
| 2008/0133593 A1 | 6/2008 | Clark | |
| 2009/0144244 A1 | 6/2009 | Maghoul et al. | |
| 2012/0047077 A1 | 2/2012 | Humphrey | |
| 2012/0239526 A1 | 9/2012 | Revare | |
| 2012/0330697 A1 | 12/2012 | Smith et al. | |
| 2014/0032325 A1 | 1/2014 | Weiss et al. | |
| 2014/0046775 A1 | 2/2014 | Harb | |
| 2014/0095333 A1 | 4/2014 | Zises | |

OTHER PUBLICATIONS

PCT International Search Report, PCT Application No. PCT/US2012/042306, International Filing Date Jun. 13, 2012, Search report dated Dec. 18, 2012.

PCT Written Opinion, Application No. PCT/US2012/042306, Int'l Filing date Jun. 13, 2012, Written Opinion dated Dec. 10, 2012.

Melissa Silvers: "Startups Missed Connections", http://web.archive.org/web/20120911153847/http://www.fastcompany.com/3001100/startups-missed-connections, Sep. 11, 2012, pp. 1-5, Retrieved on Jul. 21, 2014, printed on Oct. 20, 2014.

Apple Computers (apple store), "iTunes Radio", www.apple.com/itunes/itunes-radio, pp. 1-8, printed Aug. 12, 2013.

Yves Raimond, Christopher Sutton, and Mark Sandler, "The Many Faces of Semantics: Interlinking Music-Related Data on the Web", IEEE, 2009, pp. 1-12.

Roger Zimmermann, Elaine Chew, Sakire Arsian, and Moses Pawar (University of Southern California), "Distributed Musical Performances: Architecture and Stream Management", ACM Transactions on Multimedia Computing, Communications and Application, vol. 4, No. 2, May 2008, pp. 1-23.

Alain B. Renaud, Alexander Vorot, and Pedro Rebelo, "Networked Music Performance: State of the Art", AES 30$^{th}$ International Conference, Saariselka, Finland, Mar. 15-17, 2007, pp. 1-7.

www.8Tracks.com, website printout, printed Jun. 20, 2012.
www.artistgrowth.com, website printout, Jun. 20, 2012.
www.bandcamp.com, website printout, Jun. 20, 2012.
www.bandsintown.com, website printout, Jun. 20, 2012.
www.earbits.com., website printout, Jun. 20, 2012.
www.grooveshark.com website printout, Jun. 20, 2012.
www.iheart.com, website printout, Jun. 20, 2012.
www.jango.com, website printout, Jun. 20, 2012.
www.last.fm, website printout Jun. 20, 2012.
https://apps.facebook.com/concertcalendar/#_=_, website printout Jun. 20, 2012.
https://mog.com, website printout Jun. 20, 2012.
www.myspace.com, website printout Jun. 20, 2012.
www.pandora.com, website printout Jun. 20, 2012.
www.rdio.com, website printout Jun. 20, 2012.
www.reverbnation.com, website printout Jun. 20, 2012.
www.slacker.com, website printout Jun. 20, 2012.
www.getsongbird.com, website printout Jun. 20, 2012.
www.songza.com, website printout Jun. 20, 2012.
www.soundcloud.com, website printout Jun. 20, 2012.
www.spotify.com/us/desktop-splash?utm_source=spotify&utm_medium=web&utm_campaign=start, website printout Jun. 20, 2012.
www.turntable.fm, website printout Jun. 20, 2012.
www.axs.com, Screenshot captured and printed Feb. 2, 2016.
TicketMaster Official Site, "Tickets for Music Concerts, Rock, Latin, Jaz, Festivals, more,", Sep. 7, 2015, pp. 1 and 2.
Winard Britt, "Making Digital Tickets Possible Via the Microsoft Smartphone", Department of Computer Science and Software Engineering Auburn University, 43$^{rd}$ ACM Southeast Conference, Mar. 18-20, 2005, pp. 2-334-2-336.

* cited by examiner

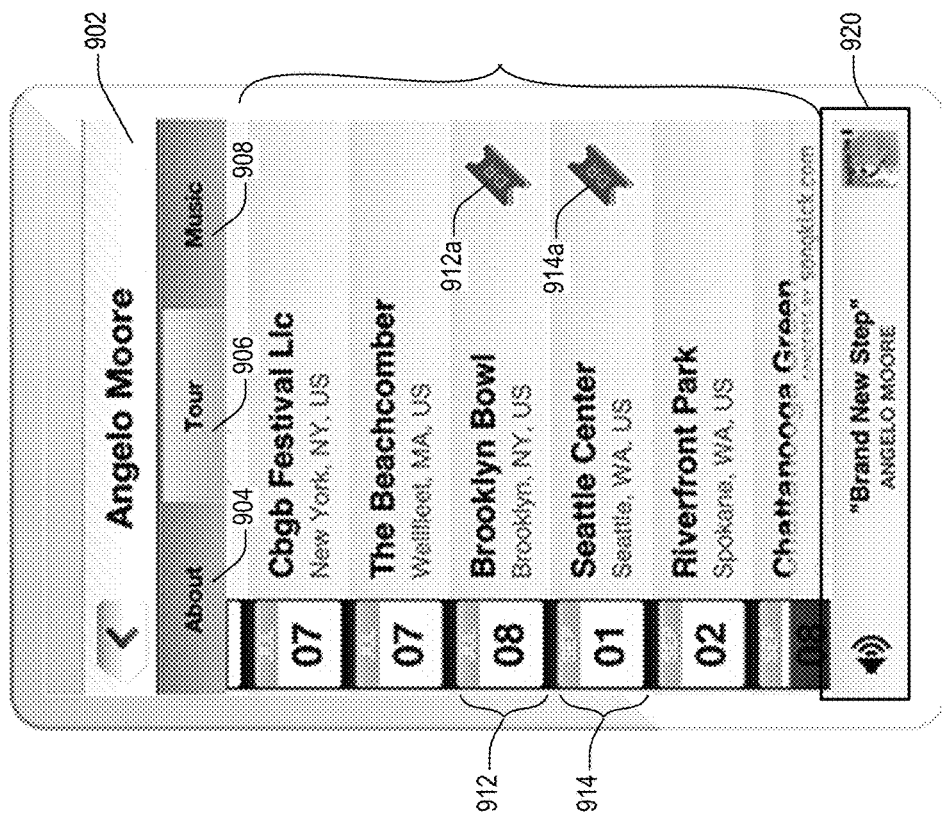
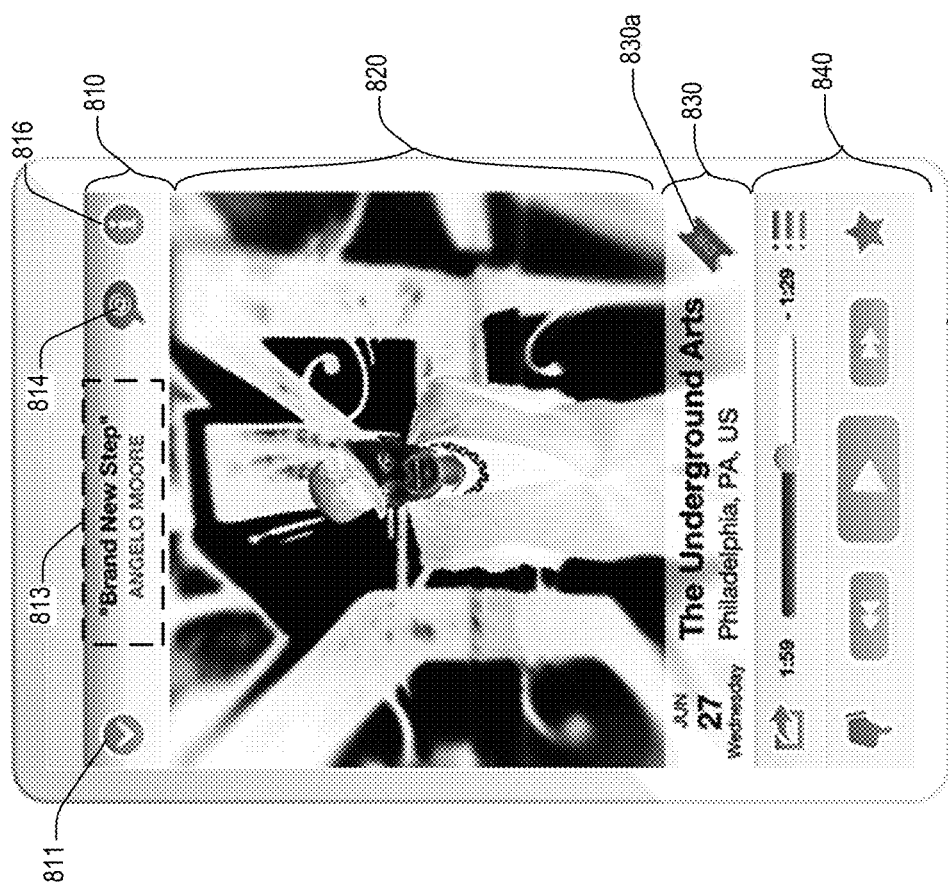
Fig. 9
Fig. 8

How many of these 8 tickets
are for yourself?

2 | 3 | 4

● Buy these 2 even if no one else buys a ticket. ←—2112

○ Buy these 2 when someone else joins. ←—2114

NEXT

White Reaper
Sat July 21 8PM at The Fillmore
$24 of Tickets   Invite Friends   Reserve (24 hrs)

We need to confirm that you're a real person.

[f] Sign Up with Facebook

Already a MAGNIFI member? Log in Here.

Or Sign Up with Email

First Name

Last Name

Email

Create Username

Create Password

By clicking on Sign Up, you agree to MAGNIFI's terms & conditions and privacy policy.

NEXT

You are reserving 8 tickets for 24 hours

2 Reserved for you
6 Reserved for your friends

You have elected to buy these 2 when someone else joins.

Edit

White Reaper
Sat July 21 8PM at The Fillmore
$24 of Tickets    Invite Friends    Reserve

Add friends to continue

*Enter emails separated by a comma.*

Add

― 2512

Import Other Contacts
Facebook    Gmail    MAGNIFI

Invite List

Slow Miso
slow.miso@hotmail.com

Slow Miso
slow.miso@hotmail.com

― 2514

― 2510

Back    Next

You are reserving
8 tickets for 24 hours

2 Reserved for you
6 Reserved for your friends

You have elected to buy these 2 when someone else joins.

Edit

Shareable Link
You can also invite friends using a link available when you've completed your reservation.

http://magnifi.fm/He23o..

Copy

First, how many tickets do you want to reserve for you & your friends? — 2910

| 2 | 3 | 4 | 5 | 6 | 7 | 8 |

How many of these 8 tickets are for yourself? — 2920

| 2 | 3 | 4 |

● Buy these 2 even if no one else buys a ticket.
○ Buy these 2 when someone else joins.

2 tickets @ $24     $48.00
Service Fee     $7.90
Total     $55.90

NEXT

White Reaper

Sat July 21 8PM at The Fillmore $24 of Tickets     Invite Friends     Reserve (24 hrs)

First, how many tickets do you want to reserve for you & your friends? — 3401

| 2 | 3 | 4 | 5 | 6 | 7 | 8 |

NEXT

⬇

● Buy my ticket even if my friend doesn't buy theirs. — 3450
○ Buy my ticket when my friend joins.

NEXT

Alerts and Notifications

| Trigger ~ 4110 | Content of Alert ~ 4120 |
|---|---|
| Host Sends Initial Invite | • Wayne Skeen has invited you to join his reservation (all of these can be via email or sms) |
| | • Prem commented on this reservation |
| | • Mark is "in" for Cool Ghouls |
| | • Shwetank invited 2 others to Wayne's reservation |
| | • Toby accepted, reservation full! Create another? (sent to non-respondents, and maybe's; contingent on there being remaining inventory) |

MAGNIFI Group Ticketing

Acme Music Hall
View Profile

Profile
Reservations Overview
Fan Emails + Followers
Account Admins
Notifications & Reporting Preferences Account Overview — Reservations Admin — 4220

Tickets Currently Allocated: 2230

Reservations Confirmed (paid):

| | # res. | # tix | $ total |
|---|---|---|---|
| last 7 days: | 41 | 164 | $3,299 |
| last 30 days: dyas | 113 | 631 | $11,358 |

Outstanding Reservations
Active Reservations: 227
Tickets Reserved: 991
Tickets Available: 1,239

Unique Email Address Gathered
last 7 days: 331
last 30 days: 1,422

MAGNIFI Group Ticketing

Acme Music Hall
View Profile

Account Overview  Reservations Admin — 4220

Account Administrators

| username | permissions | mobile | email |
|---|---|---|---|
| Bonny_Summers | owner | 212-555-5661 | bonny@darlingentertainment.com |
| Fritz_Summers | edit & manage sharing | 556-555-1357 | (add) |
| Eileen_Bonifacio | edit | 614-555-2927 | eileen@acmemusichall.com |
| [add] | | | |

Profile
Reservations Overview
Fan Emails + Followers
Account Admins — 4208
Notifications & Reporting Preferences

MAGNIFI Group Ticketing             Acme Music Hall
Account Overview    Reservations Admin        View Profile <<    SEP-15    OCT-15    NOV-15    DEC-15    JAN-16    FEB-16    MAR-16    >>

| Date | Artist | MAGNIFI Allocation | Tix Sold | Tix Pend. | Tix Avail. | | |
|---|---|---|---|---|---|---|---|
| SEP 1 | Cool Ghouls | 200 | 77 | 28 | 95 | pause | recall |
| <see details> | | | | | | | |
| SEP 2 | Thee Oh Sees | 200 | 134 | 62 | 4 | res. | recall |
| <see details> | | | | | | | |
| SEP 3 | Thee Oh Sees | 200 | 134 | 62 | 4 | pause | recall |
| <see details> | | | | | | | |
| SEP 4 | Thee Oh Sees | 200 | 134 | 62 | 4 | stop | recall |
| <see details> | | | | | | | |
| SEP 5 | Thee Oh Sees | 200 | 134 | 62 | 4 | stop | recall |
| <see details> | | | | | | | |
| SEP 6 | Thee Oh Sees | 200 | 134 | 62 | 4 | stop | recall |

AUTOMATED, CONDITIONAL EVENT TICKETING, RESERVATION, AND PROMOTION TECHNIQUES IMPLEMENTED OVER COMPUTER NETWORKS

RELATED APPLICATION DATA

This application is a continuation application, pursuant to the provisions of 35 U.S.C. § 120, of prior U.S. patent application Ser. No. 15/162,523 titled "AUTOMATED, CONDITIONAL EVENT TICKETING, RESERVATION, AND PROMOTION TECHNIQUES IMPLEMENTED OVER COMPUTER NETWORKS" naming SKEEN, et. al. as inventors, and filed 23 May 2016, the entirety of which is incorporated herein by reference for all purposes.

U.S. patent application Ser. No. 15/162,523 is a continuation-in-part application, pursuant to the provisions of 35 U.S.C. § 120, of prior U.S. patent application Ser. No. 14/977,575, Pat. Pub. US2016/0110659) titled "AUTOMATED, CONDITIONAL EVENT TICKETING AND RESERVATION TECHNIQUES IMPLEMENTED OVER COMPUTER NETWORKS" naming SKEEN, et. al. as inventors, and filed 21 Dec. 2015, the entirety of which is incorporated herein by reference for all purposes.

U.S. patent application Ser. No. 14/977,575 is a continuation-in-part application, pursuant to the provisions of 35 U.S.C. § 120, of prior U.S. patent application Ser. No. 14/593,422 (Pat. Pub. US2015/0120767) titled "VENUE-RELATED MULTI-MEDIA MANAGEMENT, STREAMING, ONLINE TICKETING, AND ELECTRONIC COMMERCE TECHNIQUES IMPLEMENTED VIA COMPUTER NETWORKS AND MOBILE DEVICES" naming SKEEN, et. al. as inventors, and filed Jan. 9, 2015, the entirety of which is incorporated herein by reference for all purposes.

U.S. patent application Ser. No. 14/593,422 is a continuation application, pursuant to the provisions of 35 U.S.C. § 120, of prior U.S. patent application Ser. No. 14/281,459 titled "VENUE-RELATED MULTI-MEDIA MANAGEMENT, STREAMING, ONLINE TICKETING, AND ELECTRONIC COMMERCE TECHNIQUES IMPLEMENTED VIA COMPUTER NETWORKS AND MOBILE DEVICES" naming SKEEN, et. al. as inventors, and filed 19 May 2014, the entirety of which is incorporated herein by reference for all purposes. U.S. patent application Ser. No. 14/281,459 is a continuation-in-part application, pursuant to the provisions of 35 U.S.C. § 120, of prior U.S. patent application Ser. No. 13/517,505 (Published as U.S. Pat. No. 8,732,193) titled "MULTI-MEDIA MANAGEMENT AND STREAMING TECHNIQUES IMPLEMENTED OVER A COMPUTER NETWORK" naming SKEEN, et. al. as inventors, and filed 13 Jun. 2012, the entirety of which is incorporated herein by reference for all purposes. U.S. patent application Ser. No. 13/517,505 claims benefit, pursuant to the provisions of 35 U.S.C. § 119, of U.S. Provisional Patent Application Ser. No. 61/639,870, titled "MULTI-MEDIA MANAGEMENT AND STREAMING TECHNIQUES IMPLEMENTED OVER A COMPUTER NETWORK", naming SKEEN, et. al. as inventors, and filed 28 Apr. 2012, the entirety of which is incorporated herein by reference for all purposes. U.S. patent application Ser. No. 13/517,505 also claims benefit, pursuant to the provisions of 35 U.S.C. § 119, of U.S. Provisional Patent Application Ser. No. 61/496,452, titled "MULTI-MEDIA MANAGEMENT AND STREAMING TECHNIQUES IMPLEMENTED OVER A COMPUTER NETWORK", naming SKEEN, et. al. as inventors, and filed Jun. 13, 2011, the entirety of which is incorporated herein by reference for all purposes.

U.S. patent application Ser. No. 14/281,459 is a continuation-in-part application, pursuant to the provisions of 35 U.S.C. § 120, of prior U.S. patent application Ser. No. 13/844,672 (Published as U.S. Pat. No. 8,732,195) titled "MULTI-MEDIA MANAGEMENT, STREAMING, AND ELECTRONIC COMMERCE TECHNIQUES IMPLEMENTED OVER A COMPUTER NETWORK" naming SKEEN, et. al. as inventors, and filed 15 Mar. 2013, the entirety of which is incorporated herein by reference for all purposes. U.S. patent application Ser. No. 13/844,672 claims benefit, pursuant to the provisions of 35 U.S.C. § 119, of U.S. Provisional Application Ser. No. 61/713,582, titled "MULTI-MEDIA MANAGEMENT, STREAMING, AND ELECTRONIC COMMERCE TECHNIQUES IMPLEMENTED OVER A COMPUTER NETWORK", naming Skeen et al. as inventors, and filed 14 Oct. 2012, the entirety of which is incorporated herein by reference for all purposes. U.S. patent application Ser. No. 13/844,672 is a continuation-in-part application, pursuant to the provisions of 35 U.S.C. § 120, of prior U.S. patent application Ser. No. 13/517,505, titled "MULTI-MEDIA MANAGEMENT AND STREAMING TECHNIQUES IMPLEMENTED OVER A COMPUTER NETWORK", naming SKEEN, et. al. as inventors, and filed 13 Jun. 2012, the entirety of which is incorporated herein by reference for all purposes.

U.S. patent application Ser. No. 14/281,459 is a continuation-in-part application, pursuant to the provisions of 35 U.S.C. § 120, of prior U.S. patent application Ser. No. 13/844,656 titled "BANDSCANNER, MULTI-MEDIA MANAGEMENT, STREAMING, AND ELECTRONIC COMMERCE TECHNIQUES IMPLEMENTED OVER A COMPUTER NETWORK" naming SKEEN, et. al. as inventors, and filed 15 Mar. 2013, the entirety of which is incorporated herein by reference for all purposes. U.S. patent application Ser. No. 13/844,656 claims benefit, pursuant to the provisions of 35 U.S.C. § 119, of U.S. Provisional Application Ser. No. 61/713,580, titled "BANDSCANNER, MULTI-MEDIA MANAGEMENT, STREAMING, AND ELECTRONIC COMMERCE TECHNIQUES IMPLEMENTED OVER A COMPUTER NETWORK", naming Skeen et al. as inventors, and filed 14 Oct. 2012, the entirety of which is incorporated herein by reference for all purposes. U.S. patent application Ser. No. 13/844,656 is a continuation-in-part application, pursuant to the provisions of 35 U.S.C. § 120, of prior U.S. patent application Ser. No. 13/517,505, titled "MULTI-MEDIA MANAGEMENT AND STREAMING TECHNIQUES IMPLEMENTED OVER A COMPUTER NETWORK", naming SKEEN, et. al. as inventors, and filed 13 Jun. 2012, the entirety of which is incorporated herein by reference for all purposes.

U.S. patent application Ser. No. 14/281,459 is a continuation-in-part application of International Patent Application No. PCT/US13/64735, titled "MULTI-MEDIA MANAGEMENT, STREAMING, AND ELECTRONIC COMMERCE TECHNIQUES IMPLEMENTED VIA COMPUTER NETWORKS AND MOBILE DEVICES", naming SKEEN, et al. as inventors, filed on 12 Oct. 2013, designating the United States, the entirety of which is incorporated herein by reference for all purposes. International Patent Application No. PCT/US13/64735 a continuation-in-part application of prior U.S. patent application Ser. No. 13/873,204 titled "VENUE-RELATED MULTI-MEDIA MANAGEMENT, STREAMING, AND ELECTRONIC COMMERCE TECHNIQUES IMPLEMENTED VIA COMPUTER NET- WORKS AND MOBILE DEVICES" by Skeen et al., filed on 29 Apr. 2013, the entirety of which is incorporated herein by reference for all purposes. International Patent Application No. PCT/US13/64735 is a continuation-in-part application of prior U.S. patent application Ser. No. 13/844,656 titled "BAND SCANNER, MULTI-MEDIA MANAGEMENT, STREAMING, AND ELECTRONIC COMMERCE TECHNIQUES IMPLEMENTED OVER A COMPUTER NETWORK" by Skeen et al., filed on 15 Mar. 2013, the entirety of which is incorporated herein by reference for all purposes. International Patent Application No. PCT/US13/64735 is a continuation-in-part application of prior U.S. patent application Ser. No. 13/844,672 titled "MULTI-MEDIA MANAGEMENT, STREAMING, AND ELECTRONIC COMMERCE TECHNIQUES IMPLEMENTED OVER A COMPUTER NETWORK" by Skeen et al., filed on 15 Mar. 2013, the entirety of which is incorporated herein by reference for all purposes.

U.S. patent application Ser. No. 14/281,459 claims benefit, pursuant to the provisions of 35 U.S.C. § 119, of U.S. Provisional Application Ser. No. 61/826,990, titled "VENUE-BASED CONCERT NETWORK AND VENUE-RELATED MULTI-MEDIA MANAGEMENT, STREAMING, AND ELECTRONIC COMMERCE TECHNIQUES IMPLEMENTED VIA COMPUTER NETWORKS AND MOBILE DEVICES", naming SKEEN et al. as inventors, and filed 23 May 2013, the entirety of which is incorporated herein by reference for all purposes.

BACKGROUND

The present disclosure relates to electronic commerce transactions. More particularly, the present disclosure relates to automated, conditional event ticketing and reservation techniques implemented over computer networks.

BRIEF DESCRIPTION OF THE DRAWINGS

FIGS. 8-15 illustrate example screenshots of various graphical user interfaces (GUIs) which may be used to facilitate, initiate and/or perform various operation(s) and/or action(s) relating to one or more of the MMMS aspects disclosed or referenced herein.

FIGS. 17-59 illustrate examples of various graphical user interfaces (GUIs) and procedural flows which may be used to facilitate, initiate and/or perform various operation(s) and/or action(s) relating to one or more of the ticket reservation and/or purchasing aspects disclosed or referenced herein.

DETAILED DESCRIPTION OF EXAMPLE EMBODIMENTS

Overview

Figure 1:
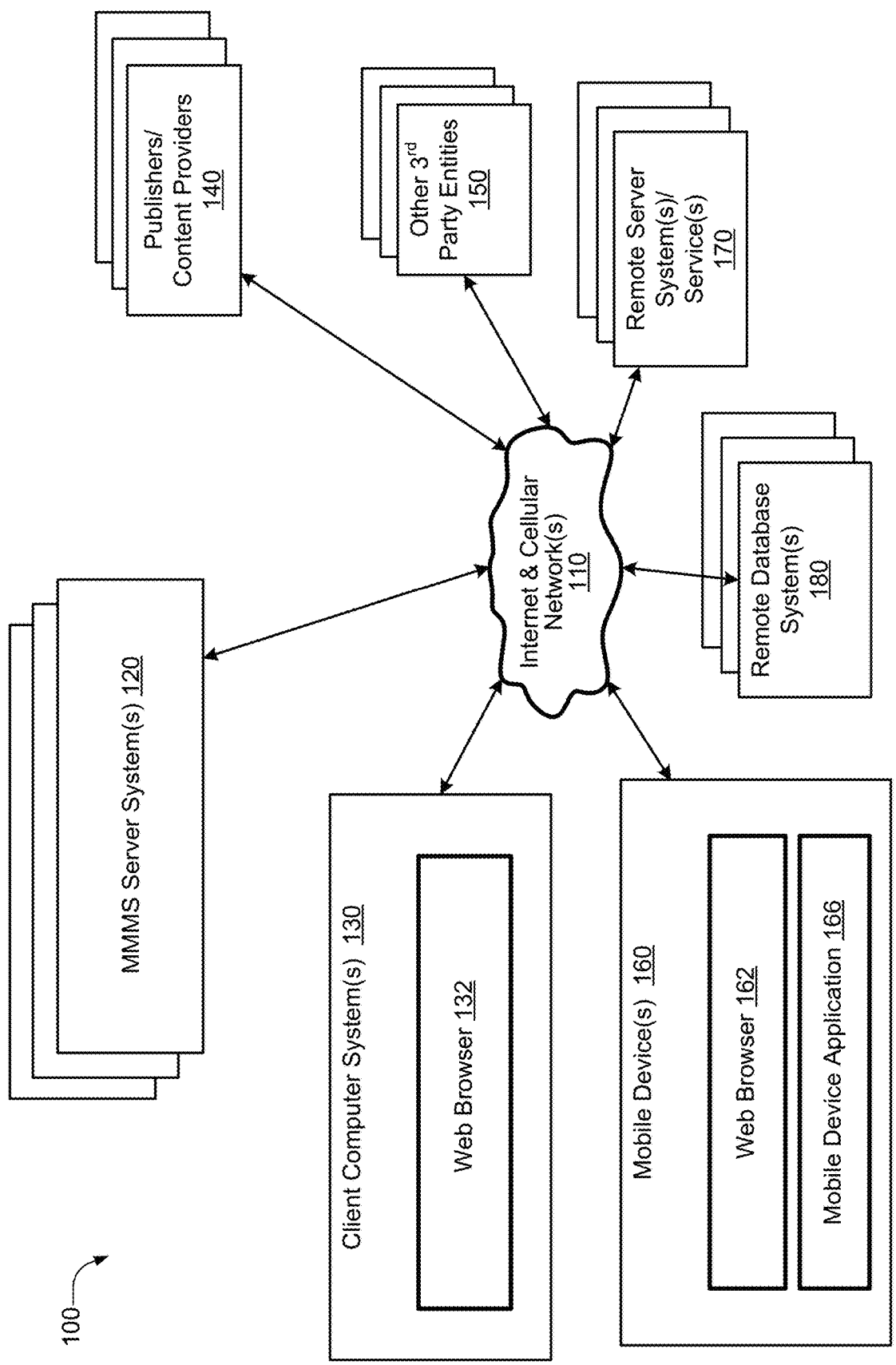
FIG. 1 illustrates a simplified block diagram of a specific example embodiment of a Multi-Media Management and Streaming (MMMS) System 100 which may be implemented in network portion 100.

Various aspects described or referenced herein are directed to different methods, systems, and computer program products relating to multi-media management and streaming techniques implemented over a computer network.

Various techniques are described herein for providing ticketing reservation and purchasing functionality for enabling and/or facilitating users in performing activities/operations relating to group ticket reservations and/or conditional ticket purchases for various types of events which are scheduled to occur at one or more different venues. Examples of some such events may include, but are not limited to, one or more of the following (or combinations thereof): music events, comedy events, lecture events, sporting events, theater events, conferences, movie events, online events, and/or other types of events in which tickets may be required for attendance/admission/access to the event.

One aspect disclosed herein is directed to different methods, systems, and computer program products providing ticketing reservation and purchasing functionality for enabling and/or facilitating users in performing activities/operations relating to reservation and/or purchasing of tickets to events such as live performances at one or more venues. For example, in at least one embodiment, the MAGNIFI System may include a Ticketing Reservation/Purchase System ("TRPS") which, for example, may be configured or designed to automatically and/or dynamically identify event ticketing reservation/purchasing opportunities in advance of tickets going on sale to the public; or which, for example, may be configured or designed to automatically and/or dynamically fund, initiate funding or facilitate funding of event ticket purchases of multiple event attendees.

One aspect disclosed herein is directed to different methods, systems, and computer program products for facilitating automated conditional purchasing of event tickets via a computer network, the method comprising causing at least one processor to execute a plurality of instructions for: causing at least one component of the computer network to identify a first upcoming event which is scheduled to occur at a first venue; causing at least one component of the computer network to generate a first set of instructions for causing a Ticketing graphical user interface ("Ticketing GUI") to be displayed at an end user's device, wherein the first set of instructions include instructions for configuring the Ticketing GUI to enable a first end user to initiate a ticket reservation invitation transaction for inviting at least one identified invitee to accept at least one reserved ticket for the first upcoming event; causing at least one component of the computer network to notify the at least one identified invitee of the ticket reservation invitation transaction; causing at least one component of the computer network to monitor the ticket reservation invitation transaction; and automatically causing, in response to detecting a first condition or event, at least one component of the computer network to fund at least one reserved ticket purchase transaction relating to a purchase of at least one reserved ticket for the first upcoming event. In at least one embodiment, the ticket purchase transaction corresponds to at least one transaction selected from a group consisting of: a ticket purchase transaction relating to purchase of a ticket for the end user; and.or a ticket purchase transaction relating to purchase of a ticket for at least one invitee. In at least one embodiment, the first condition or event corresponds a condition or event selected from a group consisting of: detecting that a specific invitee has expressed interest in attending the first upcoming event; detecting that a specific invitee has expressed interest in purchasing at least one of the reserved tickets; detecting at least one invitee has expressed interest in purchasing at least one of the reserved tickets; detecting that at least one invitee has expressed interest in attending the first upcoming event; detecting that a specific invitee has purchased ticket for the first upcoming event; and/or detecting that at least one invitee has purchased ticket for the first upcoming event.

Various graphical user interfaces (GUIs) are described herein which may be used to facilitate, initiate and/or perform various operation(s) and/or action(s) relating event ticket reservations and purchasing operations implemented via a user's mobile device and/or computer. According to specific embodiments, at least a portion of the content and functionality of ticket reservation and purchasing GUIs disclosed herein may be implemented at the MAGNIFI System.

Additional objects, features and advantages of the various aspects described or referenced herein may become apparent from the following description of its preferred embodiments, which description may be taken in conjunction with the accompanying drawings.

Specific Example Embodiments

Various techniques will now be described in detail with reference to a few example embodiments thereof as illustrated in the accompanying drawings. In the following description, numerous specific details are set forth in order to provide a thorough understanding of one or more aspects and/or features described or reference herein. It will be apparent, however, to one skilled in the art, that one or more aspects and/or features described or reference herein may be practiced without some or all of these specific details. In other instances, well known process steps and/or structures have not been described in detail in order to not obscure some of the aspects and/or features described or reference herein.

One or more different inventions may be described in the present application. Further, for one or more of the invention(s) described herein, numerous embodiments may be described in this patent application, and are presented for illustrative purposes only. The described embodiments are not intended to be limiting in any sense. One or more of the invention(s) may be widely applicable to numerous embodiments, as is readily apparent from the disclosure. These embodiments are described in sufficient detail to enable those skilled in the art to practice one or more of the invention(s), and it is to be understood that other embodiments may be utilized and that structural, logical, software, electrical and other changes may be made without departing from the scope of the one or more of the invention(s). Accordingly, those skilled in the art will recognize that the one or more of the invention(s) may be practiced with various modifications and alterations. Particular features of one or more of the invention(s) may be described with reference to one or more particular embodiments or figures that form a part of the present disclosure, and in which are shown, by way of illustration, specific embodiments of one or more of the invention(s). It should be understood, however, that such features are not limited to usage in the one or more particular embodiments or figures with reference to which they are described. The present disclosure is neither a literal description of all embodiments of one or more of the invention(s) nor a listing of features of one or more of the invention(s) that must be present in all embodiments.

Headings of sections provided in this patent application and the title of this patent application are for convenience only, and are not to be taken as limiting the disclosure in any way. Devices that are in communication with each other need not be in continuous communication with each other, unless expressly specified otherwise. In addition, devices that are in communication with each other may communicate directly or indirectly through one or more intermediaries. A description of an embodiment with several components in communication with each other does not imply that all such components are required. To the contrary, a variety of optional components are described to illustrate the wide variety of possible embodiments of one or more of the invention(s). Further, although process steps, method steps, algorithms or the like may be described in a sequential order, such processes, methods and algorithms may be configured to work in alternate orders. In other words, any sequence or order of steps that may be described in this patent application does not, in and of itself, indicate a requirement that the steps be performed in that order. The steps of described processes may be performed in any order practical. Further, some steps may be performed simultaneously despite being described or implied as occurring non-simultaneously (e.g., because one step is described after the other step). Moreover, the illustration of a process by its depiction in a drawing does not imply that the illustrated process is exclusive of other variations and modifications thereto, does not imply that the illustrated process or any of its steps are necessary to one or more of the invention(s), and does not imply that the illustrated process is preferred.

When a single device or article is described, it will be readily apparent that more than one device/article (whether or not they cooperate) may be used in place of a single device/article. Similarly, where more than one device or article is described (whether or not they cooperate), it will be readily apparent that a single device/article may be used in place of the more than one device or article. The functionality and/or the features of a device may be alternatively embodied by one or more other devices that are not explicitly described as having such functionality/features. Thus, other embodiments of one or more of the invention(s) need not include the device itself. Techniques and mechanisms described or reference herein will sometimes be described in singular form for clarity. However, it should be noted that particular embodiments include multiple iterations of a technique or multiple instantiations of a mechanism unless noted otherwise.

Various aspects described or referenced herein are directed to different methods, systems, and computer program products relating to multi-media management and streaming techniques implemented over a computer network. According to various embodiments disclosed herein, a Multi-Media Management and Streaming (MMMS) System may be configured or designed to provide online users with "location based" streaming radio functionality. Users from different geographic locations may access a variety of MMMS System GUIs to search for, create, and/or share customized streaming radio stations or playlists which may be configured to identify and play/stream music associated with one or more of the following (or combinations thereof):
Upcoming shows;
Bands/Artists;
Venue/Festival related events;
Online streaming radio stations;
Online streaming video stations;
Etc.

In at least one embodiment, the MMMS System may include functionality for enabling users to selectively filter search results and/or presented content according to a variety of different filtering criteria such as, for example, one or more of the following (or combinations thereof):
geographic location;
geographic proximity;
time/date criteria;
venue/festival name(s);
music genre(s);
video genre(s);
artist/band name(s)
user ID;
geographic location of artist/band origin (e.g., home town);
geographic location of upcoming shows and/or events;
geographic proximity of upcoming shows and/or events;
user "mood" (e.g., happy, sad, excited, etc.)
"night out" qualities (e.g., dance party, romantic, dinner music, etc.)
event ticket price
event age restrictions
group/conditional ticketing availability
etc.

In at least some embodiments described herein, the terms "MAGNIFI" and "MAGNIFI System" may refer to one or more embodiments of the MMMS System (and/or portions thereof), such as, for example, those corresponding to the website system(s), GUI(s), and music streaming service(s) associated with the website domain MAGNIFI.FM (www.magnifi.fm). Thus, for example, as used herein, the terms "MMMS System", "MAGNIFI", and "MAGNIFI System" may be used interchangeably, unless otherwise noted. Additionally, in at least some embodiments described herein, the terms "Artist" or "Band" may be used interchangeably to refer to one or more of the following (or combinations thereof): music related artist(s)/band(s), songwriters, composers, performers, etc.

Various techniques are described herein for providing ticketing reservation and purchasing functionality for enabling and/or facilitating users in performing activities/operations relating to group ticket reservations and/or conditional ticket purchases for various types of events which are scheduled to occur at one or more different venues. Examples of some such events may include, but are not limited to, one or more of the following (or combinations thereof): music events, comedy events, lecture events, sporting events, theater events, conferences, movie events, online events, and/or other types of events in which tickets may be required for attendance/admission/access to the event.

Venue-Ticketing Example A

In at least one embodiment, the MMMS System may be configured or designed to provide ticketing reservation and purchasing functionality for enabling and/or facilitating users in performing activities/operations relating to reservation and/or purchasing of tickets to events such as live performances at one or more venues.

Live performances may include, but are not limited to, music events, comedy events, sporting events, theater events, conferences or other live events for which tickets may be purchased Venue-Ticketing Example B In one embodiment, reservation and/or purchasing of tickets by MAGNIFI users may be facilitated by $3^{rd}$ party system(s)/component(s).
Such facilitation may occur by way of reservation and/or ticket purchase functionality residing on $3^{rd}$ party platforms via a Software Developers Kit (SDK), an iFrame embed or a hyperlink, such that reservation and/or ticket purchase can be initiated outside the MAGNIFI platform.
Such facilitation may also include the ability to publicly post on 3rd party internet websites such as Facebook and Twitter the user's interaction with a ticket reservation (such as reservation creation, reservation acceptance, and/or reservation declining) ("John just reserved 8 tickets to [EVENT] on December 12th.")

Venue-Ticketing Example C

In at least one embodiment, at some point after the Initial Ticket On-Sale event (e.g., approximately 1-5 days after), the venue hosting the event (e.g., concert/show) would set the Reservation Allotment for how many reservations it would guarantee/allot for a specific concert. In one embodiment, to determine the Reservation Allotment, the venue may take their "Sellable Capacity" less "Anticipated Sales", and the remaining number may be the Anticipated Unsold Tickets ("AUTs").
"Sellable Capacity" may be determined by the ticket allotment for an event as comprised from multiple sources, including but not limited to: ticket allotment directly from the Ticketing Company, ticket allotment from the Venue, ticket allotments from 3rd party resellers, and ticket allotment from the artist/performer/team.
A separate Event Ticket Reservation Pool would exist, comprised of the Reservation Allotment less all pending ticket reservations across all Reservation Groups for the Event.
An API would connect the Event Ticket Allotment Pool and the Event Ticket Reservation Pool, such that event tickets may be deemed "claimed inventory" (and fulfilled as such using a variety of delivery methods) for all Reservation Slots within Reservation Groups that had achieved the Minimum Subscriber Level. Tickets for Reservation Groups that had not achieved the Minimum Subscriber Level may be deemed "reclaimed inventory" and would either return to the Event Ticket Allotment Pool or remain in Event Ticket Allotment Pool until claimed, depending on the embodiment.
The Host may be allowed to invite up to a predetermined "super percentage" (e.g., 1.5×, 2×, 3×, etc.) of the number of tickets reserved by the Host, to account for the likelihood that not all Invitees would accept the Reservation Group Invitation.

Example Ticketing-Customer Interaction A

In at least one embodiment, once the Reservation Allotment is available in the TRPS, MAGNIFI users may be able to view an Event Page for a particular event. On the Event Page, the user may be able to view (e.g., in real-time)

information relating to the total number of tickets sold for that event and the number of reservations available.

Other information accessible from the Event Page may include:
  date of upcoming event
  start time of upcoming event
  start time of each performer/performance within the event
  venue name and address
  venue location on a map display
  artist/performer/team name and description
  event age restrictions
  ticket price
  group/conditional ticketing availability
  reviews of the venue
  reviews of the artist/performer/team
  Invitees to the Reservation Group
  required time frame for accepting or declining the Group Ticketing Invitation,
  Invitees may also play audio and/or visual media by event artists/performers.

Example Ticketing-Customer Interaction B

In at least one embodiment, MAGNIFI users may be able to "buy now" for immediate ticket purchase and/or be able to make ticket reservations (e.g., for one or more persons).
  Users interacting with MAGNIFI ticketing features can choose to purchase outright one or more tickets to an upcoming event, or they can initiate Group Ticketing by creating a Reservation Group across multiple Invitees for one or more ticket reservations to an upcoming event.

Ticketing Reservation Example A

In at least one embodiment, when making the Ticketing Reservation, the Reservation Host may be able to designate other MAGNIFI users (Reservation Recipients) to receive an "invitation to accept the Reservation."
  Once the Host indicates the number of tickets they would like to reserve for the upcoming event, the Host may be prompted to indicate specific individuals the Host wished to invite to join the Reservation Group. These individuals are "Initial Invitees".
  In one embodiment, the Reservation Group may be configured such that Initial Invitees may be permitted to themselves invite "Additional Invitees" to the Reservation Group.

Ticketing Reservation Example B

In at least one embodiment, one or more "Invitation to Accept Ticket Reservation" messages may be sent within MAGNIFI to Reservation Recipients.
  This message may also automatically publicly post on 3rd party internet websites such as Facebook and Twitter the user's interaction with a ticket reservation (such as reservation creation, reservation acceptance, and/or reservation declining) ("John just reserved 8 tickets to [EVENT] on December 12th.")
  This message may also be automatically sent via email, SMS or other digital communication means, such that the Host would enter the phone number or email addresses of the Initial Invitees. In one embodiment on a mobile device, the Host may be prompted to allow MAGNIFI to access the Host's mobile device saved contacts in order to facilitate the entering of the Initial Invitees' contact information for purposes of sending the Reservation Group Invitation.

Making the Reservation Example A

In at least one embodiment, the Host and the Recipients may be provided with a window of time in which to convert their Reservations into Ticket purchases.
  The reservation time window may be determined by the Venue, the Ticketing Company, MAGNIFI or another party involved in the Event, and may be based on the number of days prior to the Event the time frame window should close, some percentage of total Event Tickets sold, achievement of reservation acceptance benchmarks in the form of a Minimum Subscriber Level, or some other determination.
  The Minimum Subscriber Level for a Reservation Group may be the minimum number of Invitees required to accept the Group Ticketing Invitation such that an automated process of ticket purchases for all Subscribed Invitees is triggered.
  The Minimum Subscriber Level may be determined by the Host, the Venue, the Ticketing Company, MAGNIFI or another party involved in the Event, depending on the embodiment.
  If the Reservation Group does not achieve the Minimum Subscriber Level within a predetermined time frame (egg, 24 hours, 48 hours, 72 hours), the Reservation Group is cancelled, the reservations expire, and the Event Tickets become "reclaimed inventory" into the Event Ticket Allotment Pool as described below. Invitees are informed of the expiration, and given easy access to a link to re-instigate another reservation, when available.
  If the Reservation Group does attain the Minimum Subscriber Level, the credit card (or other payment method) of each Subscribed Invitee may be automatically charged for only the number of tickets they had claimed as Reservation Slots, such that no one Reservation Group member may bear the entire cost of all tickets for the Reservation Group, unless the Reservation Group ticket purchases were intentionally configured in this way.
  Subscribed Invitees who have accepted the Group Ticketing Invitation after the Minimum Subscriber Level is achieved may be automatically and immediately charged for the number of tickets associated with their Reservation Slots.

Making the Reservation Example B

Once the Host has received confirmation from Recipients of their intent to attend the Event as a group (e.g., via MAGNIFI SMS, text message, email, social media posting, phone call, in person, etc.), the Reservation Host may automatically handle the Ticket purchases on behalf of the Reservation Group, or TRPS may automatically handle the Ticket purchases on behalf of the Reservation Group, depending on the embodiment.
  Such automated ticket purchases may be achieved by Reservation Invitees (and the Reservation Host) entering their credit card information or other payment information at the point of Reservation acceptance, indicating the number of Reservation Slots they would like to convert to Event Tickets, indicating whether MAGNIFI should store their payment information for future ticket purchases or reservations, and permitting their respective credit cards or other payment methods to be charged (once the Reservation Group achieved the Minimum Subscriber Level) in order to convert their Reservation into an Event Ticket.

Confirmation of Reservation acceptance by Invitees may be automatically sent via email, SMS or other digital communication means, and/or automatically posted to 3rd party internet websites such as Facebook and Twitter.

Example Reservation Definitions an opportunity for an individual to defer an event ticket purchase to a later time, while retaining the ability to convert such opportunity to an event ticket purchase at some point prior to the ticketed event an opportunity for an individual to facilitate a group of people in purchasing multiple tickets to an event, such purchase being potentially conditional upon group confirmation of intent to attend the event an opportunity for an individual to receive something of value for either converting their deferred purchase to an actual purchase, or for successfully facilitating event ticket purchases In at least one embodiment, one person may function (or may be assigned) as the primary (or lead) ticket reservation facilitator (e.g., "Host), facilitating the purchase of tickets by others. In some embodiments, multiple different persons may each be designated as a Hosts (or Co-Host).

In at least some embodiments, the different members of the group reservation may each purchase their own ticket separately, or may split the cost of the group ticket reservation/purchase transaction(s). In other embodiments, a single person (such as, for example, the Host(s)) may pay the entire cost of the group ticket reservation/purchase transaction(s) (e.g., one person pays for all purchase tickets), and the MAGNIFI system may be configured or designed to include functionality for assisting the purchaser in collecting reimbursement from members of the group.

Group Ticketing & Reservation Functionality:

The MAGNIFI event discovery platform (web, mobile web and mobile application) allows users to access ticketing information for upcoming events, initiate ticket purchases for individuals and create Ticket Reservations for groups of individuals.

The various ticketing and reservation techniques disclosed herein may provide functionality for facilitating, enabling, initiating, and/or performing automated, conditional event ticketing and reservation transactions (e.g., including invitations, tracking, fulfillment, refunds, etc.) via a computer network.

The MAGNIFI platform provides users with ticketing access and purchase/reservation initiation actions from multiple areas of the platform, including but not limited to one or more of the following (or combinations thereof):

Location-based event listings (e.g., a scrollable list of multiple events in a specific location or region).

Artist/performer/team-based event listings (e.g., a scrollable list of multiple events across multiple locations or regions relating to a single artist/performer/team).

Venue-based event listings (e.g., a scrollable list of multiple events of multiple artists/performers/teams at a single venue).

Event pages (e.g., a single page devoted to a single event).

Related event pages (e.g., a scrollable list of events related to a single event or multiple events reflecting an aggregation of events recommended to a user based on their usage history and/or preferences).

Music player GUIs (e.g., a GUI launched when a user initiates a streaming playlist of music pulled from any of the above relating to music performances).

Search engine results.

Travel reservation services.

Dining reservation services.

Music sites and apps.

Etc.

In some embodiments, MAGNIFI Group Reservation functionality may be incorporated (or embedded) into in Facebook, Google, Open Table, etc. (e.g., everywhere online that event attendance and/or ticketing decisions are made, not just the MAGNIFI platform). This concept describes group ticket/event reservations and "cost-splitting" made easy. For example, in some embodiments, one or more ticketing reservation/purchasing aspects/features described herein may be viewed within the MAGNIFI platform or outside the platform, such as, for example, in an email sent to a MAGNIFI user.

Users interacting with MAGNIFI ticketing features may choose to purchase outright one or more tickets to an upcoming event, or they may initiate Group Ticketing by creating a Reservation Group across multiple Invitees for one or more ticket reservations to an upcoming event.

In some embodiments, the user initiating Group Ticketing via a Reservation Group may be referred to as the "Host". Upon initiating Group Ticketing for an upcoming event, the Host may be prompted to indicate the number of tickets they may like to reserve for the upcoming event.

The number of tickets the Host may be allowed to reserve may be determined by multiple factors, including but not limited to the Event Ticket Inventory Pool and the Event Ticket Reservation Pool as described below.

Once the Host indicates the number of tickets they may like to reserve for the upcoming event, the Host may be prompted to determine how many of the reserved tickets should be allocated for the Host themselves. In one embodiment, the minimum number of reserved tickets allocable to the Host is "1" and the maximum number is "Reserved Tickets minus 1".

In one embodiment, the Host may also be prompted to determine if they wish to purchase their own reserved ticket(s), prior to or immediately after inviting Invitees and/or regardless of Invitee reservation acceptance status.

The Host may be prompted to indicate specific individuals the Host wishes to invite to join the Reservation Group. These individuals are "Initial Invitees".

The Host may then enter the phone number or email addresses of the Initial Invitees. In one embodiment on a mobile device or computer, the Host may be prompted to allow MAGNIFI to access the Host's mobile device/computer saved contacts in order to facilitate the entering of the Initial Invitees' contact information for purposes of sending the Reservation Group Invitation. In one embodiment, if the Host enters an email address, phone number or other contact method which is not associated in the Host's mobile device or computer with a contact name, the Host may be prompted to associate a contact name with the email address or phone number and save this information in the MAGNIFI ticketing platform for future reference.

The Host may be allowed to invite up to a predetermined "super percentage" (e.g., 1.5×, 2×, 3×, etc.) of the number of tickets reserved, to account for the likelihood that some or all Invitees may not accept the Reservation Group Invitation.

In one embodiment, the Host may be able to set Reservation Parameters for the Reservation Group, such as, for example, one or more of the following (or combinations thereof):

The number of tickets to be reserved for the Host;

Whether the Host wishes to "gift" (e.g., pay for) a ticket for one or more Invitees;

The number of tickets available to be reserved by each Initial Invitee;

Whether each Initial Invitee may add additional invitees ("Additional Invitees"; "Initial Invitees" plus "Additional Invitees"="Invitees") to the Reservation Group;

The number of Additional Invitees available to be added by each Initial Invitee to the Reservation Group;

Whether the reservation is publicly visible (e.g., Publish on FB, Twitter, alerts, elsewhere: "So and so just reserved 8 tickets to see Thee Oh Sees on December 12.")

The maximum number of individuals (Host+Total Invitees) permitted in the group.

Whether the Host approves the Reservation Group size to be automatically increased if Invitees wish to invite Additional Invitees;

Whether the Host approves the number of Reservation Slots to be automatically increased if Invitees wish to claim more Reservation Slots than are available in the Reservation Group as created by the Host.

Whether Invitees can view a list of all Invitees in the Reservation Group;

Whether Invitees can communicate with other Invitees in the Reservation Group within the platform;

Saving the Reservation Group, including the list of Invitees and the parameters set, and naming the Reservation Group, so that the Reservation Group may be easily accessed for creating future Reservation Groups to other events;

Etc.

In at least some embodiments, once the Host indicates the total number of ticket reservations available in the Reservation Group, determines the Initial Invitees to the Reservation Group, and sets parameters for the Reservation Group, a Group Ticketing Event Page may be created within the platform, and Group Ticketing Invitations may be sent to the Initial Invitees via email, SMS, MAGNIFI notification or other means—directing the Initial Invitees to access the Group Ticketing Event Page within the MAGNIFI platform.

In alternate embodiments, the initial message received by an Invitee may read something like one or more of the following (or combinations thereof):

"Howie just reserved 5 tickets to Cool Ghouls at the Fillmore on Nov. 23, 2015. Are you in?" (with a link to the Group Ticketing Event Page)

"Howie just reserved 5 tickets for himself and 4 others to Cool Ghouls at the Fillmore on Nov. 23, 2015. Are you in?" (with a link to the Group Ticketing Event Page)

"Howie just reserved 5 tickets for the San Francisco Giants game on Nov. 23, 2015 for himself, Toby, you and possibly 2 others. Wanna go?" (with a link to the Group Ticketing Event Page)

(mobile SMS) "Howie just reserved 5 tickets to see "The Hobbit" at Grand Lake Movie Theater tomorrow night (Nov. 23, 2015). Are you in? Text "yes", "no" or "maybe" (Group Ticketing Event Page is automatically updated with the Invitee's response)

Per the Reservation Parameters, if any Initial Invitees invite Additional Invitees to join the Reservation Group, Additional Invitees may receive a Group Ticketing Invitation and access to the Group Ticketing Event Page for the Reservation Group. Initial Invitees and Additional Invitees may also receive an update as to the status of the reservation's invitee group.

In one embodiment, the Host and the Invitees may be required to have or create MAGNIFI user profiles in order to create a Reservation Group and/or access the Group Ticketing Event Page.

Upon accessing the Group Ticketing Event Page, at least one Invitee may see information regarding the upcoming event and the Reservation Group, including but not limited to one or more of the following (or combinations thereof):

The name of the Reservation Group (if any);

Date of upcoming event;

Start time of upcoming event;

Start time of at least one performer within the event;

Venue name and address;

Venue location on a map display;

Artist/performer/team name and description;

Reviews of the venue;

Reviews of the artist/performer/team;

Host of the Reservation Group;

Invitees to the Reservation Group;

Required time frame for accepting or declining the Group Ticketing Invitation;

Reservation Parameters set by the Host;

Attendance Status of each member of the Reservation Group (yes/no/maybe/no response);

Display of a thread of comments (text or other media) posted by Invitees.

Audio/visual media associated with event artists/performers/team;

Number of remaining Reservation Slots for Reservation Group;

Number of total remaining Reservations available for event;

Etc.

Invitees may have the option of accepting or declining the Group Ticketing Invitation and writing a comment(s) about their choice. This comment may be disseminated to the Reservation Group via email, SMS, MAGNIFI mobile app notification or other digital communication means and may also reside within the Group Ticketing Event Page as a comment thread. Each Invitee may also set their notification preferences for updates on the Reservation Group.

Invitees may also have the option of claiming 1 or more Reservation Slots, as determined by the parameters set by the Host, MAGNIFI, the Venue, the Ticketing Company, the Artist/Performer/Team or another party involved in the Event. At least one "Reservation Slot" may be the equivalent of 1 Event Ticket if the reservations are converted to tickets as described below.

If an Invitee accepts the Group Ticketing Invitation, they may be prompted to facilitate, enable, initiate, and/or perform one or more of the following operation(s), action(s), and/or feature(s) (or combinations thereof):

Sign up for MAGNIFI, or login if they have already joined in the past;

Enter their credit card information;

Indicate the number of Reservation Slots they wish to claim;

Query the Reservation Host and/or the TRPS regarding additional Reservation Slots, if the Invitee wishes to claim more Reservation Slots than are currently available in the Reservation Group, Indicate whether MAGNIFI may store their credit card information for future ticket purchases or reservations;

Permit their credit card to be charged (once the Reservation Group achieved the Minimum Subscriber Level) in order to convert their Reservation Slot(s) to Event Tickets;

Permit their credit card to be charged only if some other specific Invitee(s) accept the Reservation Invitation ("I'll go if Wayne is going");

"Gift" a ticket to another Invitee (e.g., pay for another's ticket);

Calendar the event;

Share their Group Ticketing Invitation acceptance on social media sites, alerting others of the upcoming event and the Invitees intent to attend;

Enter notification preferences and other settings, such as:
    Alerts for comments (on/off)
    Alerts for RSVPs (on/off)
    Alerts for event reminders (on/off)
    Alerts for special event deals/experiences offered by the Venue, Artist/Performer/Team, nearby vendors such as restaurants and bars (on/off)
    Mute this Reservation (on/off)
    Follow Artist/Performer/Team on MAGNIFI (on/off)
    Follow Venue on MAGNIFI (on/off)
    Follow all other Invitees in the Reservation on MAGNIFI (on/off)

Etc.

The Host may also be prompted to complete these steps upon sending out the Invitation to the Initial Invitees.

In some embodiments, if an Invitee declines the Reservation Invitation or the Reservation Group fills up before they accept or decline, or the Reservation Group fills up after they respond "maybe going"—such Invitee may receive notification prompts to create their own Reservation Group for the same Event or another Event.

In some embodiments, a Minimum Subscriber Level for a Reservation Group may be set according to the minimum number of Invitees required to accept the Group Ticketing Invitation such that an automated process of ticket purchases for some or all Subscribed Invitees is triggered. In one embodiment, the Minimum Subscriber Level may be one subscriber, such that as soon as one Invitee accepts the Group Ticketing Invitation and claims Reservation Slot(s)—event tickets for the Host and the Invitee are automatically purchased using the payment information already provided by each. In this instance, the Reservation Group would remain open, and as soon as other Invitees accept—they too are automatically charged for the number of event tickets they claimed as Reservation Slots.

In at least some embodiments, "Subscribed Invitees" may refer to Invitees who accept the Group Ticketing Invitation.

According to different embodiments, the Minimum Subscriber Level may be determined by the Host, the Venue, the Ticketing Company, MAGNIFI or another party involved in the Event, depending on the embodiment.

In at least one embodiment, if the Reservation Group does not achieve the Minimum Subscriber Level within a predetermined time frame (egg, 24 hours, 48 hours, 72 hours), the Reservation Group is cancelled, the reservations expire, and the Event Tickets become "reclaimed inventory" into the Event Ticket Inventory Pool as described below. Invitees are informed of the expiration, and given easy access to a link to re-instigate another reservation, when available.

According to different embodiments, the reservation time window may be determined by the Venue, the Ticketing Company, MAGNIFI and/or another party involved in the Event, and may be based on the number of days prior to the Event the time frame window may close, or some percentage of total Event Tickets sold, or some other determination.

If the Reservation Group does attain the Minimum Subscriber Level, the credit card of at least one Subscribed Invitee may be automatically charged for only the number of tickets they had claimed as Reservation Slots, such that no one Reservation Group member may be required to bear the entire cost of some or all tickets for the Reservation Group, unless the Reservation Group ticket purchases are specifically configured in this way.

Subscribed Invitees who have accepted the Group Ticketing Invitation after the Minimum Subscriber Level is achieved may be automatically and immediately charged for the number of tickets associated with their Reservation Slots.

At this point, in some embodiments, Subscribed Invitees become Group Attendees.

Invitees may receive regular updates regarding the time frame of the Group Ticketing Invitation (e.g., 24 hours remaining to accept, etc.).

On the day of the Event, Group Attendees may be prompted to "check in" at the Event using the MAGNIFI platform, using Near Field Technology or similar geo-locating technology, indicating their physical presence at the venue/event.

Before, during and after the event, Group Attendees may be prompted to post photos, videos, comments, and/or other media regarding their pre-Event and Event experience.

After the Event, Group Attendees may be prompted to rate and review their experience of the Performing Artist(s), and the venue itself. Attendees may also be prompted to make a new Reservation Group.

Backend Technology Description:

According to different embodiments, the ticket inventory for an event may be accepted from multiple sources, including but not limited to: ticket allotment directly from the Ticketing Company, ticket allotment from the Venue/Festival, ticket allotments from 3rd party resellers, ticket allotment from MAGNIFI and ticket allotment from the artist/performer/team.

This combined ticket inventory may comprise the Event Ticket Inventory Pool and may represent (on an ongoing, real time basis) the number of tickets available for purchase via Reservation Groups.

Ticket allotment may be determined from the ticketing sources by taking their "Sellable Capacity" less "Anticipated Sales", and the remaining tickets may be the Anticipated Unsold Tickets. The ticket source may determine to multiply the Anticipated Unsold Tickets by a "super percent" multiplier (egg 100+%), thus creating a reservation allotment for the event.

A separate Event Ticket Reservation Pool may exist, comprised of some or all pending ticket reservations across some or all Reservation Groups for the Event.

An API may connect the Event Ticket Inventory Pool and the Event Ticket Reservation Pool, such that event tickets may be deemed "claimed inventory" (and fulfilled as such using a variety of delivery methods) for some or all Reservation Slots within Reservation Groups that had achieved the Minimum Subscriber Level. Tickets for Reservation Groups that had not achieved the Minimum Subscriber Level may be deemed "reclaimed inventory" and may either return to the Event Ticket Inventory Pool or remain in Event Ticket Inventory Pool until claimed, depending on the embodiment.

In an alternate embodiment, MAGNIFI Group Ticketing also resides inside $3^{rd}$ party platforms via a Software Developers Kit (SDK), such that Reservation Groups for Events may be initiated outside the MAGNIFI platform.

Venue/Ticket Promoter/Ticket Company/Artist Dashboard Description:

In at least one embodiment, the entity offering tickets to an Event (e.g., Venue, Promoter, Ticket Company, Artist or some other person/entity) is provided access to a Dashboard GUI (herein "Dashboard") from which they can offer the tickets for sale, offer Group Ticketing functionality, set ticket and reservation transaction parameters and monitor data regarding ticketing and reservations for one or more Events.

In one embodiment, such Dashboard may provide for varying permission levels of persons with access to the Dashboard, such as "Dashboard administrator" and "Dashboard user".

In one embodiment, the Dashboard may provide access to event ticketing/reservation data associated with multiple venues under common ownership/administration.

In one embodiment, the Dashboard contains "profile information" on the Venue, such as:
- Venue name
- Venue address and contact information
- Venue website and other online properties
- Venue followers on MAGNIFI
- Venue details (parent company, capacity, date established, etc.)
- Venue photos In one embodiment, the Dashboard contains information regarding Ticket Reservations for each Event at the Venue, such as:
- Tickets currently allocated
- Tickets currently sold
- Tickets currently available
- Reservations currently confirmed
- Number of Tickets associated with confirmed Reservations
- Outstanding Reservations
- Number of Tickets associated with outstanding Reservations
- Monetary value of Tickets and confirmed Reservations
- An option to pause new Reservations
- An option to recall Tickets available for Reservations
- An option to resume making Tickets available for Reservations
- An option to increase the number of Tickets allocated for Reservations In one embodiment, the Dashboard may provide access to information regarding fan email addresses collected and an exportable file of the email addresses. In one embodiment, the Dashboard may provide access to information regarding Venue account users, including the user names, permission levels and contact information for each.

Ticket Fulfillment Description:

Once ticket reservations in a Reservation Group have been converted to tickets for Group Attendees, the tickets may be delivered to at least one Group Attendee digitally or available for pickup at the Venue under the name of at least one Group Attendee.

Group Ticketing Incentives:

MAGNIFI, Artists/Performers/Teams, Venues and/or Ticketing Companies participating in Group Ticketing may offer incentives/discounts/rewards for Reservation Groups that become Group Attendees. Such incentives may be offered to the Host or Invitees or both. Such incentives may take the form of one or more of the following (or combinations thereof):

Bulk Ticket Discount: discount prices for purchasing tickets in bulk (5 tickets for the price of 4, with the discount spread across the price of one or more tickets, thus benefiting the Reservation Group, or applied to the tickets of specific group members (thus benefiting individuals within the Reservation Group).

Promotional Offers: venue tickets, drink tickets, drink discounts, venue swag, VIP privileges, custom artist/performer/team merchandise, priority seating, discount coupons Vendor Affiliate Discounts: discounts at vendors/merchants affiliated with and/or proximal to the Venue, such as nearby restaurants Venue "Points": redeemable by the Host and/or Invitees at the Venue at some later date for any of the above Group Ticketing Monetization:

According to different embodiments, Group Ticketing monetization may be implemented via one or more of the following forms:
- Per ticket fee
- Per order fee
- Per event fee
- Platform subscription fee
- Third party sponsorship fee
- Third party advertiser fee
- Etc.

Group Ticketing Sponsor Involvement:

Brand sponsor involvement may be implemented via one or more of the following forms:
- Local/national sponsor underwrites one or more fees and is perceived as paying one or more convenience fees related to tickets purchased through Reservation Groups, in exchange for brand goodwill and/or user data provided by MAGNIFI;
- Local/national sponsor pays a flat fee per show to buy a relationship with a specific demographic and receives demographic specific user data from MAGNIFI;
- Local/national sponsor pays a flat fee per show and offers product giveaways and/or raffle entries for a contest;
- Etc.

Example "Reservation" Definitions

A socially broadcast interest in attending a particular event (e.g., a "like" for an event that others may see), and then helping that general interest culminate in a tipping point where everyone wants to convert their Reservations into Tickets to be guaranteed admission.

An option to purchase an Event Ticket.

An option to defer purchase of an Event Ticket to a later time, while retaining the ability to convert such opportunity to an Event Ticket purchase at some time prior to the ticketed Event.

An opportunity for an individual to facilitate a group of people in purchasing multiple Event Tickets, such purchase being potentially conditioned upon group confirmation of intent to attend the Event.

An opportunity for an individual to receive something of value for converting their deferred Event Ticket purchase to an actual Event Ticket purchase.

An opportunity for an individual to receive something of value for successfully facilitating multiple Event Ticket purchases.

A discrete unit of the allocation of Anticipated Unsold Tickets multiplied by a super-percentage.

Ticket Reservation/Purchasing System Interaction(s)

Figure 16:
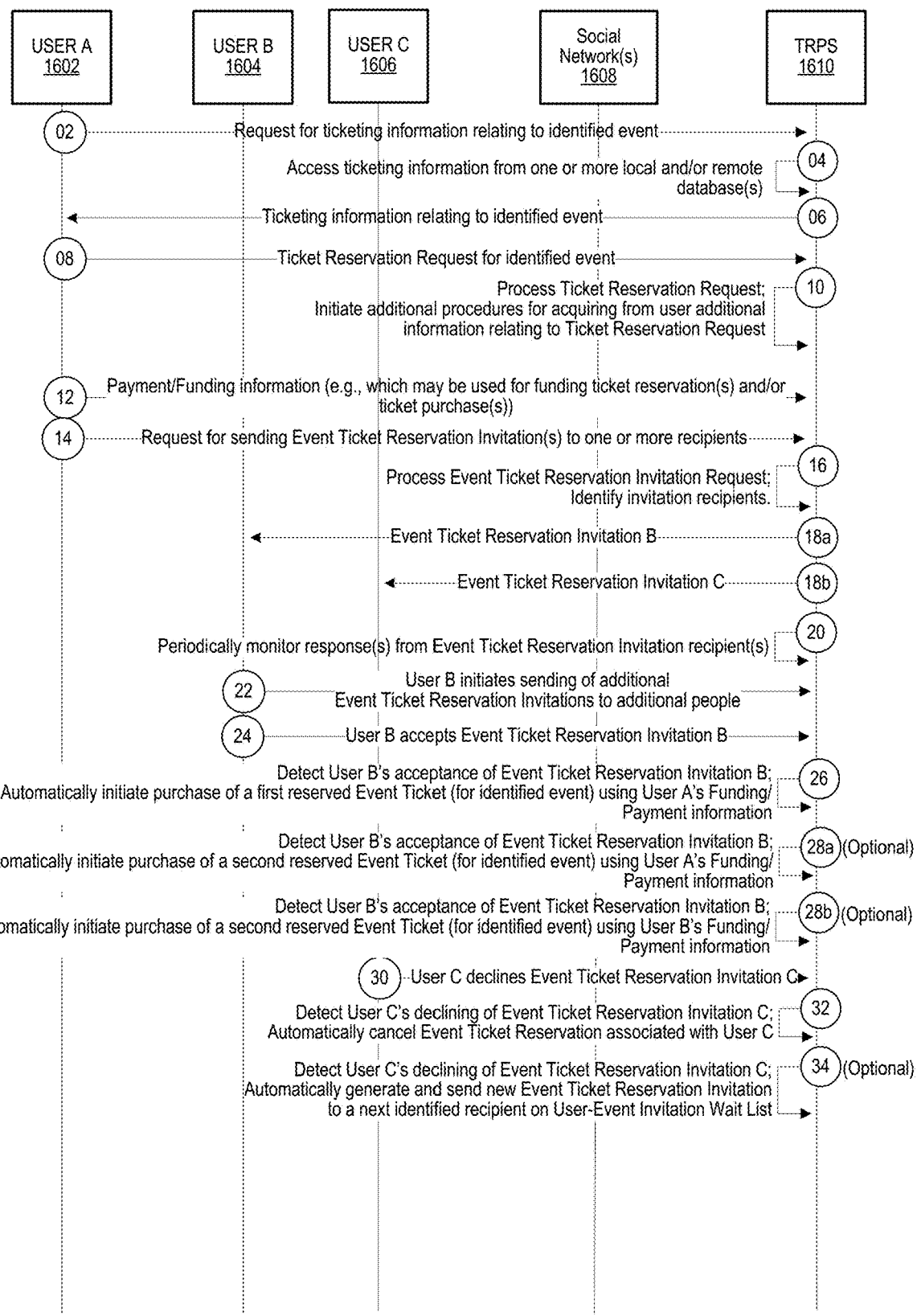
FIG. 16 shows a specific example embodiment of an interaction diagram 1600 between various systems/devices, which may be utilized for implementing various ticket reservation/purchasing aspects described herein.

FIG. 16 shows a specific example embodiment of an interaction diagram 1600 between various systems/devices, which may be utilized for implementing various ticket reservation/purchasing aspects described herein. In at least one embodiment, the interaction diagram of FIG. 16 illustrates one example embodiment of how a user/client/purchaser may utilize the hardware/software components disclosed herein to initiate and/or perform a variety of different types of operations and/or activities such as those described herein.

As shown at 02—User A initiates request to TRPS for ticketing information relating to identified event.

As shown at 04—TRPS 1610 accesses ticketing information from one or more local and/or remote database(s).

As shown at 06—Ticketing information relating to identified event provided to User A. In at least one embodiment, when the Ticketing Information Relating to Identified Event is sent to User A, such Ticketing Information may include Ticketing Reservation parameters as defined by one or more of the following (or combinations thereof): Web Interface/GUI providing ticket reservation/purchasing functionality (e.g., MAGNIFI GUI), TRPS, the event venue, the ticket seller, the performer and/or another person/entity involved in the event ("Reservation Parameter Constituents"), etc. Such parameters may include limitations on the number of Reservation Invitees per Group Reservation.

As shown at 08—User A initiates Ticket Reservation Request for identified event.

As shown at 10—TRPS processes Ticket Reservation Request; Initiates additional procedures for acquiring from user additional information relating to Ticket Reservation Request. Examples of Additional Procedure(s) may include, but are not limited to, one or more of the following (or combinations thereof):

Determining Identity of User.
Acquiring/Validating User Payment/Funding Information (e.g., credit card info which may be used for funding ticket reservation(s) and/or ticket purchase(s))
Identifying User's Social Network (1608) friends and/or user's "contacts list(s) (e.g., for sending ticket reservation invitations).
Facilitating user in sending one or more ticket reservation invitations to one or more selected friends/users.
Tracking responses to ticket reservation invitations.
Facilitating user in setting up one or more rules for automated ticket purchasing and/or ticket reservation invitations.
Assigning reserved tickets to specific friends/users (e.g., according to user's instructions).
Etc.

As shown at 12—User A provides Payment/Funding information (e.g., which may be used for funding ticket reservation(s) and/or ticket purchase(s)).

As shown at 14—User A initiates request for sending Event Ticket Reservation Invitation(s) to one or more recipients. In the present example, it is assumed that User B and User C are identified recipients.

In an alternate embodiment, Steps 8, 10, 12 and/or 14 may be combined, such that User A may facilitate, enable, initiate, and/or perform one or more of the following operation(s), action(s), and/or feature(s) (or combinations thereof) via the same GUI:

Initiate Ticket Reservation Request for identified event provided to TRPS.
Request additional information relating to Reservation Request provided to TRPS.
Provide Payment/Funding Information provided to TRPS.
Initiate request for sending Reservation Invitations to one or more recipients.
Etc.

As shown at 16—TRPS processes Event Ticket Reservation Invitation Request; Identifies invitation recipients. In this example, it is assumed (for purposes of illustration) that identified recipients include User B and User C.

As shown at 18a—Event Ticket Reservation Invitation B sent to User B.

As shown at 18b—Event Ticket Reservation Invitation C sent to User C.

As shown at 20—TRPS automatically and periodically monitors response(s) from Event Ticket Reservation Invitation recipient(s).

As shown at 22—In this example, it is assumed that User B initiates sending of additional Event Ticket Reservation Invitations to additional people. In at least one embodiment, additional Event Ticket Reservation Invitations may be automatically generated by TRPS 1610 and sent out to identified recipients. In at least one embodiment, if permitted by Reservation Rules (e.g., established/defined by User A and/or Reservation Parameter Constituents) and/or default reservation rules (e.g., defined by TRPS), User B may initiate sending of Additional Event Ticket Reservation Invitations to additional people. In some embodiments, such additional Event Ticket Reservation Invitations may be prevented from being sent out until after first tier of invited recipients have had a chance to accept or decline their invitation(s).

As shown at 24—Assume that User B accepts Event Ticket Reservation Invitation B.

As shown at 26—TRPS detects User B's acceptance of Event Ticket Reservation Invitation B, and in response, automatically initiates purchase of a first reserved Event Ticket (for identified event) using User A's Funding/Payment information. Steps 26, 28a and 28b assume either an embodiment without a Minimum Subscriber Level or an embodiment with a Minimum Subscriber Level which level has been achieved by User B's acceptance of Event Ticket Reservation Invitation B.

As shown at 28a (optional/alternate embodiment)—TRPS detects User B's acceptance of Event Ticket Reservation Invitation B, and in response, automatically initiates purchase of a second reserved Event Ticket (for identified event) using User A's Funding/Payment information.

As shown at 28b (optional/alternate embodiment)—TRPS detects User B's acceptance of Event Ticket Reservation Invitation B, and in response, automatically initiates purchase of a second reserved Event Ticket (for identified event) using User B's Funding/Payment information.

As shown at 30—Assume that User C declines Event Ticket Reservation Invitation C.

As shown at 32—TRPS detects User C's declining of Event Ticket Reservation Invitation C, and in response, automatically cancels Event Ticket Reservation associated with User C.

As shown at 34 (optional/alternate embodiment)—TRPS detects User C's declining of Event Ticket Reservation Invitation C, and in response, automatically generates and sends new Event Ticket Reservation Invitation to one or more next identified recipient(s) on User-Event Invitation Wait List.

In at least one embodiment, the user (e.g., User A) may identify a first group (e.g., first tier) of preferred recipients to receive the initial Event Ticket Reservation Invitations, and may identify additional (e.g., second tier) of recipients to receive Event Ticket Reservation Invitations upon detecting the expiration or declining of Event Ticket Reservation Invitations from any of the first tier recipients. This second tier of recipients may be used to populate the User-Event Invitation Wait List.

Example Case Scenario Embodiments

Example of Rules for Automated Ticket Purchasing Include Whether User a Will Fund:
  Only their own ticket purchase;
  Ticket purchases of the entire Reservation Group; or
  Ticket purchases of selected members of the Reservation Group
  In at least some embodiments, at least a portion of these rules may be also be set by Reservation Group Invitees for existing Reservation Group Members or Additional Invitees. In some embodiments, at least a portion of these rules may also be set by the Reservation Host, TRPS or Reservation Parameter Constituents.
  Example Use Case A:
  User A creates Reservation Group of 3—enters User A credit card info—invites User B and User C—User A indicates they will pay for their own ticket once the group is fully subscribed, but no other tickets
  User B accepts the invitation—enters User B credit card info—indicates they will pay for their own ticket+User C's ticket
  User C accepts the invitation
  Reservation Group is fully subscribed
    User A charged for 1 ticket
    User B charged for 2 tickets
  Example Use Case B:
  User A creates Reservation Group of 3—enters User A credit card info—invites User B and User C—User A indicates they will pay for all group tickets (e.g., 3 tickets) once the group is fully subscribed
  User B and User C accept
  Reservation Group is fully subscribed—User A is charged for all 3 tickets
  Example Use Case C;
  User A creates Reservation Group of 6—enters User A credit card info—invites User B and User C—User A indicates they will pay for their own ticket once the group is fully subscribed, but no other tickets
  User B accepts the invitation—enters User B credit card info—invites User B-2 to join the group—User B indicates they will pay for their own ticket but no one else's
  User C accepts the invitation—enters User C credit card info—invites User C-2 and User C-3—indicates they will pay for their own ticket and User C-2's ticket but not User C-3's ticket
  Users B, B-2, C, C-2 and C-3 all accept User A's invitation—group is fully subscribed—6 tickets purchased as follows:
    User A=1 ticket (credit card charged)
    User B=1 ticket (credit card charged)
    User B-2=1 ticket (credit card charged)
    User C=2 tickets (credit card charged)
    User C-3=1 ticket (credit card charged)
Examples of Rules for Ticket Reservation Invitations Include Whether or not:
  A. Reservation Group Invitees may add additional invitees to the Reservation Group
    Example A1: NO—Additional Invitees Not Allowed
      User A creates Reservation Group
        sets Minimum Subscriber Level=2
        (including User A)
        sets Maximum Invitees=2
        Invitees can invite additional invitees?=NO
      User A invites User B and User C
      User B and User C may not invite Additional Invitees
      User B accepts; User C declines
      Reservation becomes fully subscribed because User A+User B=Minimum Subscriber Level (2 subscribers)
      Ticket purchases are funded for User A and User B
      (SEE ABOVE RULES FOR TICKET PURCHASES)
    Example A2: YES—Additional Invitees Are Allowed
      User A creates Reservation Group
        sets Minimum Subscriber Level=3
        (including User A)
        sets Maximum Group Size=6
        Invitees can invite additional invitees?=YES
      User A invites User B and User C
      User B and User C may invite Additional Invitees
      User B accepts invitation
      User B invites User B-2
      User C declines invitation
      User B-2 accepts invitation
      Reservation=fully subscribed @ 3 subscribers (User A, User B, User B-2)
      Ticket purchases funded for User A, User B, User B-2
      (SEE ABOVE RULES FOR TICKET PURCHASES)
  B. Reservation Group Invitees may create a new, separate Reservation Group to which to extend additional invitees
    Example B1:
      User A creates Reservation Group
      User A invites User B, C, D, E, F
      User B declines User A invitation because: User B's family is visiting and User A's group is too small
      User B wants to start their own reservation group
      User B creates "cloned" Reservation Group for same event—User B is now the Host and invites family members accordingly
  C. Reservation Group Invitees may create a Reservation Subgroup to which to extend additional invitees
    Example C1:
      User A creates Reservation Group
      User A invites Users B, C, D
      User B accepts User A invitation—but User B creates their own Reservation Subgroup with its own ticket purchase & invitation parameters
      If User A's Reservation Group is fully subscribed—User B will be charged for that ticket; but they will still be a Sub-host of their own Sub-group—overseeing invitation & purchase parameters for their Sub-group.
  D. The number of additional reservation group/subgroup invitees which may be added by Reservation Group Invitees after the Initial Invitees have been invited
    Example D1:
      User A creates Reservation Group
      User A sets the Maximum Group Size to 8
      User A sets the Maximum Invitees to 16
      User A sets the Minimum Subscriber Level to 4
      User A allows Additional Invitees
      User A invites Users B & C (Available Invites now=14)
      User B accepts & invites B-2, B-3, B-4, B-5 (Available Invites now=10, Subscribers now=2: User A and User B)

User B-3 invites B-3a, B-3b, B-3c (Available Invites now=7)
User C accepts & attempts to invite C-1, C-2, C-3, C-4, C-5, C-6, C-7, C-8
  User C prevented from inviting because they've exceeded the Maximum Invitees
  User C prompted to remove up to 1 invitee
User C accepts & invites C-1, C-2, C-3, C-4, C-5, C-6, C-7 (Available Invites now=0, Subscribers now=3: User A, User B, User C)
Reservation Group now has Maximum Invitees of 16
User B-3 accepts invitation (Minimum Subscriber Level achieved=>User A, B, C and B-3 are charged for tickets) (Group Size=4)
User B-3b accepts invitation=>automatically charged for ticket (Group Size=5)
User C-1, C-3, C-4 accept invitation→automatically charged for tickets (Maximum Group Size=8 achieved)
User A gets notified=>Reservation Group has hit Maximum Size, close Reservation Group or increase group size?
User A closes Reservation Group
notifications go out to all remaining Invitees—group is closed—would you like to create your own Reservation Group?

E. The process/flow by which the Host creates a "tiered wait list"
Example E1:
  User A creates Reservation Group
  User A identifies Users B & C as being 1st Tier Invitees
  User A identifies User D as being a 2nd Tier Invitee
  User A identifies Users E & F as being 3rd Tier Invitees
  User B and C both decline the invite=>2 spots available
  Embodiment E1: 2 open spots are made available on first come-first served basis to all remaining Invitees, regardless of Tier
  Embodiment E1(a): 2 open spots are both offered to 2nd Tier Invitee User D, allowing User D to invite Additional Invitees—potentially creating their own tiered invitation list. If User D declines—2 open spots go to Tier 3 Invitees on first come-first served basis
  Embodiment E1(b): 2 open spots go to Tier 3 Invitees in ranked order (egg, spots offered to User E first and if declined, offered to User F)
  Embodiment E1(c): 1 open spot offered to Tier 2 Invitee User D+1 open spot offered to Tier 3 Invitees on a first-come-first-served basis.
  Embodiment E1(d): 1 open spot offered to Tier 2 Invitee user D+1 open spot offered to Tier 3 Invitees in ranked order (egg, first offered to User E)

F. The process/flow by which Additional Invitees are allowed into the Reservation Group, which may include a "wait list" and/or "tiered wait list"
Example F1: Wait List for Initial Invitees
  User A creates Reservation Group
  User A sets the Maximum Group Size to 6
  User A invites Users B, C, D, E, F, G, H (7 invitees)
  Users B, C, D, E, F accept (Group Size=6)
  Users G & H attempt to accept—but Group is already at maximum—they are put on the "wait list" for this Group
  Users C and E subsequently decline—2 spots open up
  Users G & H receive notifications that they may now join the Group
Example F2: Tiered Wait List for Initial Invitees+ Additional Invitees
  User A creates Reservation Group
  User A sets Maximum Group Size to 6
  User A invites Users B, C, D, E, F, G, H
  User B invites Users B-2
  User C invites Users C-2
  User C-2 invites User C-2a
  Users B, C, D, E, F accept (Group Size=6)
  Users G, H, B-2, C-2, C-2a attempt to accept—but Group is already at maximum—they are put on the "wait list" for this Group
  Users C and E subsequently decline—2 spots open up
  Embodiment F2(a): spots are offered on first come-first served basis to Users G, H, B-2, C-2, C-2a
  Embodiment F2(b): spots are first offered to Initial Invitees Users G and H. If one or both decline—remaining spot(s) go to all remaining Additional Invitees on first come-first served basis
  Embodiment F2(c): spots are first offered to Initial Invitees Users G and H. If one or both decline—remaining spot(s) are second offered to 1st tier Additional Invitee B-2. If B-2 declines—remaining spot(s) offered to 2nd Tier Additional Invitee B-2a FIG. 1 illustrates a simplified block diagram of a specific example embodiment of a Multi-Media Management and Streaming (MMMS) System 100 which may be implemented in network portion 100. As described in greater detail herein, different embodiments of MMMS Systems may be configured, designed, and/or operable to provide various different types of operations, functionalities, and/or features generally relating to MMMS System technology. Further, as described in greater detail herein, many of the various operations, functionalities, and/or features of the MMMS System(s) disclosed herein may provide may enable or provide different types of advantages and/or benefits to different entities interacting with the MMMS System(s).

Figure 6:
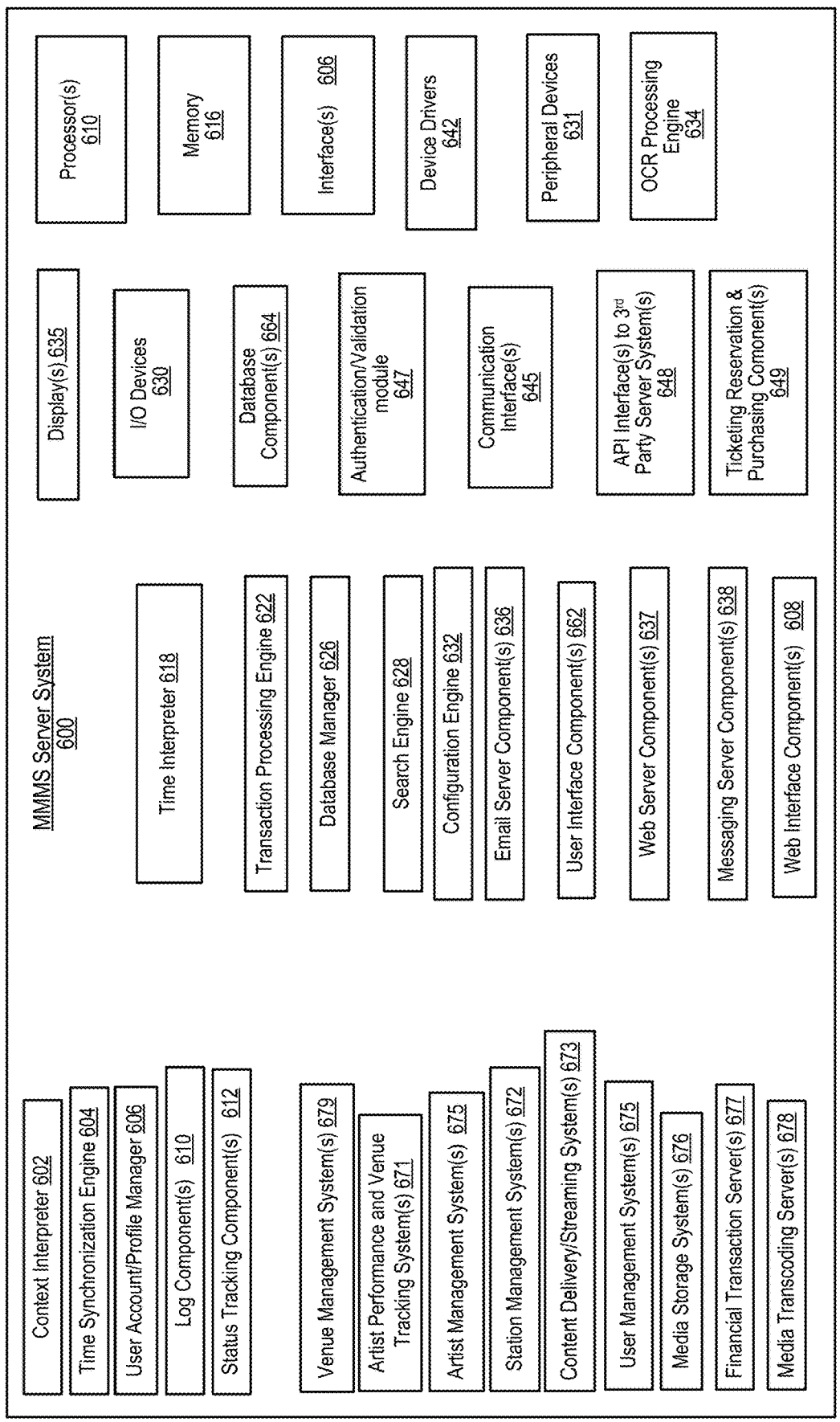
FIG. 6 illustrates an example of a functional block diagram of a MMMS Server System in accordance with a specific embodiment.

According to different embodiments, the MMMS System 100 may include a plurality of different types of components, devices, modules, processes, systems, etc., which, for example, may be implemented and/or instantiated via the use of hardware and/or combinations of hardware and software. For example, as illustrated in the example embodiment of FIG. 1, the MMMS System may include one or more of the following types of systems, components, devices, processes, etc. (or combinations thereof):

MMMS Server System(s) 120—In at least one embodiment, the MMMS Server System(s) may be operable to perform and/or implement various types of functions, operations, actions, and/or other features such as those described or referenced herein (e.g., such as those illustrated and/or described with respect to FIG. 6).

Publisher/Content Provider System component(s) 140. In at least one embodiment, one or more devices, components, and/or systems of the MMMS System (100) may be operable to interface with external content sources via an import/export API to load information into the various storage devices and database within the MMMS System (120).

Client Computer System (s) 130
3rd Party System(s)/Service(s) 150
Internet & Cellular Network(s) 110
Remote Database System(s) 180
Remote Server System(s) 170, which, for example, may include, but are not limited to, one or more of the following (or combinations thereof):
  Content provider servers/services
  Media Streaming servers/services
  Database storage/access/query servers/services
  Financial transaction servers/services
  Payment gateway servers/services
  Electronic commerce servers/services
  Event management/scheduling servers/services
  Etc.
Mobile Device(s) 160—In at least one embodiment, the Mobile Device(s) may be operable to perform and/or implement various types of functions, operations, actions, and/or other features such as those described or referenced herein (e.g., such as those illustrated and/or described with respect to FIG. 4). Additionally, in some embodiments, mobile devices which interact with the MMMS may offer additional unique functionality, including, but not limited to, temporal and geographic operations involving bands, events, users, and venues, enhanced social networking functionality, and photographic and videographic capture and transmission.
  Etc.

In at least one embodiment, the MMMS System may be operable to utilize and/or generate various different types of data and/or other types of information when performing specific tasks and/or operations. This may include, for example, input data/information and/or output data/information. For example, in at least one embodiment, the MMMS System may be operable to access, process, and/or otherwise utilize information from one or more different types of sources, such as, for example, one or more local and/or remote memories, devices and/or systems. Additionally, in at least one embodiment, the MMMS System may be operable to generate one or more different types of output data/information, which, for example, may be stored in memory of one or more local and/or remote devices and/or systems. Examples of different types of input data/information and/or output data/information which may be accessed and/or utilized by the MMMS System may include, but are not limited to, one or more of those described and/or referenced herein.

According to specific embodiments, multiple instances or threads of the MMMS System may be concurrently implemented and/or initiated via the use of one or more processors and/or other combinations of hardware and/or hardware and software. For example, in at least some embodiments, various aspects, features, and/or functionalities of the MMMS System may be performed, implemented and/or initiated by one or more of the various systems, components, systems, devices, procedures, processes, etc., described and/or referenced herein.

In at least one embodiment, a given instance of the MMMS System may access and/or utilize information from one or more associated databases. In at least one embodiment, at least a portion of the database information may be accessed via communication with one or more local and/or remote memory devices. Examples of different types of data which may be accessed by the MMMS System may include, but are not limited to, one or more of those described and/or referenced herein.

According to different embodiments, various different types of encryption/decryption techniques may be used to facilitate secure communications between devices in MMMS System(s) and/or MMMS Network(s). Examples of the various types of security techniques which may be used may include, but are not limited to, one or more of the following (or combinations thereof): random number generators, SHA-1 (Secured Hashing Algorithm), MD2, MD5, DES (Digital Encryption Standard), 3DES (Triple DES), RC4 (Rivest Cipher), ARC4 (related to RC4), TKIP (Temporal Key Integrity Protocol, uses RC4), AES (Advanced Encryption Standard), RSA, DSA, DH, NTRU, and ECC (elliptic curve cryptography), PKA (Private Key Authentication), Device-Unique Secret Key and other cryptographic key data, SSL, etc. Other security features contemplated may include use of well-known hardware-based and/or software-based security components, and/or any other known or yet to be devised security and/or hardware and encryption/decryption processes implemented in hardware and/or software.

According to different embodiments, one or more different threads or instances of the MMMS System may be initiated in response to detection of one or more conditions or events satisfying one or more different types of minimum threshold criteria for triggering initiation of at least one instance of the MMMS System. Various examples of conditions or events which may trigger initiation and/or implementation of one or more different threads or instances of the MMMS System may include, but are not limited to, one or more of those described and/or referenced herein.

It will be appreciated that the MMMS System of FIG. 1 is but one example from a wide range of MMMS System embodiments which may be implemented. Other embodiments of the MMMS System (not shown) may include additional, fewer and/or different components/features that those illustrated in the example MMMS System embodiment of FIG. 1.

Generally, the MMMS techniques described herein may be implemented in hardware and/or hardware+software. For example, they can be implemented in an operating system kernel, in a separate user process, in a library package bound into network applications, on a specially constructed machine, or on a network interface card. In a specific embodiment, various aspects described herein may be implemented in software such as an operating system or in an application running on an operating system.

Hardware and/or software+hardware hybrid embodiments of the MMMS techniques described herein may be implemented on a general-purpose programmable machine selectively activated or reconfigured by a computer program stored in memory. Such programmable machine may include, for example, mobile or handheld computing systems, PDA, smart phones, notebook computers, tablets, netbooks, desktop computing systems, server systems, cloud computing systems, network devices, etc.

Figure 2:
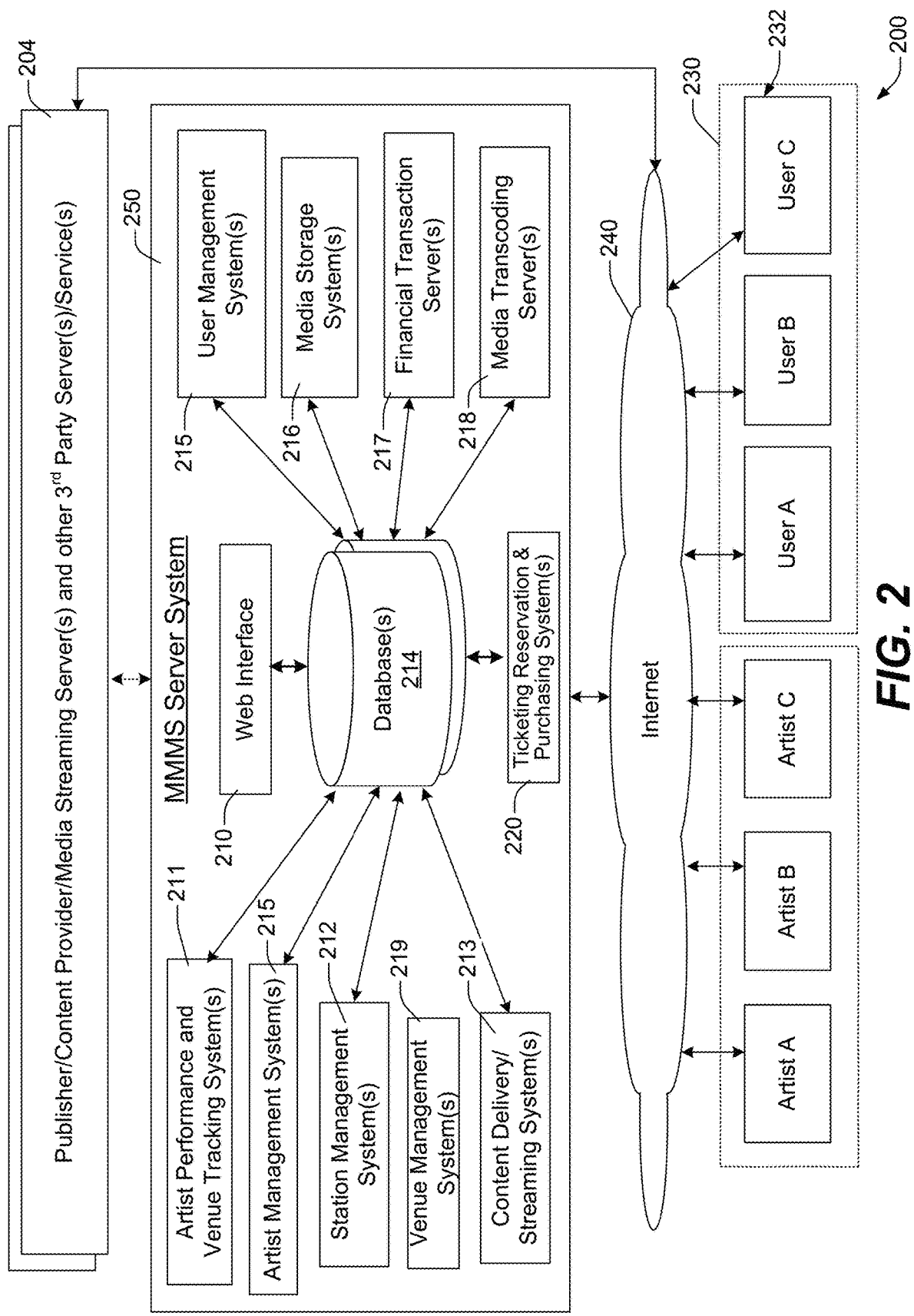
FIG. 2 shows a specific example embodiment of a network diagram illustrating an embodiment of an MMMS System 200.

FIG. 2 shows a specific example embodiment of a network diagram illustrating an embodiment of an MMMS System 200, which may be configured or designed for implementing various aspects, functions, and/or features such as one or more of those described and/or referenced herein. Additionally, the example embodiment of FIG. 2 provides an illustrative example of the different interactions and communication paths between and among the various components of the MMMS System network.

According to specific embodiments, the MMMS System may be accessible to various entities such as, for example: individual persons, corporate or business entities, system administrators, online content providers, online publishers, merchants, artists, copyright holders, etc.

In at least one embodiment, the MMMS System may include a plurality of hardware and/or software components operable to perform and/or implement various types of functions, operations, actions, and/or other features of the MMMS technology disclosed herein. Examples of such components may include, but are not limited to, one or more of the following (or combinations thereof):

MMMS Server System (e.g. 250).

Artist Performance and Venue Tracking System(s) 211, which, for example, may be configured or designed to facilitate, initiate and/or perform one or more of the following operation(s)/action(s) (or combinations thereof):

Manage database(s) of Event information.

Information about Events may be stored or cached, include artist(s), date(s) and venue(s), geographic location(s), photographs along with ticketing information, as well as additional fields.

Venue and Event data may be incorporated from external sources, using external API as available and permitted.

Accommodate discrepancies between internal and external databases and data.

Artist Management System(s) 215, which, for example, may be configured or designed to facilitate, initiate and/or perform one or more of the following operation(s)/action(s) (or combinations thereof):

Provide interfaces to, and manage database(s) for the purpose of storing, editing and distributing media and material relating to the Artist's identity, including but not limited to Albums, Tracks, Photographs, Video Links, Biographies, Tags, Locations, Comments, Reviews, Social Networks and Hyperlinks.

Once authenticated, Artists may easily edit their own information, and access statistics and analytics associated with their account from a central dashboard.

Artists may view the statistics and activities of their Stations, Tracks, Albums, email subscribers, and Radio Play.

Station Management System(s) 212, which, for example, may be configured or designed to facilitate, initiate and/or perform one or more of the following operation(s)/action(s) (or combinations thereof):

Store and cache 'Stations' of two types: Static and Dynamic.

Static Stations may include a ranked list of Artists, with no minimum or maximum number.

Dynamic Stations may include a "snapshot" of Filter Settings used when the Station was created or saved. At any point in time the Station may be refreshed, resulting in a new Ranked List of Artists recalculated from the most current MMMS databases, according to the Saved Filters.

MMMS may store or cache usage statistics and listenership data for one or more Stations Content Delivery/Streaming System(s) 213, which, for example, may be configured or designed to facilitate, initiate and/or perform one or more of the following operation(s)/action(s) (or combinations thereof): Serve digital content, including, but not limited to audio, video, images, or other documents to a variety of network enabled devices, including, but not limited to, desktop and laptop computers, PDAs, smart phones, tablets, iOS devices, or other external networks.

User Management System(s) 215, which, for example, may be configured or designed to facilitate, initiate and/or perform one or more of the following operation(s)/action(s) (or combinations thereof): Store information and usage statistics for several classes of User, including Visitors, Users, Artists, Venues, and Administrators Media Storage System(s) 216, which, for example, may be configured or designed to facilitate, initiate and/or perform one or more of the following operation(s)/action(s) (or combinations thereof): Employ sufficient and reliable digital storage, as is necessary to hold Artist Content in an organized fashion.

Financial Transaction Server(s) 217, which, for example, may be configured or designed to facilitate, initiate and/or perform one or more of the following operation(s)/action(s) (or combinations thereof): Provide servers or services related to the processing of financial transactions, through a variety of methods.

Media Transcoding Server(s) 218, which, for example, may be configured or designed to facilitate, initiate and/or perform one or more of the following operation(s)/action(s) (or combinations thereof): Receive digital audio content from Artists, and performing any operations that are necessary for operation of the MMMS system, and related subsystems.

Venue Management System(s) 219, which, for example, may be configured or designed to facilitate, initiate and/or perform one or more of the following operation(s)/action(s) (or combinations thereof): Provide interfaces to, and manage database(s) for the purpose of storing, editing and distributing media and material relating to the identity of a Venue, including but not limited to Calendar Information, Photographs, Video Links, Descriptions, Tags, Locations, Social Networks and Website. Once authenticated, Venues may easily edit their own information, and access statistics and analytics associated with their account from a central dashboard.

Ticketing Reservation and Purchasing System(s) (TRPS) 220, which, for example, may be configured or designed to facilitate, initiate and/or perform activities/operations relating to reservation and/or purchasing of tickets to events such as live performances at one or more venues.

According to different embodiments, at least some MMMS System(s) may be configured, designed, and/or operable to provide a number of different advantages and/or benefits and/or may be operable to initiate, and/or enable various different types of operations, functionalities, and/or features, such as, for example, one or more of the following (or combinations thereof):

"Shows Near" Geographic Location Stations Functionality

In at least one embodiment, MMMS System (also referred to herein as "MAGNIFI") users may create geographic location specific (e.g., "city specific") streaming radio stations playing artists with upcoming live performances within the geographic location (e.g., San Francisco) specified by the user. Additionally, users may specify other filtering criteria (either separately or in different combinations) such as, for example, one or more of the following (or combinations thereof):

Geographic proximity or "radius" filtering criteria (e.g. "within 15 miles of Paris" or "within 50 miles of Chicago").

Time/Date filtering criteria (e.g. "tonight," "this week," "next 2 weeks," "all dates" or "custom dates" wherein a user specifies a specific date range such as between July 15$^{th}$ and August 3$^{th}$);

"Genre" and/or "Tag" filtering criteria (e.g. folk, folk+rock, folk+rock but not experimental)

Venue specific filtering criteria (e.g., limit search results to events at The Fillmore (San Francisco) or The Great American Music Hall (San Francisco) or Yoshi's Jazz Club (Oakland)).

Artist/band specific filtering criteria (e.g., "The Cribs"; "STS9 or Mojomama"; etc.)

In at least one embodiment, when a user enters their filter criteria for a "Shows Near" Geographic Location search, MAGNIFI searches its database (and/or remote database(s)) and automatically and dynamically generates (e.g., in real-time) at least one streaming radio station which will play only songs from artists who match the criteria. For example, "Folk Rock but not Experimental Artists with upcoming live performances in the next 2 weeks within 50 miles of Chicago."

Venue(s) Stations Functionality

In at least one embodiment, MAGNIFI users may create "venue specific" streaming radio stations playing artists with upcoming live performances at one or more venues selected by the user. Users may also set "timeframe" filter criteria (e.g. "tonight," "this week," "next 2 weeks," "all dates" or "custom dates" wherein a user specifies a specific date range such as between July 15$^{th}$ and August 3$^{th}$). Users may also set "genre" filter criteria (e.g. "folk," or "folk+rock," or "folk+rock but not experimental"). When a user enters their filter criteria for a Venue(s) Station, MAGNIFI searches its database (and/or remote database(s)) and automatically and dynamically generates (e.g., in real-time) at least one streaming radio station playing only songs from artists who match the specified filter criteria. For example, using one or more MAGNIFI GUIs, a user may initiate a filtered search for "Folk Rock but not Experimental Artists with upcoming live performances at The Fillmore, Great American Music Hall and Café Du Nord between July 15$^{th}$ and August 3$^{rd}$." In response, MAGNIFI may search its database (and/or remote database(s)) and automatically and dynamically identify and display (e.g., in real-time) information relating to artists/bands and/or upcoming live performances which match the user specified filter criteria. Additionally, MAGNIFI may identify songs of artists/bands which match the user specified filter criteria, and dynamically generate a streaming radio station which includes only songs from the identified artists who match the user specified filter criteria.

Hometown/Neighborhood Stations Functionality

In at least one embodiment, MAGNIFI users may create "artist hometown/neighborhood" streaming radio stations which includes only those artists whose hometown or "home-hood" matches a city or neighborhood specified by the user. Users may also specify geographic proximity (e.g., "radius") filter criteria (e.g. "within 15 miles of Paris" or "within 50 miles of Chicago"); and/or may also specify "genre" filter criteria (e.g. "folk," or "folk+rock," or "folk+rock but not experimental"). When a user enters their filter criteria for a Hometown/Home-hood Station. MAGNIFI searches its database (and/or remote database(s)) and automatically and dynamically generates (e.g., in real-time) at least one streaming radio station for playing only songs by artists who match the criteria. For example, "Folk Rock but not Experimental Artists from within 5 miles of Moscow" or "Indie Singer-Songwriter but not Country Artists from the Lower East Side of New York City."

Artist/Show Recommendation Stations Functionality

In at least one embodiment, MAGNIFI users may enter the name of one or more artist(s)/band(s) (herein the "Target Artist(s)") to create "recommendation" stations, where the "recommendation criteria" for the station is based primarily on live performance and tour information, such as, for example, one or more of the following (or combinations thereof):

(1) other artists who have performed with the Target Artist(s) in the past.

(2) other artists who are scheduled to perform with the Target Artist(s) in the future.

(3) other artists who have performed at the same venue(s) and/or festival(s) that the Target Artist(s) has performed at in the past; and/or (4) other artists who are scheduled to perform in the future at the same venue(s) and/or festival(s) that the Target Artist(s) has performed at.

Additional "recommendation criteria" may include other filter criteria such as, for example, one or more of the following (or combinations thereof): other artists who have been "starred" by MAGNIFI users who have also starred the Target Artist(s); genre and tag cross-matching filter criteria (e.g., specified by the user); play count and popularity within the MAGNIFI System; geolocation based criteria (such as prioritizing other artists in the station based on upcoming concerts that are proximal to the listener); "similar artist" results which, for example, may be acquired from API calls to external databases (e.g. EchoNest, Last.FM); user created stations that include one or more of the Target Artist(s); etc.

Ticket Reservation Service Functionality

Venue Implementation: In at least one embodiment, the MMMS System may be configured or designed to provide ticketing reservation and purchasing functionality for enabling and/or facilitating users in performing activities/operations relating to reservation and/or purchasing of tickets to events such as live performances at one or more venues. For example, in at least one embodiment, the MMMS System may include a Ticketing Reservation/Purchase System ("TRPS") which may be configured or designed to automatically and/or dynamically identify event ticketing reservation/purchasing opportunities in advance of tickets going on sale to the public. In one embodiment, reservation and/or purchasing of tickets by MAGNIFI users may be facilitated by 3$^{rd}$ party system(s)/component(s). In at least one embodiment, at some point after the Initial Ticket On-Sale event (e.g., approximately 1-5 days after), the venue hosting the event (e.g., concert/show) would set the Reservation Allotment for how many reservations it would guarantee/allot for a specific concert. In one embodiment, to determine the Reservation Allotment, the venue may take their "Sellable Capacity" less "Anticipated Sales", and the remaining number may be the Anticipated Unsold Tickets ("AUTs"). For example, a venue with a Sellable Capacity of 500 and Anticipated Sales of 300 may be provided with 200 AUTs remaining. The TRPS would multiply the venue's AUT by a "super percent" multiplier (e.g., 100+%), thus creating the Reservation Allotment for the event. One reason for the super percentage multiplier is that not all reservations may be converted to a ticket purchase.

Customer Interaction: In at least one embodiment, once the Reservation Allotment is available in the TRPS, MAGNIFI users may be able to view a Concert Page for a particular event. On the Concert Page, the user may view (e.g., in real-time) information relating to the total number of tickets sold for that event and the number of reservations available. MAGNIFI users may be able to "buy now" for immediate ticket purchase and/or be able to make ticket reservations (e.g., for one or more persons). In one embodiment where MAGNIFI users may "star" particular venues, MAGNIFI users may receive an update when an event is scheduled at one of their starred venues, and by clicking on the update, they may be directed to the Concert Page for that event, where they may purchase tickets and/or make Reservations.

Making the Reservation: In at least one embodiment, when making the Reservation, the Reservation Host may be able to designate other MAGNIFI users (Reservation Recipients) to receive an "invitation to accept the Reservation." This message may be sent within MAGNIFI to Reservation Recipients. The Host and the Recipients may be provided with a window of time in which to convert their Reservations into Ticket purchases. Once the Host has received confirmation from Recipients of their intent to attend the show as a group (e.g., via MAGNIFI SMS, text message, phone call, in person, etc.), the Reservation Host may automatically handle the Ticket purchases on behalf of the Reservation Group.

Picking up Tickets purchased through TRPS: In at least one embodiment, the venue keeps track of tickets purchased through at least one Reservation Group in the TRPS. The Host of at least one Reservation Group is now "hosting" a "guest list" of attendees at the event. At least one member of the Reservation Group arrives at the venue, informs Will Call that they're on the Reservation Host's Guest List, presents ID, and receives their Ticket.

Reservation Incentives: In at least one embodiment, venues participating in the TRPS may be able to access their Venue Dashboard, select a particular event, and set any incentives/discounts it wants to offer for that event. The Reservation Host would then be eligible for deals as an incentive for buying AUTs in bulk, for example In at least one embodiment, MAGNIFI users who reserve or purchase their tickets via the MAGNIFI System may receive other types of promotional offers or benefits such as, for example:

Bulk Ticket Discount: By way of example, 5 tickets for the price of 4, with the discount spread across the price of one or more tickets, thus benefiting the Reservation Group. The venue is only getting income from 4 ticket sales, but the event will be attended by 5 persons who may generate other income for the venue while attending the show.

Promotional Offers: drink tickets, venue swag, VIP privileges, priority seat reservations, discount coupons, etc.

Future Show Discounts: Discounts on Ticket purchases for future shows at that venue, or at shows among various venues in a Venue Group.

Vendor Affiliate Discounts: Discounts at vendors/merchants in the same neighborhood as the venue.

Venue "Points": Redeemable by the Host at the venue at some later date for any of the above.

TRPS Monetization: Monetization of the TRPS may take one or more of the following forms (or combinations thereof): Per Ticket Fee; Per Order Fee; and/or Per Show Fee.

Example Models for Sponsorship Sales: (1) local/national sponsor underwrites one or more fees and is perceived as paying one or more convenience fees related to Tickets purchased through the TRPS for that event, in exchange for brand goodwill and/or user data provided by MAGNIFI; (2) local/national sponsor pays a flat fee per show to buy a relationship with a specific demographic and receives demographic specific user data from MAGNIFI; (3) local/national sponsor pays a flat fee per show and offers product giveaways and/or raffle entries for a contest.

Example "Reservation" Definitions: (1) a socially broadcast interest in attending a particular event (e.g., a "like" for an event that others may see), and then helping that general interest culminate in a tipping point where everyone wants to convert their Reservation into Ticket Buys to be guaranteed admission; (2) an option to purchase a Ticket; (3) an opportunity for an individual to get a group of people to buy multiple tickets, and by doing so, the organizer (host) receives something of value from the venue; (4) a discrete unit of the allocation of Anticipated Unsold Tickets multiplied by a super-percentage (100+%)

According to different embodiments, a reservation window may close the sooner of (1) x days before the event or (2) X % of Tickets sold. Alternatively, X days after the Reservation is made, but no later than X days before the event.

Example Benefits/Advantages of MMMS System TRPS: Various benefits/advantages of the MMMS System TRPS may include, for example the limited quantity of Reservations; the limited time window in which to convert Reservations into Ticket Buys; and/or the social broadcast nature of the Reservation (allowing one or more MAGNIFI users to see the status of one or more Reservations for a given show at any time.

Functionality for Display of Relevant Gigs on a Per-User Geo-Location Basis

In at least one embodiment, when a MAGNIFI station is created, information relating to the station may be displayed or presented to the user via a Pop-Out Player GUI which may include one or more of the following types of content and/or features (or combinations thereof):

Venue Station: if the station created is venue-specific, then the first concert date displayed for at least one artist in that station matches the concert scheduled to occur at the venue(s) selected in the user's search criteria.

Geographic proximity—if the station created is not venue-specific, and an artist in the station has an upcoming concert within a predetermined radius (e.g., 200 miles) of user's location (as determined by geo-locating the user's IP address or user's mobile device, for example), then that concert within 200 miles of the user is the first displayed concert.

Chronologically: if the station created is not venue-specific, and an artist in the station does not have an upcoming concert within the predetermined radius (e.g., 200 miles) of user's location (e.g., as determined by geo-located the user's IP Address or user's mobile device), then the concert that is occurring next chronologically is the first displayed concert.

Stations Map Overlay Functionality

In at least one embodiment, information relating to any given station created on MAGNIFI may be selectively displayed according to the user's viewing preferences, such as, for example: "List View" (e.g., FIG. 11), "Tile View" (e.g., FIG. 12) or "Map View" (e.g., FIG. 13). In one embodiment, when a genre and/or hometown station is viewed in map view, at least one artist's hometown is plotted on a map (e.g., using "guitar pick" icons to indicate the location(s) on the displayed map), and a number inside the guitar pick indicating how many artists matching the search reside in that location (see, e.g., FIG. 13). When a MAGNIFI Station for "shows near" city/neighborhood or one or more venues is created, the guitar pick icons indicate venue locations where a concert that matches the search criteria may take place, and the number inside the guitar pick indicate how many artists matching the search may perform at that venue. In either instance (hometown/genre stations or "shows near" city/venue stations), clicking on a displayed icon may open a small window listing the artists matching the overall search criteria who are located (or who have upcoming concerts located) in or near the location indicated by the corresponding selected icon. In at least one embodiment, each of the List View, Tile View, and Map View GUIs may also include a "Play Station" button which enables a user to create a new station which is automatically configured to play only songs from the artists displayed in the current window/GUI (and, in some embodiments, related artists as well).

For example, creating a MAGNIFI Station of rock bands (without indicating a specific location) may include all rock bands on MAGNIFI. The map view may initially only display rock bands within a certain radius of the user's IP Address or user's mobile device. The user may then zoom out to see one or more MAGNIFI rock bands across the world, as indicated by guitar picks for at least one location. Clicking on a guitar pick over London, England, may reload the map view to focus only on London. Clicking on the guitar pick over London may open a window listing one or more the London rock bands. The user may then click the play button to hear only rock bands from London. This same example may be used for a "hometown" only station (e.g., indicating a search for one or more bands from a specific city or town) or a hybrid hometown/genre station (e.g., indicating a search for one or more bands of a specific genre (or genres) from a specific city or town).

For example, creating a MAGNIFI Station of rock bands with upcoming shows within 100 miles of Amsterdam, Netherlands, when viewed in map view, may display one or more MAGNIFI rock bands with upcoming shows in this radius around Amsterdam. In one embodiment, at least a portion of the displayed icons on the map may represent or indicate venues where one or more of the show(s) (matching the filtered search criteria) are to take place. In at least one embodiment, one or more displayed icons may each display a numerical value indicating the number of upcoming shows at that particular venue for which ticket reservations/purchases are currently available. In one embodiment, clicking on an icon may cause a Venue Info GUI to be displayed which includes information about one or more bands matching the search criteria at that particular venue. In one embodiment, a user may click a "Play" button displayed in the Venue Info GUI to dynamically generate a MAGNIFI Station playing only those bands at that venue.

Gig Sharing (User-to-User) Functionality

In at least one embodiment, a user may select a particular concert/event from an artist's upcoming calendar, and share the event information (e.g., date, artists performing, location, ticket price, ticket purchase information, etc.) as well as content associated with the performing artists (e.g., audio recordings, photos, biographical information, website links, Facebook URLs, Twitter URLs, etc.) directly with other MAGNIFI users (e.g., via MAGNIFI's Mobile Applications and web applications), and associate a personal message from the sharer with the information shared. This would present an opportunity for the "sharer" and the "sharee(s)" to express their interest in attending the show together, whether by making plans offline or purchasing tickets online, including via the MAGNIFI Ticket Reservation Service.

Social Blogging Functionality

By embedding the MAGNIFI BloggerTool javascript in the <head> of their HTML pages, website operators may use MAGNIFI to provide playable links next to the textual mention of any Artist Name that currently has music available for public streaming on MAGNIFI. Clicking on a play link may launch the MAGNIFI Pop-Out Player that may either play the single artist that was clicked on, or a MAGNIFI Station comprising one or more artists (including the selected artist) with MAGNIFI music on that web page. A single web page may include multiple instances of the MAGNIFI BloggerTool.

Play Traction Heat Map Functionality

In at least one embodiment, artists may view an interactive world map overlaid with "heat zones" indicating where and to what degree listeners have been streaming that artist's music. Artists may interact with a Play Traction Heat Map GUI to change views and/or filter criteria to view mobile plays, website plays, or both combined. In at least one embodiment, the Play Traction Heat Map Functionality may also be operable to enable the artist to further hone this map to a specific album or track.

Artist/Band Tweet@Functionality

In at least one embodiment, if an artist has provided their Twitter handle in their MAGNIFI artist profile, then, when a MAGNIFI listener is streaming an artist's recording on the MAGNIFI Mobile Application, with 1-click the user may send a Twitter message ("tweet") directly at the artist's Twitter handle, with an automatically generated (or personalized) comment and a link to the artist's MAGNIFI station. Any Twitter user who "follows" the MAGNIFI user sending the tweet, who follows the artist on Twitter or who follows MAGNIFI on Twitter may see the tweet in their "feed." Any Twitter user who clicks on the link for the artist's station may view the artist's upcoming concert dates. In one embodiment, the first date displayed may be presented per the algorithm described in the "Display of Relevant Gigs on a Per User Geo-Location Basis" section.

Auto-Magic Blog Functionality

In at least one embodiment, any MAGNIFI City/Neighborhood/Venue "Shows Near" or "Bands From" station may include a more comprehensive display of related content via that station's own unique, automatically updating website (or GUI or webpage). The station's own unique, automated content updating website may be referred to as the "AutoMagic Blog." In one embodiment of the AutoMagic Blog, the MAGNIFI user responsible for owning or managing the station/blog would receive their own unique Twitter handle for that station/blog (e.g. @drfm_oakland). Information and/or other content which may be displayed at the AutoMagic Blog may include, but are not limited to, one or more of the following (or combinations thereof):

A map showing the specified radius for the station.

The station's venue and/or artist search results overlaid on that map, with associated playable links.

The station's search results of artists and concerts presented in list form.

Artist profiles of at least one artist in the search results.

A MAGNIFI embedded player which plays the search results for that station.

A customized "outgoing" twitter feed of one or more tweets from the blog's owner;

A customized "incoming" twitter feed representing a real time search of one or more tweets by twitter users who include in their tweet a hashtag for the blog (e.g. #drfm_oakland). In at least one embodiment, the Blog's owner may "re-tweet" (e.g., from the owner's official Blog handle) any tweets containing the hashtag, thus creating a method for Twitter users to tweet comments and a method for the Blog owner to officially recognize those comments by retweeting them.

A "PLAY" button for the outgoing Twitter feed that uses technology to "scrape" any MAGNIFI station links, allowing at least one tweet to be played as a MAGNIFI Station, or one or more tweets in the feed to be played as a separate station.

A "PLAY" button for the incoming Twitter feed that uses technology to scrape any MAGNIFI station links, allowing at least one tweet to be played as a MAGNIFI Station, or one or more tweets in the feed to be played as a separate station.

Editorial content related to the artists and venues currently displayed, either linked in from outside websites or created within the Blog itself by the Blog owner;

Etc.

Track-Level Control Slider Functionality

In at least one embodiment, when an artist uploads audio recordings to MAGNIFI, the "Track-Level Control Slider" gives them fine-grain control over how their recordings are made available and promoted across the internet, based on a "promotional sliding scale" that increases by degree of public availability. In at least one embodiment, the Track-Level Control Slider GUI may be configured or designed to enable a user to assign one or more separately definable access and/or usage attributes to each of the Artist's recordings (e.g., which have been uploaded to the MAGNIFI System). Examples of such access and/or usage control attributes may include, but are not limited to, one or more of the following (or combinations thereof):

For Sale Only: Tracks marked as "for sale only" are not streamable anywhere on MAGNIFI, but downloads may be purchased on the artist's MAGNIFI profile page by listeners.

Profile Only: Tracks marked as "profile only" are streamable only on the artist's MAGNIFI profile page via the Pop-Out Player (which may also be embedded elsewhere on the internet), but these tracks may not be included in the pool of tracks available for stations created by MAGNIFI users and stations automatically generated by MAGNIFI.

Radio Enabled: Tracks marked as "radio enabled" may be streamable on the artist's MAGNIFI profile page via the Pop-Out Player, and may also be included in the pool of tracks available for stations created by MAGNIFI users and automatically generated by MAGNIFI.

Radio Preferred: Same as Radio Enabled, but "Radio Preferred" tracks may be played first when this artist appears in a MAGNIFI station.

Free Download: This checkbox may be applied to any track, and may allow the free, promotional download of the marked track. Free downloads are only available on the artist's MAGNIFI profile page.

Functionality for Targeted Promotion of Stations on the MAGNIFI Website, Based on User Location In at least one embodiment, the MAGNIFI homepage may be comprised in part of a "mosaic" of image "tiles", wherein each tile may depict a MAGNIFI station selected for promotion on the homepage, including but not limited to one or more of the following (or combinations thereof): festival stations, venue stations, record label stations, artist stations, etc. These promotional mosaic tiles may be "tagged" in the MAGNIFI System as being associated with a specific geographic region or regions. For example, a festival taking place in New York may be tagged as being associated with the eastern coast of the United States. When a user arrives at the MAGNIFI homepage, the user may be geo-located based on their IP Address or user's mobile device, and the MAGNIFI homepage promotional mosaic tiles may be automatically and dynamically selected (e.g., in real-time) based on that user's location, such that the promotional mosaic tiles the user sees on the homepage may be directly geo-targeted to each individual user. For example, the MAGNIFI System may determine a first user's geolocation as being Paris, France, and in response, the MAGNIFI System may display to the user only promotional mosaic tiles associated with the geographic region(s) in and around Paris. In contrast, the MAGNIFI System may determine a second user's geolocation as being San Francisco, Calif., and may display to the second user only promotional mosaic tiles associated with the geographic region(s) in and around San Francisco, Calif.

Share a Gig Functionality

Compatible with the conventional ways to share content between users and among existing social networks (e.g., Facebook, Twitter, etc.), a MAGNIFI user may select a particular show or event from an artist's upcoming tour calendar, and share that show/event via the MAGNIFI mobile and web apps. This would mark a user's interest in that particular show, which may be visible to other users of the MAGNIFI System, and may present an opportunity to other MAGNIFI users to express their interest in the identified show/event.

Venue Check-In Functionality

In at least one embodiment, mobile device users may use the MAGNIFI Mobile Application to "Check-In" at a show or event. For example, in one embodiment, by accessing one or more databases relating to events, shows, and/or tour dates (e.g., including, for example, MAGNIFI tour date archive database), and using the geolocation services/functionality at the user's mobile device (at least a portion of which may be provided by the MAGNIFI Mobile Application), the venue check-in process may be streamlined considerably as compared to more traditional methods of check-in. In at least one embodiment, the MAGNIFI Mobile Application may be configured or designed to include functionality for facilitating user "Check-In" activities at a given venue & event. After completing a check-in activity at a given location, the user may be granted (e.g., via the MAGNIFI Mobile Application and/or MAGNIFI website) access to additional functionality, promotional opportunities, and/or rewards, such as, for example, one or more of the following (or combinations thereof):

Join the venue email list;

Vote for upcoming shows (e.g., at that venue);

Access current band's info, twitter, Facebook, merchandise and email list signups.

Incentives for discounted drinks and/or merchandise;

receive information or notification about friends or other MAGNIFI users who will be attending one or more show(s) at the venue and/or who have already check-in at the venue for the current show;

Send photos to band and/or MAGNIFI Band/Artist webpage or blog;

Integrate with additional "check-in" services;

Earn points for social activity which may be later redeemed by the user for promotional rewards, incentives, etc.

Embedded Players and Extended Functionality

In at least one embodiment, the MAGNIFI System technology disclosed herein provides capability for any MAGNIFI Station, Album, or Artist to be embedded in any webpage on the World Wide Web, using an <iframe> tag and HTML5 code, for example. The user may customize the appearance of the embedded player prior to receiving the code. The user may customize: color scheme & width of the player, along with choosing the visibility of tour dates, photos, & station title. In one embodiment, when an embedded player is first loaded, it will cycle through the artists in the station in a random order, displaying one highlighted gig according to certain criteria. This first displayed tour date is chosen with regards to the 'closest upcoming show' in geographic proximity, based on the geolocation of the user (e.g., via user's IP address or via geolocation of users mobile device). If a MAGNIFI Station has been created based on specific 'Venue Criteria', the highlighted date(s) will be the upcoming date(s) that occurs at one of the specified venue(s).

In some embodiments, the Embedded Players and Extended Functionality may include the ability for a venue to embed a complete concert calendar which may include listings for bands that aren't currently members of MAGNIFI and/or which may include bands which are not currently in the MAGNIFI database. Concert calendars may be accompanied by additional GUI features/buttons in the embedded window for enabling features such as, for example, one or more of the following (or combinations thereof): genre and date range selectors, multiple stages or associated venues, social sharing tools, etc.

In at least one embodiment, Track and Album embeds may be accompanied by corresponding track list(s), with additional GUI features/buttons in the embedded window for enabling features such as, for example, one or more of the following (or combinations thereof): downloading the tracks, social sharing tools, favoriting/liking/following controls, purchase options, links to external sites for purchase/download, etc.

In one embodiment, a user may choose to customize and embed a button (e.g., via a <script> tag) that creates a button on an external web page that immediately triggers a pop-up window containing just the MAGNIFI player for that Station, Artist or Track. The Embedded Players and Extended Functionality may include is functionality for the embedded player to cycle through the photos of bands in the embedded station, even if the visitor to the website where the player is embedded has not tapped or clicked on the "PLAY" button. In at least one embodiment, this may result in the display of an automatically and/or dynamically generated "slideshow" of images of the artist(s) associated with that particular station.

EXAMPLES

The following examples are intended to help illustrate some of the various types of functions, operations, actions, and/or other features which may be provided by the MMMS System. By way of example, described below are some examples of "Stations" that may be created, named, saved, shared and listened to in real-time via the MMMS System, by adjusting the intuitive filters that appear in the various GUIs presented by the MMMS System.

(1) A MAGNIFI Station comprised of songs by indie rock bands (or any other genre) that are playing shows within 10 miles San Francisco this Saturday night.

While the collection of songs is being streamed to the user's computer or mobile device, a photo slide-show of the current Artist is simultaneously streamed and rotated on the listeners browser or mobile device.

Date and location of upcoming show nearby is displayed next to current Artist and track information.

In many urban areas, fans have the opportunity to see dozens of shows on any given night. By creating this station, they may be able to hear a selection of songs relating only to those Artists who have been identified as playing upcoming shows within 10 miles San Francisco within the specified time period.

Stations may be shared with friends on Facebook, twitter or any other social media sites, instantly.

(2) A MAGNIFI Station comprised of bands from a high school, college, hometown, or any other geographical grouping.

In at least one embodiment, the MMMS System may include functionality for enabling the user to post a link to a selected MAGNIFI Station on Facebook or social networks. From there, one or more the user's friends may view the post/link, and may instantly listen to the MAGNIFI Station by clicking on the link (for example). In at least one embodiment, the user's social networking friends and/or other MAGNIFI users may be able to chat with the user (or with others) via a chat GUI which may be incorporated into the associated MAGNIFI Station web page. According to different embodiments, MAGNIFI Station chat functionality may be selectively enabled and/or disabled by the creator/owner of that MAGNIFI Station.

(3) A MAGNIFI Station comprised of choir music from choirs based in and around Oakland, Calif.

Very many choir groups exist nationwide, and most of them make recordings which are difficult to promote and share publically.

A MAGNIFI 'Oakland Choir Radio' Station may be dynamically created by the MMMS System and may be made to be publically accessible a variety of different groups such as, for example, one or more of the following (or combinations thereof): users/members of the MMMS System; social network friends and family; anyone who is able to obtain the URL to the MAGNIFI Oakland Choir Radio Station (e.g., by doing a Google search, for example).

(4) A MAGNIFI Station comprised of California high school bands that rank in the top 100 "most popular", "most listened to", etc.

Rankings may be generated and/or updated manually, automatically, and/or programmatically via data gathered from statistics and analytics relating to artist and user actions, such as 'track play count', 'page views', 'MMMS player spins', most starred, 'band preferred', upcoming tour dates, etc.

(5) A MAGNIFI Station of US serviceman rock bands (stationed anywhere in the world.)

May be active members only, or active and retired.

May be genre agnostic; for instance, it may be rap-specific, reggae, etc.

Example MAGNIFI Station: One or more 'Southern Rock' groups, currently stationed in Iraq.

(6) A MAGNIFI Station comprised of bands made up of workers at Safeway supermarkets
- Once a MAGNIFI Safeway Station was created, bands that want to be included in this station may send requests to the station owner asking to be added.
- Stations may be earmarked as "closed" or "open" to non-owner manipulation of content.
- Corporations may find this a healthy morale building enterprise, and may even promote it actively as such.

(7) A MAGNIFI Station comprised of bands playing upcoming shows at a SPECIFIC VENUE.
- A lot of music fans have a favorite venue(s).
- The songs and artists associated with the Station may be automatically, dynamically and/or periodically updated so that it may be kept current with the upcoming events, shows, artists, song popularity, etc.
- Venues may post links to their MAGNIFI Station on their web sites, and send links to their MAGNIFI Station out to recipients on the venue mailing list.
- In at least one embodiment, the content streamed by the MAGNIFI Venue Station may automatically and periodically be updated (e.g., "Always Be Current"). In one embodiment, the Station owner (e.g., which may be the venue's agent) may manually update MAGNIFI's database of upcoming shows and events that particular venue. In other embodiments, the MMMS System may automatically and periodically access updated venue-specific event/date/artist information from one or more remote databases and APIs such as, for example, those provided by, Songkick, Last FM, etc.
- One significant advantage/benefit of the customized MAGNIFI Venue Station is that it facilitates and provides the ability for end users and customers to easily access, learn about, explore, and listen to music from bands/artists who will be performing (and/or who have performed) at a given venue. Venues may advantageously leverage the features and advantages by embedding their customized, venue-specific MAGNIFI Station in the home page (or other web pages) of the venue's website.
- Another significant advantage/benefit customized MAGNIFI Venue Station is that it allows the venue to offload the tasks of managing, uploading, and updating the venue's website with new music relating to the artists of upcoming shows. For example, in one embodiment, when the venue books an upcoming show with a given artist, the venue may simply instruct the artist to upload one or more of the artist's song(s) and/or album(s) to the MAGNIFI System. In at least one embodiment, the MAGNIFI System may include functionality for automatically monitoring newly uploaded content, and cross checking the identified content with other resources in order to automatically link selected portions of the newly uploaded content with selected MAGNIFI Stations.

In at least one embodiment, the MMMS System may be configured or designed to automatically identify various types of criteria (e.g., song, artist, album, video, venue, user location, artist location, etc.) relating to content being displayed to a user as the user accesses the MAGNIFI website and/or MAGNIFI Mobile Application.

In at least one embodiment, one or more GUIs may be displayed to the user to facilitate operation and/or initiation of the various features and functions disclosed herein. According to different embodiments, the GUIs may be implemented via use of a web browser application, a mobile device application, a desktop application, a cloud-based service, etc. In at least one embodiment, a User Web Interface may provide functionality for dynamically generating at least a portion of the GUIs.

As illustrated in the example embodiment of FIG. 2, the MMMS System may include one or more databases (e.g. 240, FIG. 2), which, for example, may be populated with information and/or content relating to music, videos, venues, events, merchants, merchandise, artists, user profile information, user activity information, radio station information, etc.

In at least one embodiment, one or more of the databases may be queried via the use of various types of programming languages and/or protocols such as, for example, one or more of the following (or combinations thereof): HTML, XML, My SQL, Perl, Ajax, JavaScript, Etc.

In at least one embodiment, a user may initiate a MMMS session via the Internet (e.g., via 240, FIG. 2) to cause the MMMS System to perform and/or initiate various functions and operations (such as those described and/or referenced herein), according to user-specified criteria.

In at least one embodiment, the MMMS System may be operable to populate and/or access information at Database(s) 214, and utilize such information in order to identify and/or determine artist information and/or music content according to user-specified criteria. Examples of such database information may include, but are not limited to, one or more of the following (or combinations thereof):
- artist profile criteria, including, but not limited to artist rating, artist feedback, etc.
- artist location information;
- music genre information;
- venue information;
- artist event performance information and related venue information;
- ticketing information;
- geographical information relating to artists, events, venues, users, etc.
- calendar information relating to artist performances, venue events, etc.
- negative filter criteria;
- music streaming services;
- Artist criteria;
- Similarity to other artists
- Brand-related criteria such as, for example, branding information related to (or associated with) one or more of the following (or combinations thereof): Song; Artist; Team; Celebrity; Album; Venue; Trademarks; Corporate Identities; Content owners; Publisher; Author; Distributor; Digital Content Criteria; Etc.

Various embodiments disclosed herein may be configured, designed, or otherwise operable to initiate, perform and/or provide different types of advantages, benefits and/or other features such as, for example, one or more advantages and/or benefits described and/or referenced herein.

For example, in at least one embodiment, the MMMS System functionality may be operable to perform and/or implement various types of functions, operations, actions, and/or other features such as, for example, one or more of the following (or combinations thereof):
- Monitor user behaviors and activities;
- Identify brand-related information associated with user-accessible content that the user is accessing; has requested access to; and/or has interest in;
- Identify songs and/or artists based on specified criteria;
- Manage and track revenue sharing;
- Manage reporting;
- Transact online ordering and purchasing;

Transact Database queries/responses
Acquire and manage artist-related music content and other artist-related information;
Manage artist subscription services;
Create user customized music streaming stations, e.g., based on user-specified filter criteria;
Acquire and manage artist performance event and related venue information;
Provide query disambiguation;
Provide input correction/suggestion functionality such as, for example, normalization of brand name, brand identity and/or other searchable criteria amongst misspelled and/or other spelling variations;
Facilitate artist profile management and user subscriptions;
Manage and track songs and/or other media content which has been streamed to user(s);
Etc.

According to specific embodiments, multiple instances or threads of the MMMS System functionality may be concurrently implemented and/or initiated via the use of one or more processors and/or other combinations of hardware and/or hardware and software. For example, in at least some embodiments, various aspects, features, and/or functionalities of the MMMS System mechanism(s) may be performed, implemented and/or initiated by one or more of the various systems, components, systems, devices, procedures, and/or processes described herein.

According to different embodiments, one or more different threads or instances of the MMMS System functionality may be initiated in response to detection of one or more conditions or events satisfying one or more different types of minimum threshold criteria for triggering initiation of at least one instance of the MMMS System functionality. Various examples of conditions or events which may trigger initiation and/or implementation of one or more different threads or instances of the MMMS System functionality may include, but are not limited to, one or more of the following (or combinations thereof):
 Detection of user interest in particular artist, brand, genre, geographic location and/or other criteria
 Identification of user;
 Identification of music content matching specified criteria;
 Detection of user input;
 Identification of artist performance event(s) matching specified criteria;
 Detection of artist input;
 Identification of artist performance event(s);
 Identification of user's geographic location;
 Determination of revenue sharing distributions;
 Receiving database query communication from external server;
 Etc.

In at least one embodiment, a given instance of the MMMS System functionality may access and/or utilize information from one or more associated databases. In at least one embodiment, at least a portion of the database information may be accessed via communication with one or more local and/or remote memory devices. Examples of different types of data which may be accessed by the MMMS System functionality may include, but are not limited to, one or more of the following (or combinations thereof):
 Brand-related information;
 User behavior and analytic information;
 Performance information;
 Artist information;
 Venue Information;
 Artist performance event information;
 Geographic location information (e.g., relating to artist performances, events, user location, artist origination, venues, etc.)
 Brand related taxonomy information;
 Artist subscription information;
 Ecommerce related transaction information;
 Publisher/Content Provider information;
 User profile information;
 Artist profile information;
 Music inventory information;
 Artist-brand association information;
 etc.

It may be appreciated that the various embodiments of the MMMS Systems disclosed herein are but a few examples from a wide range of MMMS System embodiments which may be implemented. Other embodiments of the MMMS System (not shown) may include additional, fewer and/or different components/features that those illustrated and described herein.

Figure 3:
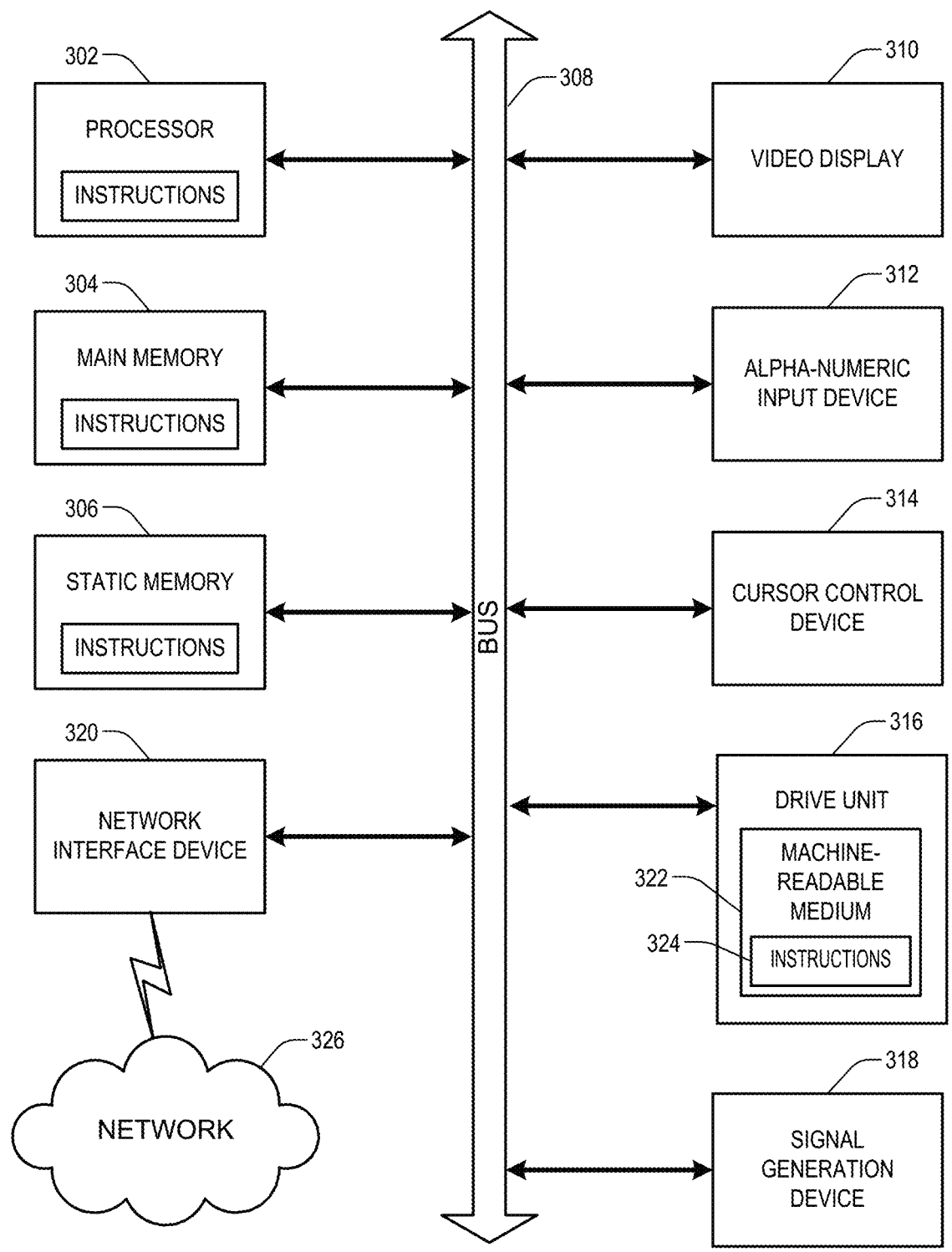
FIG. 3 shows a diagrammatic representation of machine in the exemplary form of a client (or end user) computer system 300.

FIG. 3 shows a diagrammatic representation of machine in the exemplary form of a client (or end user) computer system 300 within which a set of instructions, for causing the machine to perform any one or more of the methodologies discussed herein, may be executed. In alternative embodiments, the machine operates as a standalone device or may be connected (e.g., networked) to other machines. In a networked deployment, the machine may operate in the capacity of a server or a client machine in server-client network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a network router, switch or bridge, or any machine capable of executing a set of instructions (sequential or otherwise) that specify actions to be taken by that machine. Further, while only a single machine is illustrated, the term "machine" may also be taken to include any collection of machines that individually or jointly execute a set (or multiple sets) of instructions to perform any one or more of the methodologies discussed herein.

The exemplary computer system 300 includes a processor 302 (e.g., a central processing unit (CPU), a graphics processing unit (GPU) or both), a main memory 304 and a static memory 306, which communicate with at least one other via a bus 308. The computer system 300 may further include a video display unit 310 (e.g., a liquid crystal display (LCD) or a cathode ray tube (CRT)). The computer system 300 also includes an alphanumeric input device 312 (e.g., a keyboard), a user interface (UI) navigation device 314 (e.g., a mouse), a disk drive unit 316, a signal generation device 318 (e.g., a speaker) and a network interface device 320.

The disk drive unit 316 includes a machine-readable medium 322 on which is stored one or more sets of instructions and data structures (e.g., software 324) embodying or utilized by any one or more of the methodologies or functions described herein. The software 324 may also reside, completely or at least partially, within the main memory 304 and/or within the processor 302 during execution thereof by the computer system 300, the main memory 304 and the processor 302 also constituting machine-readable media.

The software 324 may further be transmitted or received over a network 326 via the network interface device 320 utilizing any one of a number of well-known transfer protocols (e.g., HTTP).

While the machine-readable medium 322 is shown in an exemplary embodiment to be a single medium, the term "machine-readable medium" may be taken to include a single medium or multiple media (e.g., a centralized or distributed database, and/or associated caches and servers) that store the one or more sets of instructions. The term "machine-readable medium" may also be taken to include any medium that is capable of storing, encoding or carrying a set of instructions for execution by the machine and that cause the machine to perform any one or more of the methodologies of the present invention, or that is capable of storing, encoding or carrying data structures utilized by or associated with such a set of instructions. The term "machine-readable medium" may accordingly be taken to include, but not be limited to, solid-state memories, optical and magnetic media, and carrier wave signals. Although an embodiment of the present invention has been described with reference to specific exemplary embodiments, it may be evident that various modifications and changes may be made to these embodiments without departing from the broader spirit and scope of the invention. Accordingly, the specification and drawings are to be regarded in an illustrative rather than a restrictive sense.

According to various embodiments, Client Computer System 300 may include a variety of components, modules and/or systems for providing various types of functionality. For example, in at least one embodiment, Client Computer System 300 may include a web browser application which is operable to process, execute, and/or support the use of scripts (e.g., JavaScript, AJAX, etc.), Plug-ins, executable code, virtual machines, vector-based web animation (e.g., Adobe Flash), etc.

In at least one embodiment, the web browser application may be configured or designed to instantiate components and/or objects at the Client Computer System in response to processing scripts, instructions, and/or other information received from a remote server such as a web server. Examples of such components and/or objects may include, but are not limited to, one or more of the following (or combinations thereof):

- User Interface (UI) Components such as those illustrated, described, and/or referenced herein.
- Database Components such as those illustrated, described, and/or referenced herein.
- Processing Components such as those illustrated, described, and/or referenced herein.
- Other Components which, for example, may include components for facilitating and/or enabling the Client Computer System to perform and/or initiate various types of operations, activities, functions such as those described herein.

Figure 4:
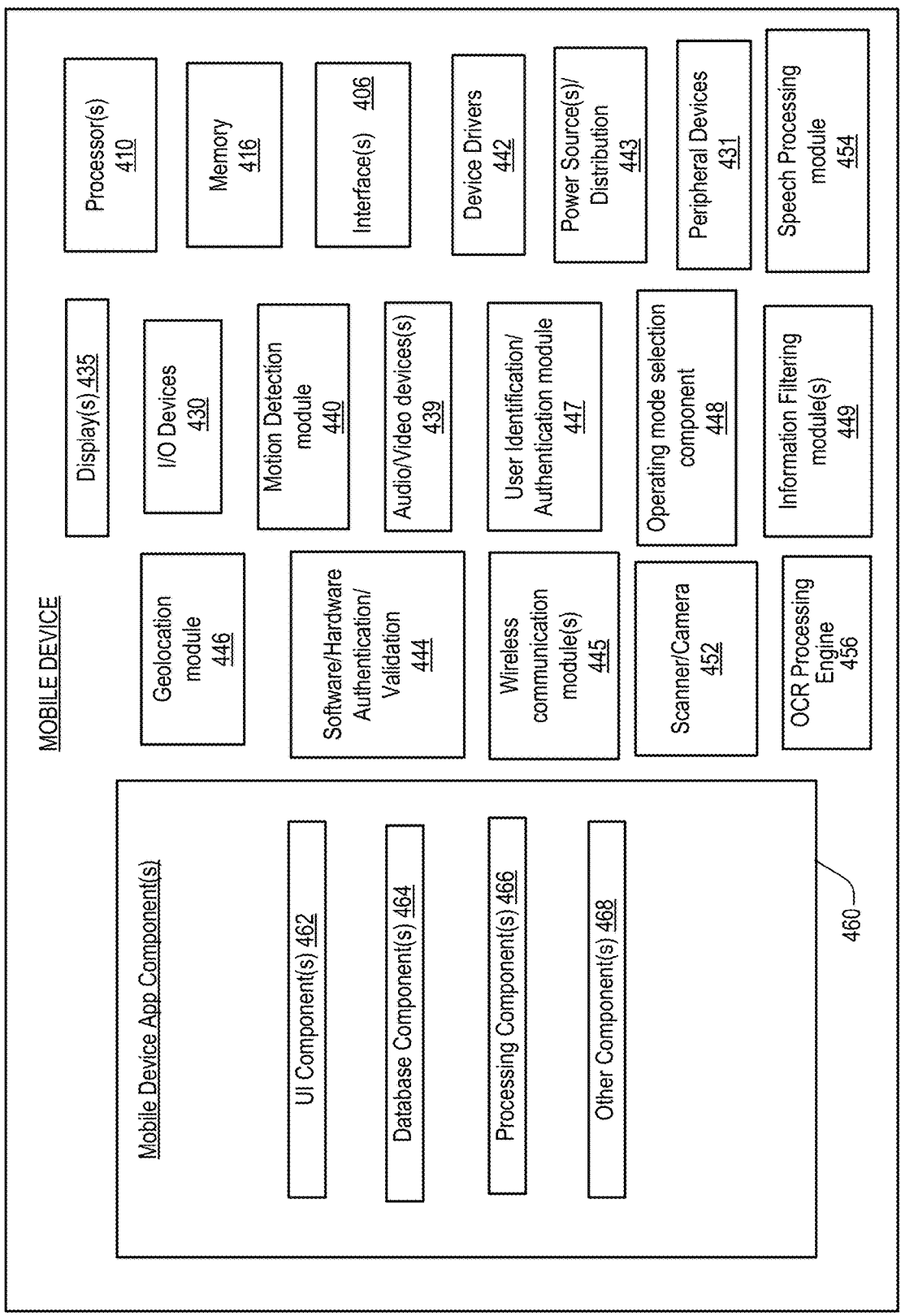
FIG. 4 is a simplified block diagram of an exemplary client system 400 in accordance with a specific embodiment.

FIG. 4 is a simplified block diagram of an exemplary client system 400 in accordance with a specific embodiment. In at least one embodiment, the client system may include MMMS Mobile Device App Component(s) which have been configured or designed to provide functionality for enabling or implementing at least a portion of the various MMMS techniques at the client system.

According to specific embodiments, various aspects, features, and/or functionalities of the Mobile Device may be performed, implemented and/or initiated by one or more of the following types of systems, components, systems, devices, procedures, processes, etc. (or combinations thereof):

- Processor(s) 410
- Device Drivers 442
- Memory 416
- Interface(s) 406
- Power Source(s)/Distribution 443
- Geolocation module 446
- Display(s) 435
- I/O Devices 430
- Audio/Video devices(s) 439
- Peripheral Devices 431
- Motion Detection module 440
- User Identification/Authentication module 447
- Client App Component(s) 460
- Other Component(s) 468
- UI Component(s) 462
- Database Component(s) 464
- Processing Component(s) 466
- Software/Hardware Authentication/Validation 444
- Wireless communication module(s) 445
- Information Filtering module(s) 449
- Operating mode selection component 448
- Speech Processing module 454
- Scanner/Camera 452
- OCR Processing Engine 456
- etc.

As illustrated in the example of FIG. 4 Mobile Device 400 may include a variety of components, modules and/or systems for providing various functionality. For example, as illustrated in FIG. 4, Mobile Device 400 may include Mobile Device Application components (e.g., 460), which, for example, may include, but are not limited to, one or more of the following (or combinations thereof):

- UI Components 462 such as those illustrated, described, and/or referenced herein.
- Database Components 464 such as those illustrated, described, and/or referenced herein.
- Processing Components 466 such as those illustrated, described, and/or referenced herein.
- Other Components 468 which, for example, may include components for facilitating and/or enabling the Mobile Device to perform and/or initiate various types of operations, activities, functions such as those described herein.

In at least one embodiment, the Mobile Device Application component(s) may be operable to perform and/or implement various types of functions, operations, actions, and/or other features such as, for example, one or more of those described or referenced herein.

According to specific embodiments, multiple instances or threads of the Mobile Device Application component(s) may be concurrently implemented and/or initiated via the use of one or more processors and/or other combinations of hardware and/or hardware and software. For example, in at least some embodiments, various aspects, features, and/or functionalities of the Mobile Device Application component(s) may be performed, implemented and/or initiated by one or more systems, components, systems, devices, procedures, processes, such as, for example, one or more of those described or referenced herein.

According to different embodiments, one or more different threads or instances of the Mobile Device Application component(s) may be initiated in response to detection of one or more conditions or events satisfying one or more different types of minimum threshold criteria for triggering initiation of at least one instance of the Mobile Device Application component(s). Various examples of conditions or events which may trigger initiation and/or implementation of one or more different threads or instances of the Mobile Device Application component(s) may include, but are not limited to, one or more of those described or referenced herein.

In at least one embodiment, a given instance of the Mobile Device Application component(s) may access and/or utilize information from one or more associated databases. In at least one embodiment, at least a portion of the database information may be accessed via communication with one or more local and/or remote memory devices. Examples of different types of data which may be accessed by the Mobile Device Application component(s) may include, but are not limited to, one or more of those described or referenced herein.

According to different embodiments, Mobile Device 400 may further include, but is not limited to, one or more of the following types of components, modules and/or systems (or combinations thereof):

- At least one processor 410. In at least one embodiment, the processor(s) 410 may include one or more commonly known CPUs which are deployed in many of today's consumer electronic devices, such as, for example, CPUs or processors from the Motorola or Intel family of microprocessors, etc. In an alternative embodiment, at least one processor may be specially designed hardware for controlling the operations of the client system. In a specific embodiment, a memory (such as non-volatile RAM and/or ROM) also forms part of CPU. When acting under the control of appropriate software or firmware, the CPU may be responsible for implementing specific functions associated with the functions of a desired network device. The CPU preferably accomplishes one or more these functions under the control of software including an operating system, and any appropriate applications software.

- Memory 416, which, for example, may include volatile memory (e.g., RAM), non-volatile memory (e.g., disk memory, FLASH memory, EPROMs, etc.), unalterable memory, and/or other types of memory. In at least one implementation, the memory 416 may include functionality similar to at least a portion of functionality implemented by one or more commonly known memory devices such as those described herein and/or generally known to one having ordinary skill in the art. According to different embodiments, one or more memories or memory modules (e.g., memory blocks) may be configured or designed to store data, program instructions for the functional operations of the client system and/or other information relating to the functionality of the various MMMS techniques described herein. The program instructions may control the operation of an operating system and/or one or more applications, for example. The memory or memories may also be configured to store data structures, metadata, timecode synchronization information, audio/visual media content, asset file information, keyword taxonomy information, advertisement information, and/or information/data relating to other features/functions described herein. Because such information and program instructions may be employed to implement at least a portion of the MMMS techniques described herein, various aspects described herein may be implemented using machine readable media that include program instructions, state information, etc. Examples of machine-readable media include, but are not limited to, magnetic media such as hard disks, floppy disks, and magnetic tape; optical media such as CD-ROM disks; magneto-optical media such as floptical disks; and hardware devices that are specially configured to store and perform program instructions, such as read-only memory devices (ROM) and random access memory (RAM). Examples of program instructions include both machine code, such as produced by a compiler, and files containing higher level code that may be executed by the computer using an interpreter.

- Interface(s) 406 which, for example, may include wired interfaces and/or wireless interfaces. In at least one implementation, the interface(s) 406 may include functionality similar to at least a portion of functionality implemented by one or more computer system interfaces such as those described herein and/or generally known to one having ordinary skill in the art. For example, in at least one implementation, the wireless communication interface(s) may be configured or designed to communicate with selected electronic game tables, computer systems, remote servers, other wireless devices (e.g., PDAs, cell phones, player tracking transponders, etc.), etc. Such wireless communication may be implemented using one or more wireless interfaces/protocols such as, for example, 802.11 (WiFi), 802.15 (including Bluetooth™), 802.16 (Wi-Max), 802.22, Cellular standards such as CDMA, CDMA2000, WCDMA, Radio Frequency (e.g., RFID), Infrared, Near Field Magnetics, etc.

- Device driver(s) 442. In at least one implementation, the device driver(s) 442 may include functionality similar to at least a portion of functionality implemented by one or more computer system driver devices such as those described herein and/or generally known to one having ordinary skill in the art.

- At least one power source (and/or power distribution source) 443. In at least one implementation, the power source may include at least one mobile power source (e.g., battery) for allowing the client system to operate in a wireless and/or mobile environment. For example, in one implementation, the power source 443 may be implemented using a rechargeable, thin-film type battery. Further, in embodiments where it is desirable for the device to be flexible, the power source 443 may be designed to be flexible.

- Geolocation module 446 which, for example, may be configured or designed to acquire geolocation information from remote sources and use the acquired geolocation information to determine information relating to a relative and/or absolute position of the client system.

- Motion detection component 440 for detecting motion or movement of the client system and/or for detecting motion, movement, gestures and/or other input data from user. In at least one embodiment, the motion detection component 440 may include one or more motion detection sensors such as, for example, MEMS (Micro Electro Mechanical System) accelerometers, that may detect the acceleration and/or other movements of the client system as it is moved by a user.

- User Identification/Authentication module 447. In one implementation, the User Identification module may be adapted to determine and/or authenticate the identity of the current user or owner of the client system. For example, in one embodiment, the current user may be required to perform a log in process at the client system in order to access one or more features. Alternatively, the client system may be adapted to automatically determine the identity of the current user based upon one or more external signals such as, for example, an RFID tag or badge worn by the current user which provides a wireless signal to the client system for determining the identity of the current user. In at least one implementation, various security features may be incorporated into the client system to prevent unauthorized users from accessing confidential or sensitive information.

One or more display(s) 435. According to various embodiments, such display(s) may be implemented using, for example, LCD display technology, OLED display technology, and/or other types of conventional display technology. In at least one implementation, display(s) 435 may be adapted to be flexible or bendable. Additionally, in at least one embodiment the information displayed on display(s) 435 may utilize e-ink technology (such as that available from E Ink Corporation, Cambridge, Mass., www.eink.com), or other suitable technology for reducing the power consumption of information displayed on the display(s) 435.

One or more user I/O Device(s) 430 such as, for example, keys, buttons, scroll wheels, cursors, touchscreen sensors, audio command interfaces, magnetic strip reader, optical scanner, etc.

Audio/Video device(s) 439 such as, for example, components for displaying audio/visual media which, for example, may include cameras, speakers, microphones, media presentation components, wireless transmitter/receiver devices for enabling wireless audio and/or visual communication between the client system 400 and remote devices (e.g., radios, telephones, computer systems, etc.). For example, in one implementation, the audio system may include componentry for enabling the client system to function as a cell phone or two-way radio device.

Other types of peripheral devices 431 which may be useful to the users of various client systems, such as, for example PDA functionality; memory card reader(s); fingerprint reader(s); image projection device(s); social networking peripheral component(s); etc.

Information filtering module(s) 449 which, for example, may be adapted to automatically and dynamically generate, using one or more filter parameters, filtered information to be displayed on one or more displays of the mobile device. In one implementation, such filter parameters may be customizable by the player or user of the device. In some embodiments, information filtering module(s) 449 may also be adapted to display, in real-time, filtered information to the user based upon a variety of criteria such as, for example, geolocation information, casino data information, player tracking information, etc.

Wireless communication module(s) 445. In one implementation, the wireless communication module 445 may be configured or designed to communicate with external devices using one or more wireless interfaces/protocols such as, for example, 802.11 (WiFi), 802.15 (including Bluetooth™), 802.16 (WiMax), 802.22, Cellular standards such as CDMA, CDMA2000, WCDMA, Radio Frequency (e.g., RFID), Infrared, Near Field Magnetics, etc.

Software/Hardware Authentication/validation components 444 which, for example, may be used for authenticating and/or validating local hardware and/or software components, hardware/software components residing at a remote device, game play information, wager information, user information and/or identity, etc. Examples of various authentication and/or validation components are described in U.S. Pat. No. 6,620,047, titled, "ELECTRONIC GAMING APPARATUS HAVING AUTHENTICATION DATA SETS," incorporated herein by reference in its entirety for one or more purposes.

Operating mode selection component 448 which, for example, may be operable to automatically select an appropriate mode of operation based on various parameters and/or upon detection of specific events or conditions such as, for example: the mobile device's current location; identity of current user; user input; system override (e.g., emergency condition detected); proximity to other devices belonging to same group or association; proximity to specific objects, regions, zones, etc. Additionally, the mobile device may be operable to automatically update or switch its current operating mode to the selected mode of operation. The mobile device may also be adapted to automatically modify accessibility of user-accessible features and/or information in response to the updating of its current mode of operation.

Scanner/Camera Component(s) (e.g., 452) which may be configured or designed for use in scanning identifiers and/or other content from other devices and/or objects such as for example: mobile device displays, computer displays, static displays (e.g., printed on tangible mediums), etc.

OCR Processing Engine (e.g., 456) which, for example, may be operable to perform image processing and optical character recognition of images such as those captured by a mobile device camera, for example.

Speech Processing module (e.g., 454) which, for example, may be operable to perform speech recognition, and may be operable to perform speech-to-text conversion.

Etc.

Figure 5:
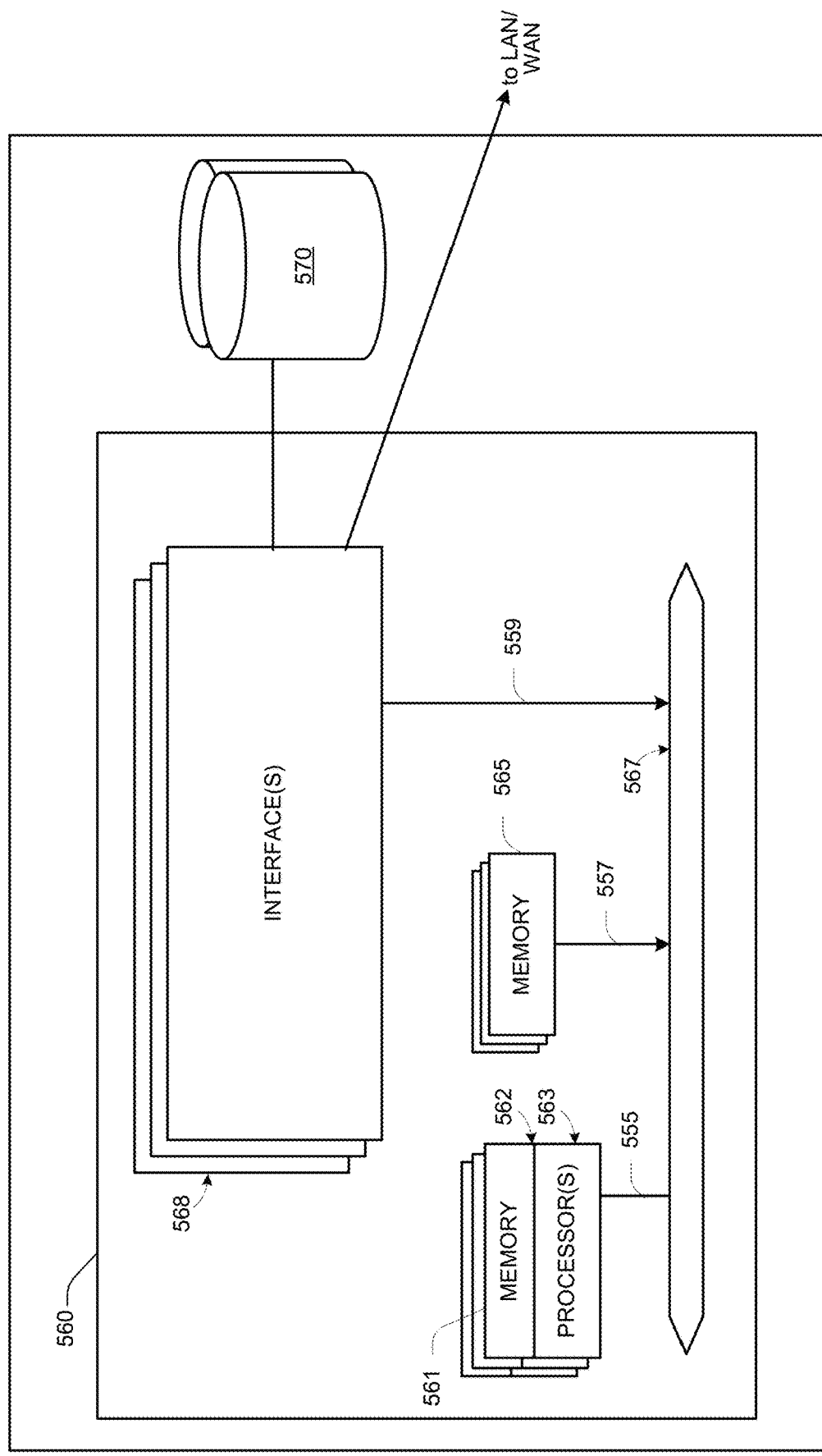
FIG. 5 illustrates an example embodiment of a server system 580 which may be used for implementing various aspects/features described herein.

FIG. 5 illustrates an example embodiment of a server system 580 which may be used for implementing various aspects/features described herein. In at least one embodiment, the server system 580 includes at least one network device 560, and at least one storage device 570 (such as, for example, a direct attached storage device). In one embodiment, server system 580 may be suitable for implementing at least some of the MMMS techniques described herein.

In according to one embodiment, network device 560 may include a master central processing unit (CPU) 562, interfaces 568, and a bus 567 (e.g., a PCI bus). When acting under the control of appropriate software or firmware, the CPU 562 may be responsible for implementing specific functions associated with the functions of a desired network device. For example, when configured as a server, the CPU 562 may be responsible for analyzing packets; encapsulating packets; forwarding packets to appropriate network devices; instantiating various types of virtual machines, virtual interfaces, virtual storage volumes, virtual appliances; etc. The CPU 562 preferably accomplishes at least a portion of these functions under the control of software including an operating system (e.g. Linux), and any appropriate system software (such as, for example, AppLogic™ software).

CPU 562 may include one or more processors 563 such as, for example, one or more processors from the AMD, Motorola, Intel and/or MIPS families of microprocessors. In an alternative embodiment, processor 563 may be specially designed hardware for controlling the operations of server system 580. In a specific embodiment, a memory 561 (such as non-volatile RAM and/or ROM) also forms part of CPU 562. However, there may be many different ways in which memory may be coupled to the system. Memory block 561 may be used for a variety of purposes such as, for example, caching and/or storing data, programming instructions, etc.

The interfaces 568 may be typically provided as interface cards (sometimes referred to as "line cards"). Alternatively, one or more of the interfaces 568 may be provided as on-board interface controllers built into the system motherboard. Generally, they control the sending and receiving of data packets over the network and sometimes support other peripherals used with the server system 580. Among the interfaces that may be provided may be FC interfaces, Ethernet interfaces, frame relay interfaces, cable interfaces, DSL interfaces, token ring interfaces, Infiniband interfaces, and the like. In addition, various very high-speed interfaces may be provided, such as fast Ethernet interfaces, Gigabit Ethernet interfaces, ATM interfaces, HSSI interfaces, POS interfaces, FDDI interfaces, ASI interfaces, DHEI interfaces and the like. Other interfaces may include one or more wireless interfaces such as, for example, 802.11 (WiFi) interfaces, 802.15 interfaces (including Bluetooth™), 802.16 (WiMax) interfaces, 802.22 interfaces, Cellular standards such as CDMA interfaces, CDMA2000 interfaces, WCDMA interfaces, TDMA interfaces, Cellular 3G interfaces, etc.

Generally, one or more interfaces may include ports appropriate for communication with the appropriate media. In some cases, they may also include an independent processor and, in some instances, volatile RAM. The independent processors may control such communications intensive tasks as packet switching, media control and management. By providing separate processors for the communications intensive tasks, these interfaces allow the master microprocessor 562 to efficiently perform routing computations, network diagnostics, security functions, etc.

In at least one embodiment, some interfaces may be configured or designed to allow the server system 580 to communicate with other network devices associated with various local area network (LANs) and/or wide area networks (WANs). Other interfaces may be configured or designed to allow network device 560 to communicate with one or more direct attached storage device(s) 570.

Although the system shown in FIG. 5 illustrates one specific network device described herein, it is by no means the only network device architecture on which one or more embodiments may be implemented. For example, an architecture having a single processor that handles communications as well as routing computations, etc. may be used. Further, other types of interfaces and media may also be used with the network device.

Regardless of network device's configuration, it may employ one or more memories or memory modules (such as, for example, memory block 565, which, for example, may include random access memory (RAM)) configured to store data, program instructions for the general-purpose network operations and/or other information relating to the functionality of the various MMMS techniques described herein. The program instructions may control the operation of an operating system and/or one or more applications, for example. The memory or memories may also be configured to store data structures, and/or other specific non-program information described herein.

Because such information and program instructions may be employed to implement the systems/methods described herein, one or more embodiments relates to machine readable media that include program instructions, state information, etc. for performing various operations described herein. Examples of machine-readable storage media include, but are not limited to, magnetic media such as hard disks, floppy disks, and magnetic tape; optical media such as CD-ROM disks; magneto-optical media such as floptical disks; and hardware devices that may be specially configured to store and perform program instructions, such as read-only memory devices (ROM) and random access memory (RAM). Some embodiments may also be embodied in transmission media such as, for example, a carrier wave travelling over an appropriate medium such as airwaves, optical lines, electric lines, etc. Examples of program instructions include both machine code, such as produced by a compiler, and files containing higher level code that may be executed by the computer using an interpreter.

FIG. 6 illustrates an example of a functional block diagram of a MMMS Server System in accordance with a specific embodiment. In at least one embodiment, the MMMS Server System may be operable to perform and/or implement various types of functions, operations, actions, and/or other features such as, for example, one or more of those described or referenced herein (e.g., such as those previously described with respect to FIGS. 1 and 2).

In at least one embodiment, the MMMS Server System may include a plurality of components operable to perform and/or implement various types of functions, operations, actions, and/or other features such as, for example, one or more of the following (or combinations thereof):

Artist Performance and Venue Tracking System(s) 671
Artist Management System(s) 675
Station Management System(s) 672
Content Delivery/Streaming System(s) 673
Venue Management System(s) 679
User Management System(s) 675
Media Storage System(s) 676
Financial Transaction Server(s) 677
Media Transcoding Server(s) 678
Context Interpreter (e.g., 602) which, for example, may be operable to automatically and/or dynamically analyze contextual criteria relating to a given transaction, and automatically determine or identify the type of transaction to be performed. According to different embodiments, examples of contextual criteria which may be analyzed may include, but are not limited to, one or more of the following (or combinations thereof):
  location-based criteria (e.g., geolocation of client device, geolocation of agent device, etc.)
  time-based criteria
  identity of user
  identity of artist
  user profile information
  transaction history information
  recent user activities
  etc.
Time Synchronization Engine (e.g., 604) which, for example, may be operable to manages universal time synchronization (e.g., via NTP and/or GPS)
Search Engine (e.g., 628) which, for example, may be operable to search for transactions, logs, items, accounts, options in the TIS databases
Configuration Engine (e.g., 632) which, for example, may be operable to determine and handle configuration of various customized configuration parameters for one or more devices, component(s), system(s), process(es), etc.
Time Interpreter (e.g., 618) which, for example, may be operable to automatically and/or dynamically modify or change identifier activation and expiration time(s)

based on various criteria such as, for example, time, location, transaction status, etc.

Authentication/Validation Component(s) (e.g., 647) (password, software/hardware info, SSL certificates) which, for example, may be operable to perform various types of authentication/validation tasks such as, for example, one or more of the following (or combinations thereof):
verifying/authenticating devices,
verifying passwords, passcodes, SSL certificates, biometric identification information, and/or other types of security-related information
verify/validate activation and/or expiration times
etc.

Transaction Processing Engine (e.g., 622) which, for example, may be operable to handle various types of transaction processing tasks such as, for example, one or more of the following (or combinations thereof):
identifying/determining transaction type
determining which payment gateway(s) to use
associating databases information to identifiers
etc.

OCR Processing Engine (e.g., 634) which, for example, may be operable to perform image processing and optical character recognition of images such as those captured by a mobile device camera, for example.

Database Manager (e.g., 626) which, for example, may be operable to handle various types of tasks relating to database updating, database management, database access, etc. In at least one embodiment, the Database Manager may be operable to manage databases, MMMS Device Application databases, etc.

Log Component(s) (e.g., 610) which, for example, may be operable to generate and manage transactions history logs, system errors, connections from APIs, etc.

Status Tracking Component(s) (e.g., 612) which, for example, may be operable to automatically and/or dynamically determine, assign, and/or report updated transaction status information based, for example, on the state of the transaction. In at least one embodiment, the status of a given transaction may be reported as one or more of the following (or combinations thereof): Completed, Incomplete, Pending, Invalid, Error, Declined, Accepted, etc.

Gateway Component(s) (e.g., 614) which, for example, may be operable to facilitate and manage communications and transactions with external Payment Gateways.

Web Interface Component(s) (e.g., 608) which, for example, may be operable to facilitate and manage communications and transactions with TIS web portal(s).

API Interface(s) to MMMS Server System(s) (e.g., 646) which, for example, may be operable to facilitate and manage communications and transactions with API Interface(s) to MMMS Server System(s)

API Interface(s) to 3rd Party Server System(s) (e.g., 648) which, for example, may be operable to facilitate and manage communications and transactions with API Interface(s) to 3rd Party Server System(s)

Ticketing Reservation and Purchasing Component(s) (e.g., 649), which, for example, may be configured or designed to facilitate, initiate and/or perform activities/operations relating to reservation and/or purchasing of tickets to events such as live performances at one or more venues.

OCR Processing Engine (e.g., 634) which, for example, may be operable to perform image processing and optical character recognition of images such as those captured by a mobile device camera, for example.

At least one processor 610. In at least one embodiment, the processor(s) 610 may include one or more commonly known CPUs which are deployed in many of today's consumer electronic devices, such as, for example, CPUs or processors from the Motorola or Intel family of microprocessors, etc. In an alternative embodiment, at least one processor may be specially designed hardware for controlling the operations of the mobile client system. In a specific embodiment, a memory (such as non-volatile RAM and/or ROM) also forms part of CPU. When acting under the control of appropriate software or firmware, the CPU may be responsible for implementing specific functions associated with the functions of a desired network device. The CPU preferably accomplishes one or more these functions under the control of software including an operating system, and any appropriate applications software.

Memory 616, which, for example, may include volatile memory (e.g., RAM), non-volatile memory (e.g., disk memory, FLASH memory, EPROMs, etc.), unalterable memory, and/or other types of memory. In at least one implementation, the memory 616 may include functionality similar to at least a portion of functionality implemented by one or more commonly known memory devices such as those described herein and/or generally known to one having ordinary skill in the art. According to different embodiments, one or more memories or memory modules (e.g., memory blocks) may be configured or designed to store data, program instructions for the functional operations of the mobile client system and/or other information relating to the functionality of the various Mobile Transaction techniques described herein. The program instructions may control the operation of an operating system and/or one or more applications, for example. The memory or memories may also be configured to store data structures, metadata, identifier information/images, and/or information/data relating to other features/functions described herein. Because such information and program instructions may be employed to implement at least a portion of the MMMS System techniques described herein, various aspects described herein may be implemented using machine readable media that include program instructions, state information, etc. Examples of machine-readable media include, but are not limited to, magnetic media such as hard disks, floppy disks, and magnetic tape; optical media such as CD-ROM disks; magneto-optical media such as floptical disks; and hardware devices that are specially configured to store and perform program instructions, such as read-only memory devices (ROM) and random access memory (RAM). Examples of program instructions include both machine code, such as produced by a compiler, and files containing higher level code that may be executed by the computer using an interpreter.

Interface(s) 606 which, for example, may include wired interfaces and/or wireless interfaces. In at least one implementation, the interface(s) 606 may include functionality similar to at least a portion of functionality implemented by one or more computer system interfaces such as those described herein and/or generally known to one having ordinary skill in the art.

Device driver(s) 642. In at least one implementation, the device driver(s) 642 may include functionality similar to at least a portion of functionality implemented by one or more computer system driver devices such as those described herein and/or generally known to one having ordinary skill in the art.

One or more display(s) 635. According to various embodiments, such display(s) may be implemented using, for example, LCD display technology, OLED display technology, and/or other types of conventional display technology. In at least one implementation, display(s) 635 may be adapted to be flexible or bendable. Additionally, in at least one embodiment the information displayed on display(s) 635 may utilize e-ink technology (such as that available from E Ink Corporation, Cambridge, Mass., www.eink.com), or other suitable technology for reducing the power consumption of information displayed on the display(s) 635.

Email Server Component(s) 636, which, for example, may be configured or designed to provide various functions and operations relating to email activities and communications.

Web Server Component(s) 637, which, for example, may be configured or designed to provide various functions and operations relating to web server activities and communications.

Messaging Server Component(s) 638, which, for example, may be configured or designed to provide various functions and operations relating to text messaging and/or other social network messaging activities and/or communications.

Etc.

Ticket Reservations & Purchasing Functionality

In at least one embodiment, the MMMS System may be configured or designed to provide ticketing reservation and purchasing functionality for enabling and/or facilitating users in performing activities/operations relating to reservation and/or purchasing of tickets to events such as live performances at one or more venues. For example, in at least one embodiment, the MAGNIFI System may include a Ticketing Reservation/Purchase System ("TRPS") which, for example, may be configured or designed to automatically and/or dynamically identify event ticketing reservation/purchasing opportunities in advance of tickets going on sale to the public. According to different embodiments, various aspects of the MMMS System's ticketing reservation and purchasing functionality may include, but are not limited to, one or more of the following (or combinations thereof):

Venue Implementation: In at least one embodiment, the MMMS System may be configured or designed to provide ticketing reservation and purchasing functionality for enabling and/or facilitating users in performing activities/operations relating to reservation and/or purchasing of tickets to events such as live performances at one or more venues. For example, in at least one embodiment, the MMMS System may include a Ticketing Reservation/Purchase System ("TRPS") which may be configured or designed to automatically and/or dynamically identify event ticketing reservation/purchasing opportunities in advance of tickets going on sale to the public. In one embodiment, reservation and/or purchasing of tickets by MAGNIFI users may be facilitated by 3rd party system(s)/component(s). In at least one embodiment, at some point after the Initial Ticket On-Sale event (e.g., approximately 1-5 days after), the venue hosting the event (e.g., concert/show) would set the Reservation Allotment for how many reservations it would guarantee/allot for a specific concert. In one embodiment, to determine the Reservation Allotment, the venue may take their "Sellable Capacity" less "Anticipated Sales", and the remaining number may be the Anticipated Unsold Tickets ("AUTs"). For example, a venue with a Sellable Capacity of 500 and Anticipated Sales of 300 may be provided with 200 AUTs remaining. The TRPS would multiply the venue's AUT by a "super percent" multiplier (e.g., 100+%), thus creating the Reservation Allotment for the event. One reason for the super percentage multiplier is that not all reservations may be converted to a ticket purchase.

Customer Interaction: In at least one embodiment, once the Reservation Allotment is available in the TRPS, MAGNIFI users may be able to view a Concert Page for a particular event. On the Concert Page, the user may view (e.g., in real-time) information relating to the total number of tickets sold for that event and the number of reservations available. MAGNIFI users may be able to "buy now" for immediate ticket purchase and/or be able to make ticket reservations (e.g., for one or more persons). In one embodiment where MAGNIFI users may "star" particular venues, MAGNIFI users may receive an update when an event is scheduled at one of their starred venues, and by clicking on the update, they may be directed to the Concert Page for that event, where they may purchase tickets and/or make Reservations.

Making the Reservation: In at least one embodiment, when making the Reservation, the Reservation Host may be able to designate other MAGNIFI users (Reservation Recipients) to receive an "invitation to accept the Reservation." This message may be sent within MAGNIFI to Reservation Recipients. The Host and the Recipients may be provided with a window of time in which to convert their Reservations into Ticket purchases. Once the Host has received confirmation from Recipients of their intent to attend the show as a group (e.g., via MAGNIFI SMS, text message, phone call, in person, etc.), the Reservation Host may automatically handle the Ticket purchases on behalf of the Reservation Group.

Picking up Tickets purchased through TRPS: In at least one embodiment, the venue keeps track of tickets purchased through at least one Reservation Group in the TRPS. The Host of at least one Reservation Group is now "hosting" a "guest list" of attendees at the event. At least one member of the Reservation Group arrives at the venue, informs Will Call that they're on the Reservation Host's Guest List, presents ID, and receives their Ticket.

Reservation Incentives: In at least one embodiment, venues participating in the TRPS may be able to access their Venue Dashboard, select a particular event, and set any incentives/discounts it wants to offer for that event. The Reservation Host would then be eligible for deals as an incentive for buying AUTs in bulk, for example In at least one embodiment, MAGNIFI users who reserve or purchase their tickets via the MAGNIFI System may receive other types of promotional offers or benefits such as, for example:

Bulk Ticket Discount: By way of example, 5 tickets for the price of 4, with the discount spread across the price of one or more tickets, thus benefiting the Reservation Group. The venue is only getting income from 4 ticket sales, but the event will be attended by 5 persons who may generate other income for the venue while attending the show.

Promotional Offers: drink tickets, venue swag, VIP privileges, priority seat reservations, discount coupons, etc.

Future Show Discounts: Discounts on Ticket purchases for future shows at that venue, or at shows among various venues in a Venue Group.

Vendor Affiliate Discounts: Discounts at vendors/merchants in the same neighborhood as the venue.

Venue "Points": Redeemable by the Host at the venue at some later date for any of the above.

TRPS Monetization: Monetization of the TRPS may take one or more of the following forms (or combinations thereof): Per Ticket Fee; Per Order Fee; and/or Per Show Fee.

Example Models for Sponsorship Sales: (1) local/national sponsor underwrites one or more fees and is perceived as paying one or more convenience fees related to Tickets purchased through the TRPS for that event, in exchange for brand goodwill and/or user data provided by MAGNIFI; (2) local/national sponsor pays a flat fee per show to buy a relationship with a specific demographic and receives demographic specific user data from MAGNIFI; (3) local/national sponsor pays a flat fee per show and offers product giveaways and/or raffle entries for a contest.

Example "Reservation" Definitions: (1) a socially broadcast interest in attending a particular event (e.g., a "like" for an event that others may see), and then helping that general interest culminate in a tipping point where everyone wants to convert their Reservation into Ticket Buys to be guaranteed admission; (2) an option to purchase a Ticket; (3) an opportunity for an individual to get a group of people to buy multiple tickets, and by doing so, the organizer (host) receives something of value from the venue; (4) a discrete unit of the allocation of Anticipated Unsold Tickets multiplied by a super-percentage (100+%)

According to different embodiments, a reservation window may close the sooner of (1) x days before the event or (2) X % of Tickets sold. Alternatively, X days after the Reservation is made, but no later than X days before the event.

Example Benefits/Advantages of MMMS System TRPS: Various benefits/advantages of the MMMS System TRPS may include, for example the limited quantity of Reservations; the limited time window in which to convert Reservations into Ticket Buys; and/or the social broadcast nature of the Reservation (allowing one or more MAGNIFI users to see the status of one or more Reservations for a given show at any time.

Figure 7:
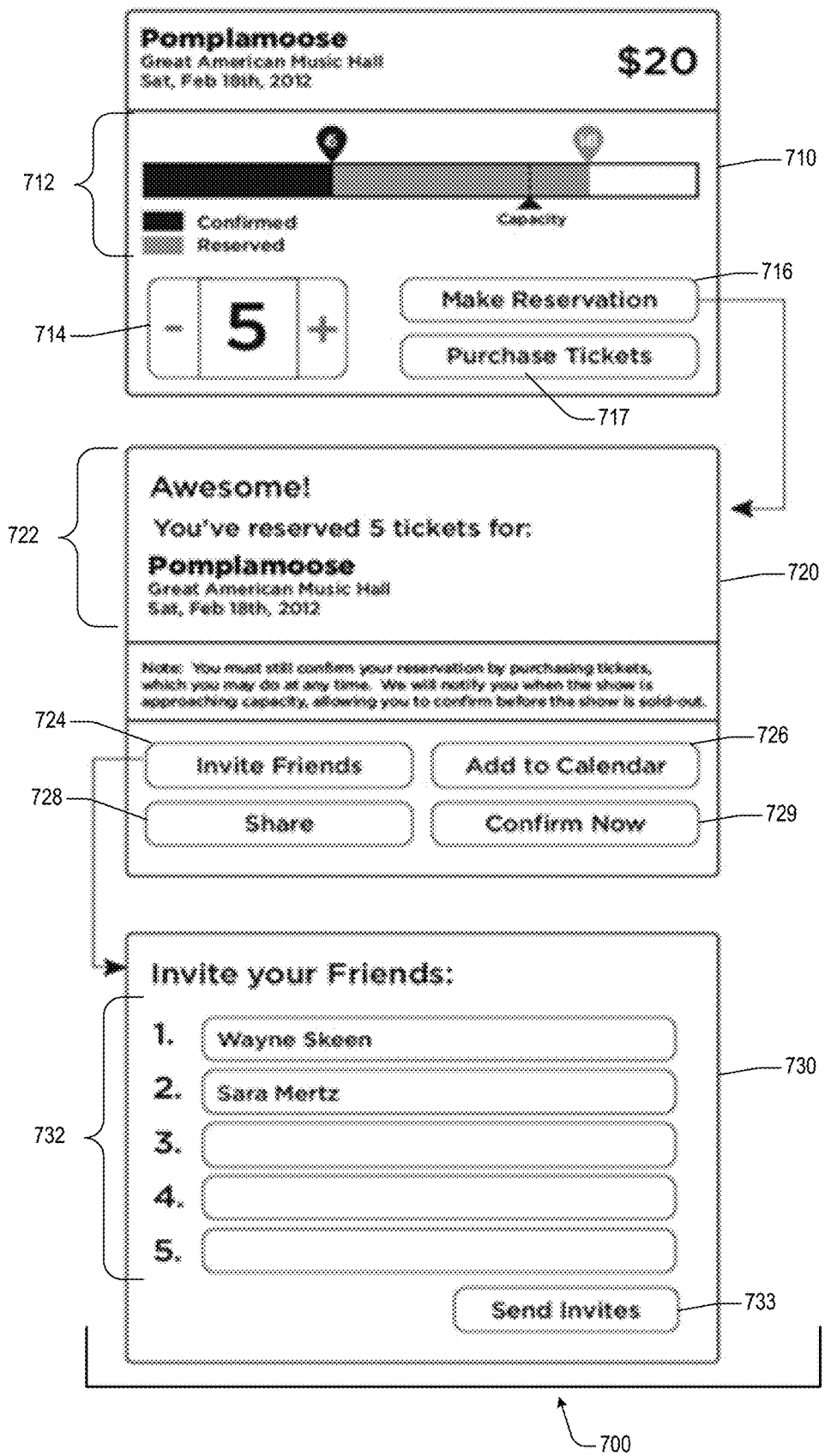
FIG. 7 shows example screenshots of a sequence of several Ticket Reservation GUIs.

FIG. 7 shows example screenshots of a sequence of several Ticket Reservation GUIs which may be configured or designed to provide ticketing reservation and purchasing functionality for enabling and/or facilitating users in performing activities/operations relating to reservation and/or purchasing of tickets to events such as live performances at one or more venues. For example, in at least one embodiment, the MAGNIFI System may include a Ticketing Reservation/Purchase System ("TRPS") which may be configured or designed to automatically and/or dynamically identify event ticketing reservation/purchasing opportunities in advance of tickets going on sale to the public. In one embodiment, reservation and/or purchasing of tickets by MAGNIFI users may be facilitated by $3^{rd}$ party system(s)/component(s). In at least one embodiment, at some point after the Initial Ticket On-Sale event (e.g., approximately 1-5 days after), the venue hosting the event (e.g., concert/show) would set the Reservation Allotment for how many reservations it would guarantee/allot for a specific concert. In one embodiment, to determine the Reservation Allotment, the venue may take their "Sellable Capacity" less "Anticipated Sales", and the remaining number may be the Anticipated Unsold Tickets ("AUTs"). For example, a venue with a Sellable Capacity of 500 and Anticipated Sales of 300 may be provided with 200 AUTs remaining. The TRPS would multiply the venue's AUT by a "super percent" multiplier (e.g., 100+%), thus creating the Reservation Allotment for the event. One reason for the super percentage multiplier is that not all reservations may be converted to a ticket purchase.

In at least one embodiment, once the Reservation Allotment is available in the TRPS, MAGNIFI users may be able to view a Concert Page for a particular event (e.g., 710). On the Concert Page, the user may view (e.g., in real-time) information (e.g., 712) relating to the total number of tickets sold for that event, and the number of reservations available. MAGNIFI users may be able to indicate the quantity of tickets to be purchased/reserved (e.g., via GUI portion 714), and elect to purchase tickets 717 for immediate ticket purchase and/or elect to make reservations 716 (e.g., for one or more persons). In one embodiment where MAGNIFI users may "star" particular venues, MAGNIFI users may receive an update when an event is scheduled at one of their starred venues, and by clicking on the update, they may be directed to the Concert Page for that event, where they may purchase tickets and/or make reservations.

As illustrated in the example embodiment of FIG. 7, at 720 is assumed that the user has initiated the process of reserving tickets for a selected show at a specific venue. In at least one embodiment, the user may be presented with options for performing additional tasks such as, for example: invite friends 724; add to event to calendar 726; post or share information relating to the user's ticket reservation activities (e.g., in the MAGNIFI System and/or at one or more social networks); confirm ticket reservations 729; purchased the reserved tickets; make additional ticket reservations/purchases; pre-purchase items of merchandise available at the upcoming show; elect to receive updates relating to the selected show; elect to join the mailing list of the artist/band and/or venue which will be hosting the show; etc.

In at least one embodiment, when making the Reservation, the Reservation Host may be able to designate other MAGNIFI users (Reservation Recipients) to receive an invitation to accept the Reservation (e.g., as shown at 730). This message may be sent within MAGNIFI to Reservation Recipients. The Host and the Recipients may be provided with a window of time in which to convert their Reservations into Ticket purchases. Once the Host has received confirmation from Recipients of their intent to attend the show as a group (e.g., via MAGNIFI SMS, text message, phone call, in person, etc.), the Reservation Host may automatically handle the Ticket purchases on behalf of the Reservation Group. In at least one embodiment, the venue keeps track of tickets purchased through at least one Reservation Group in the TRPS. The Host of at least one Reservation Group is now "hosting" a "guest list"

of attendees at the event. At least one member of the Reservation Group arrives at the venue, informs Will Call that they're on the Reservation Host's Guest List, presents ID, and receives their Ticket.

FIGS. 8-15 illustrate example screenshots of various graphical user interfaces (GUIs) which may be used to facilitate, initiate and/or perform various operation(s) and/or action(s) relating event ticket reservations and purchasing operations implemented via a user's mobile device. According to specific embodiments, at least a portion of the content and functionality of ticked reservation and purchasing GUIs illustrated in FIGS. 8-15 may be implemented at the MAGNIFI System.

FIG. 8 shows an example embodiment illustrating a view of the MAGNIFI Ticket Reservation icon 830a from the MAGNIFI Player GUI 801. In at least one embodiment, a user of the mobile device may click on the Ticket Reservation icon 830a to access additional GUIs for facilitating event-related online ticket reservations and purchasing transactions.

In the present example, it is assumed that the user has tapped the Ticket Reservation icon 830a of FIG. 8, and has been directed to the artist's Event Information GUI 901 (FIG. 9), which has been configured or designed to display listings of upcoming events associated with the identified artist (e.g., Angelo Moore). In at least one embodiment, as illustrated in the example embodiment of FIG. 9, events (e.g., 912, 914) where ticket reservations are determined to be available may include display of a respective Ticket Reservation icon (e.g., 912a, 914a) adjacent to each corresponding event. In at least one embodiment, the MAGNIFI System may dynamically determine (e.g., in real-time) available ticket reservation opportunities (if any) for each of the events listed in the artist's upcoming events list 910.

In the present example, it is assumed that the user has tapped on event listing 912 of FIG. 9 (titled "Brooklyn Bowl"). In response, as illustrated in the example embodiment of FIG. 10, an Artist-Event GUI 1001 may be displayed, which may be configured or designed to provide functionality for enabling the user to initiate, and/or perform one or more of the following operation(s), action(s), and/or feature(s) (or combinations thereof):

View and/or obtain additional information (e.g., 1012, 1014) relating to the selected artist event.

Listen to one or more the artists performing at the event together in one station (e.g., by tapping on "play" button 1022 to initiate playback of a streaming radio station).

Get directions to the event (e.g., by tapping on map portion 1010).

Share the event with friends on their social networks (e.g., 1034).

Initiate ticket reservations for the selected event (e.g., 1032).

Return to the Player GUI of the artist the user is currently listening to (e.g., by tapping on portion 1040).

Figure 10:
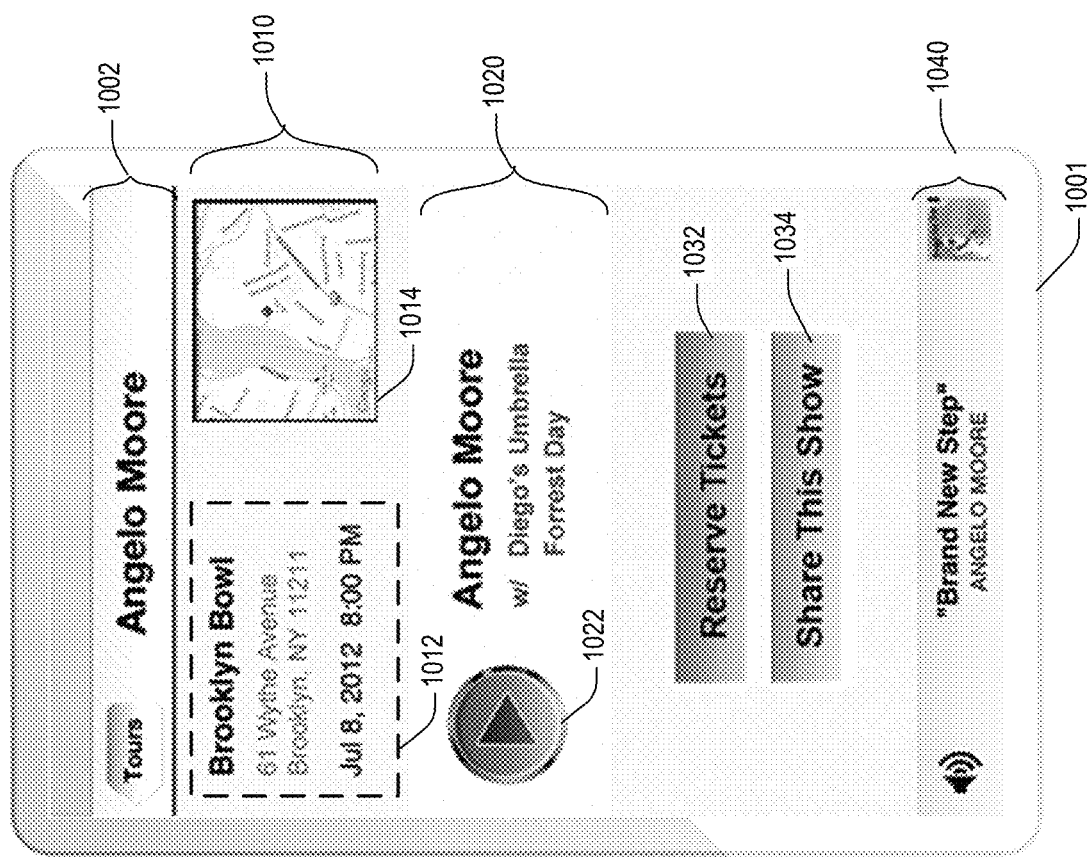

In the present example, it is assumed that the user has tapped "Reserve Tickets" button 1032 of FIG. 10. In response, as illustrated in the example embodiment of FIG. 11, an Event-Reservation GUI 1101 may be displayed, which may be configured or designed to provide functionality for enabling the user to initiate, and/or perform one or more of the following operation(s), action(s), and/or feature(s) (or combinations thereof):

View and/or obtain additional information (e.g., 1110) relating to the selected event (e.g., Artists to be performing, Date, Show Time, etc.).

View and/or obtain additional information (e.g., 1120) relating to the venue (e.g., venue name, venue location, etc.).

View and/or obtain additional information (e.g., 1120) relating to pricing for ticket reservations/purchases for the selected event.

Input the number of tickets to be reserved or purchased for the selected event (e.g., 1130).

Initiate ticket reservations for the selected event (e.g., 1138) for one or more persons.

Return to the Player GUI of the artist the user is currently listening to (e.g., by tapping on portion 1140).

In the present example, it is assumed that the user has provided input indicating that the user wishes to reserve 4 tickets (e.g., as shown at 1130) for the identified show/event. It is further assumed that the user then taps the "Make Reservation" button 1138. In at least one embodiment, after the user has tapped on the "Make Reservation" button 1138, a confirmation message may be displayed on the mobile device prompting the user to confirm the reservation of the requested number of tickets for the identified event. In some embodiments, the confirmed ticket reservations may be held only for a specified duration of time before the reservations automatically expire. If the user does not purchase the reserved tickets within the specified time duration, the reservations may automatically expire. In some embodiments, a separate reservation fee may be charged for the privilege of reserving or holding tickets to a given event.

In some embodiments, the MAGNIFI System may be configured or designed to enable the user to reserve a desired number of tickets for a selected event. Additionally, the MAGNIFI System may be configured or designed to facilitate the user in identifying and inviting one or more friends (or other persons) to accept one or more of the ticket reservations made by the user. One example of this feature is illustrated in FIG. 12.

Figure 11:
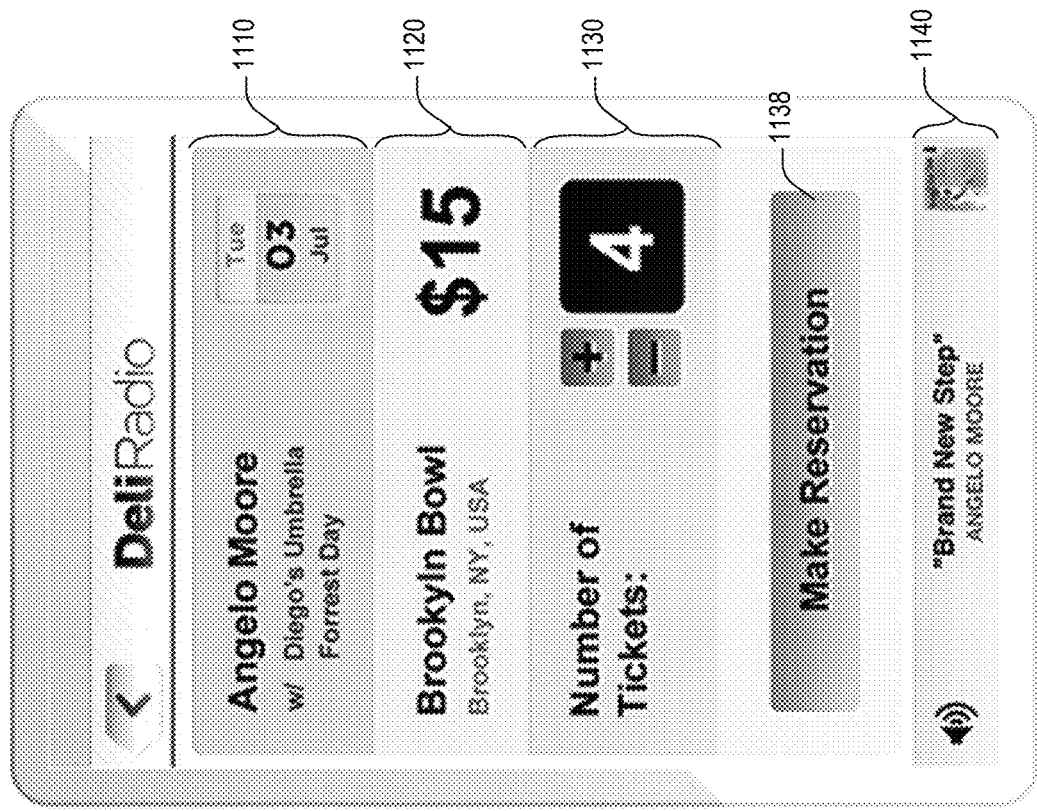
Figure 12:
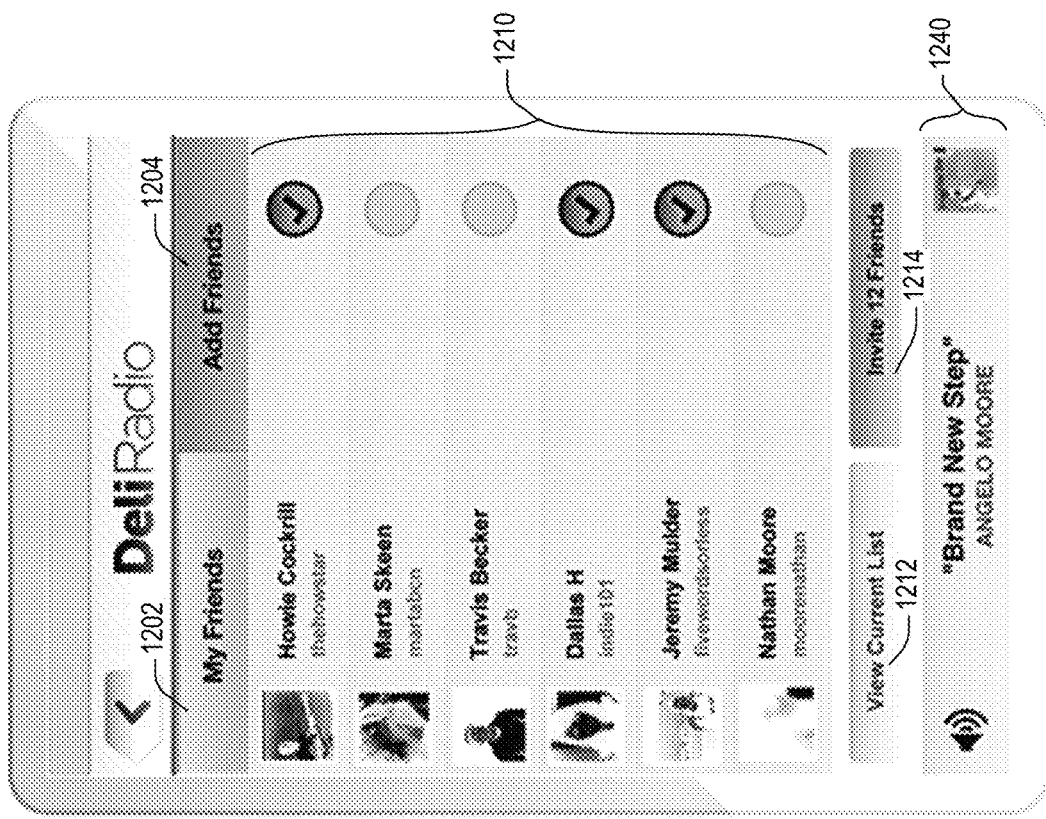

In the present example, after the user has reserved a selected number of tickets for a selected show, as described, for example, with respect to FIG. 11, the user may be presented with a Reservation Invitation GUI, such as, for example, Reservation Invitation GUI 1201 of FIG. 12. In at least one embodiment, the Reservation Invitation GUI may be configured or designed to facilitate and/or enable the user to identify and select one or more friends (or other persons) 1210 for the purpose of inviting the selected friends/persons to accept one or more of the ticket reservations made by the user for the selected show. The user may choose from their MAGNIFI Friends (as shown, for example, in FIG. 12) and/or may select from a list of contacts outside the MAGNIFI System such as via Facebook, Twitter, mobile device address book, etc. According to different embodiments, the invitations may be sent to the selected recipients via one or more of the following (or combinations thereof): via a MAGNIFI System messaging service, via one or more social network messaging service(s) (e.g., Facebook, Twitter, etc.), via email, via SMS (as indicated in the "Add Friends" tab), etc. In the specific example embodiment of FIG. 12, it is assumed that the user has selected to invite 12 MAGNIFI Friends to accept the 4 reservations. In at least one embodiment, when an invited recipient receives the invitation request, that recipient may perform one or more of the following types of activities (or combinations thereof):

Accept the reservation invitation.

Purchase one or more of the reserved tickets.

Decline the reservation invitation.

Forward the reservation invitation to one or more other persons. In at least one embodiment, the MAGNIFI System may be configured or designed to only allow the invitation recipient to forward the reservation invitation to one or more other persons who share a common friendship connection with both the user who made the original ticket reservations and the recipient who is forwarding the reservation invitation.

Make additional ticket reservations for the selected show.

Send a personal communication back to the user who sent the reservation invitation.

Utilize features embedded in the received reservation invitation to view details or information relating to one or more of the following (or combinations thereof): details about the upcoming show; information about the artist(s) who will be performing at the show; information about the venue where the selected show will be performed; etc.

Utilize features embedded in the received reservation invitation to access and/or listen to a customized MAGNIFI station which plays streamed music performed by one or more of the artist(s) who will be performing at the selected show.

Utilize features embedded in the received reservation invitation to access and/or listen to a customized MAGNIFI station which plays streamed music performed by one or more of the artist(s) who will be performing at the selected show.

Etc.

Figure 13:
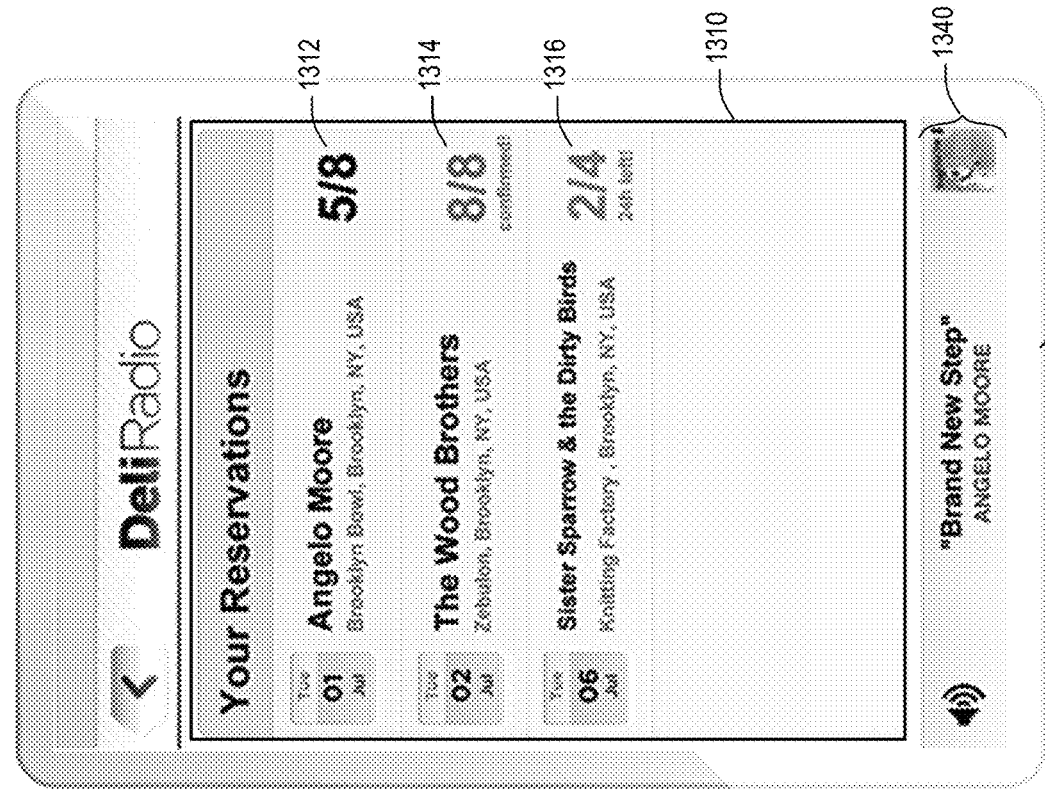

FIG. 13 shows an example embodiment of a User Reservation Status GUI 1301 in accordance with a specific embodiment. In the specific example embodiment of FIG. 13, the User Reservation Status GUI has been configured to present a list view of a user's upcoming reservations. In at least one embodiment, the User Reservation Status GUI may be configured or designed to display information relating to each of the user's existing reservations, as well as updated status information relating to each of the user's existing reservations. For example, as illustrated in the example embodiment of FIG. 13, the updated status information relating to reservation entry 1312 (for the Angelo Moore show) indicates that 5 reservation invitations have been confirmed or accepted out of a total of 8 reservations made by the user. Additionally, the updated status information relating to reservation entry 1316 (for the Sister Sparrow show) indicates that 2 reservation invitations have been confirmed or accepted out of a total of 4 reservations made by the user, and also indicates that the reservations (and/or reservation invitations) are due to expire if the reservations are not ticketed within 24 hours. As illustrated in FIG. 13, colors may be used to indicate a current state or current status of each respective reservation.

In the present example, it is assumed that the user taps or clicks on reservation entry 1312 of the User Reservation Status GUI. In response, the user may be presented with a Reservation Details GUI as illustrated by 1401 of FIG. 14. As illustrated in the example embodiment of FIG. 14, the Reservation Details GUI 1401 may present the user with a variety of information and/or other types of functionality relating to the selected reservation such as, for example, one or more of the following (or combinations thereof):

Details about the upcoming show associated with the selected reservation (e.g., 1412).

Information about the artist(s) who will be performing at the show (e.g., 1412).

Information about the venue where the selected show will be performed (e.g., 1412).

Information relating to confirmations from friends who have accepted the user's invitation for a reserved ticket 1414 (e.g., 1414).

Information relating to the user's remaining available reserved tickets associated with the selected reservation (e.g., 1412, 1414).

Functionality for sending out additional reservation invitations to additional persons (e.g., 1422).

Functionality for sending communications to one or more of the reservation invitation recipients (e.g., 1424).

Functionality for viewing additional information relating to currently outstanding and/or declined reservation invitations for the selected show (e.g., 1426).

Functionality for accepting or confirming a ticket reservation for the selected show (e.g., 1428).

Functionality for to access and/or listen to a customized MAGNIFI station which plays streamed music performed by one or more of the artist(s) who will be performing at the selected show (e.g., 1440).

Thus, for example, in at least one embodiment, the user may choose to invite more friends; send a message via email or SMS to confirmed invitees; view the status of current outstanding and declined invitations; confirm the ticket reservations with the MAGNIFI System; etc.

Figure 15:
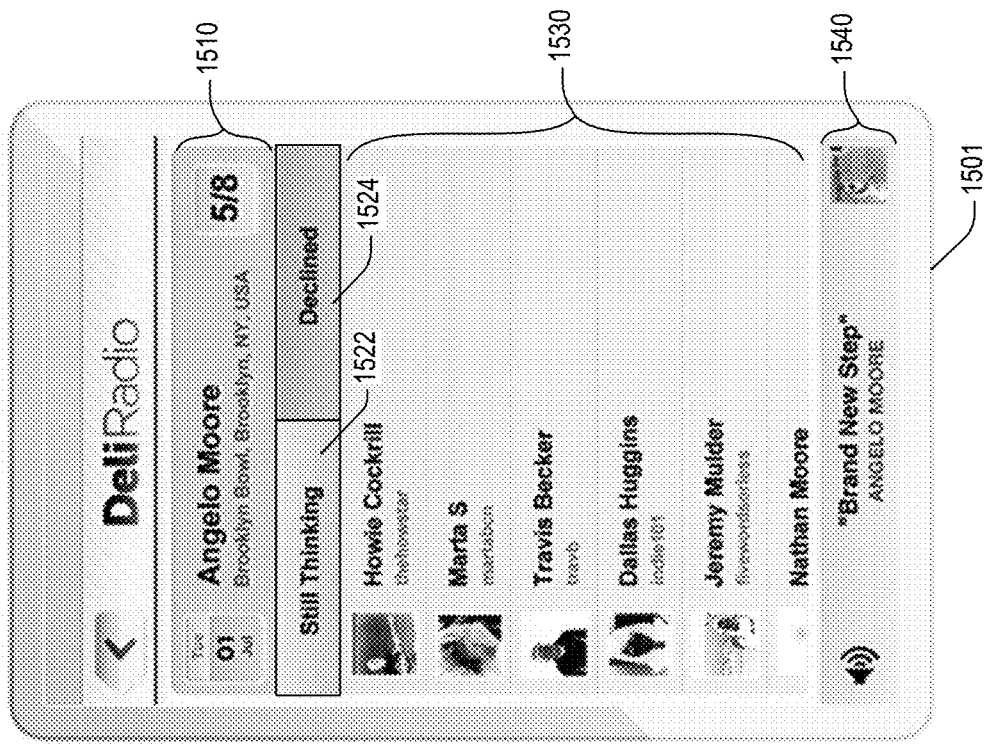
Figure 14:
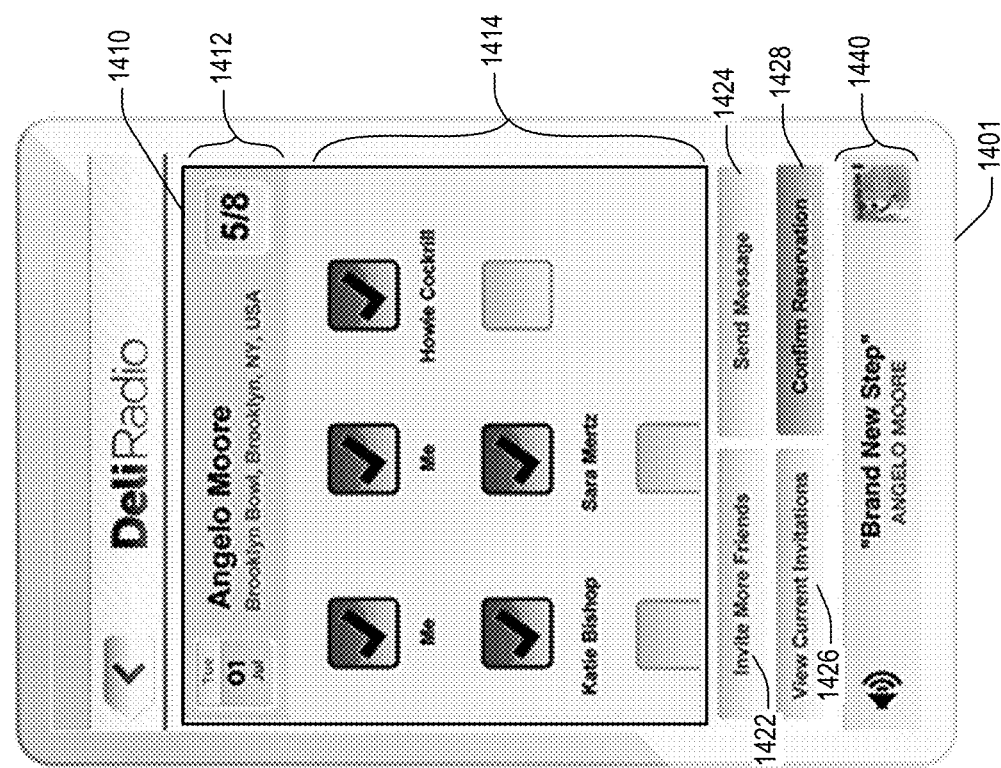

In one embodiment, if the user taps or clicks on the "View Current Invitations" button 1426, the user may then be presented with an Invitation Status GUI such as that illustrated by 1501 of FIG. 15. As illustrated in the example embodiment of FIG. 15, the Invitation Status GUI may be configured or designed to enable the user to view additional information relating to currently outstanding and/or declined reservation invitations for the selected show.

In at least one embodiment, when a user elects to confirm a ticket reservation via one of the MAGNIFI System GUIs, a notification message may be automatically generated by the Ticket Reservation/Purchasing System (e.g., MAGNIFI System) and sent out to one or more persons which, for example, may include one or more of the following (or combinations thereof): the user who made the reservation (if different from the confirming user), one or more of the reservation invitation recipients (e.g., 1414), one or more of the confirming user's friends who have also purchased the reserved a ticket for the same show, etc.

Additionally, in some embodiments, when a user elects to confirm a ticket reservation via one of the Ticket Reservation/Purchasing System (e.g., MAGNIFI System) GUIs, the user may be presented with a Ticket Purchasing GUI which may be configured or designed to facilitate the user in purchasing a ticket corresponding to the confirmed ticket reservation.

Figure 17:
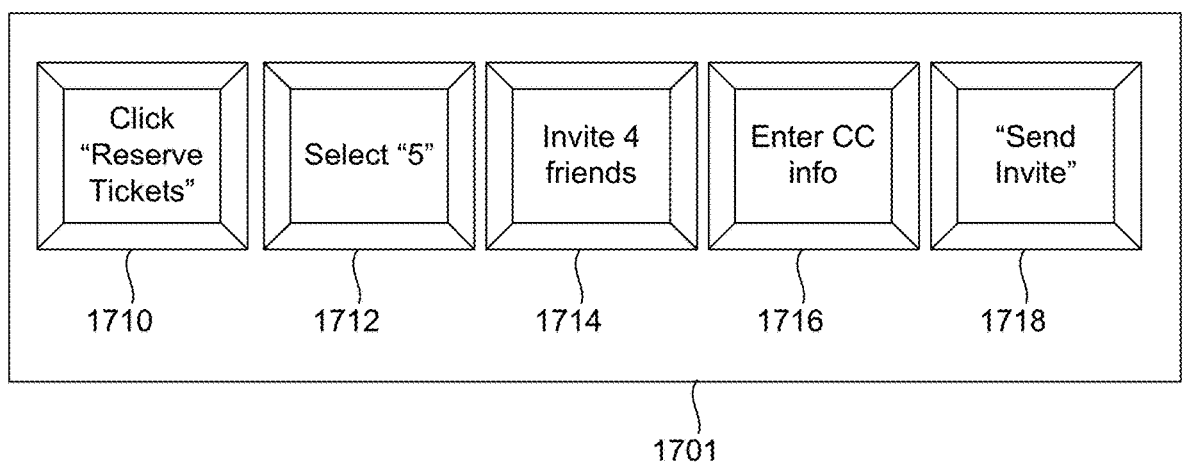

FIG. 17 depicts an overview of one embodiment of various actions or operations which may occur during an Event Ticket Reservation Group process conducted for a specific Reservation Group Host. This embodiment outlines the process as follows:

The Host indicates (1710) that they would like to reserve tickets for an upcoming event.

The Host selects (1712) a number of tickets they would like to reserve (e.g., 5).

The Host selects/identifies (1714) Invitees to invite to join the Reservation Group.

The Host enters (1716) their payment information for the number of tickets they reserved for themselves. In some embodiments, the Host's payment info may also be used to fund payment of ticket reservations and/or purchases for tickets reserved by other Invitees.

The Host sends out (1718) invitations to the selected Invitees to join the Reservation Group and claim reserved tickets to the upcoming event.

Figure 18:
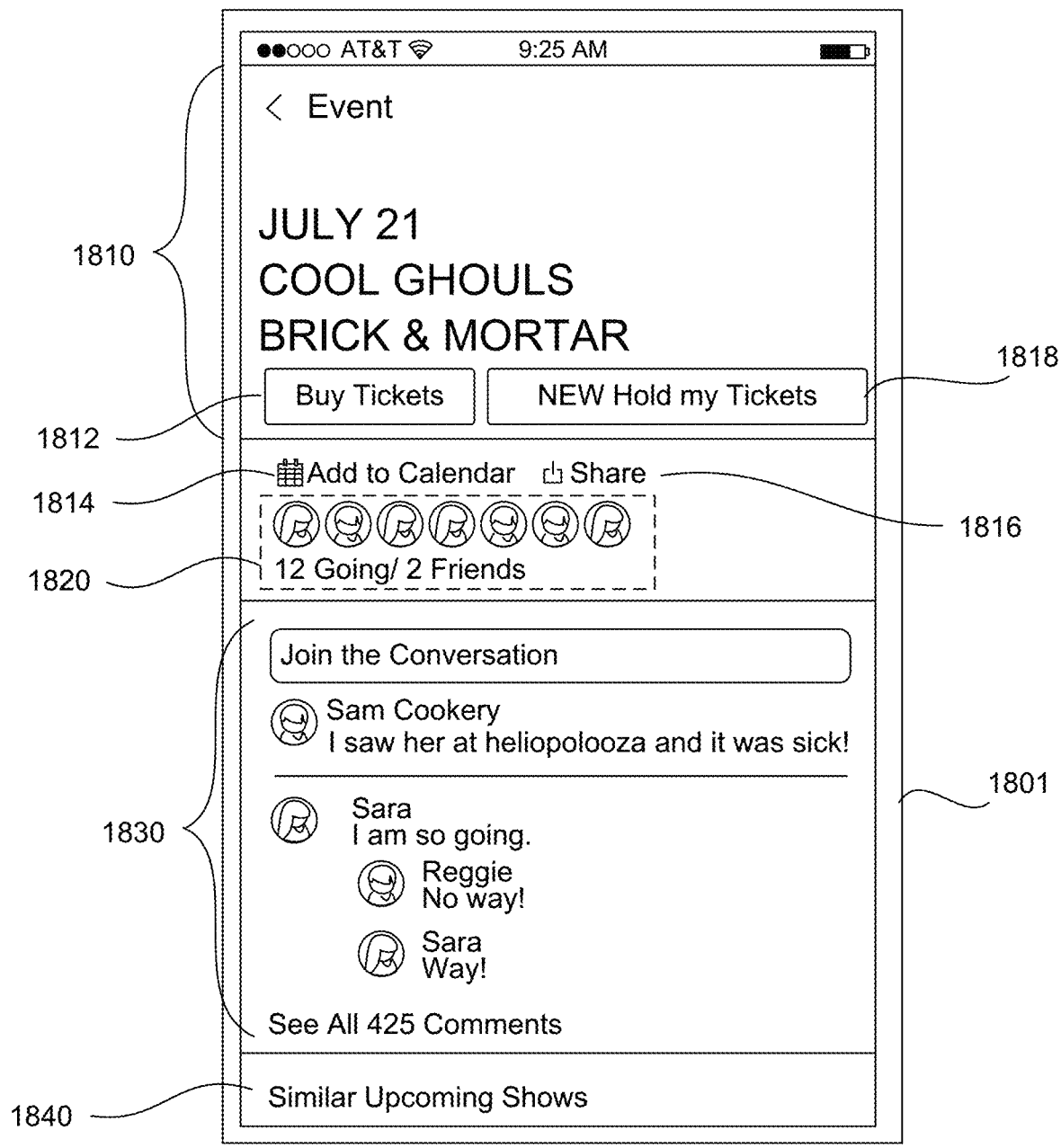

FIG. 18 illustrates one embodiment of a Ticket Reservation Event Page GUI 1801 for an upcoming event. As illustrated in the example embodiment of FIG. 18, the Ticket Reservation Event Page GUI may be configured or designed to include functionality for accessing or displaying one or more of the following types of content, features, functions, etc.:

- Event information including, for example, one or more of the following (or combinations thereof): event date; event time; event day; event venue information; artists/bands who will be performing at the event; event location; etc.
- Ticket reservation functionality 1818.
- Ticket purchasing functionality 1812.
- Event calendaring functionality 1814.
- Social media sharing functionality 1816.
- Information 1820 relating to other persons in the host's social network(s) who will be (and/or will not be) attending the event.
- Electronic Conversation/Messaging functionality 1830. For example, as illustrated in the example embodiment of FIG. 18, Ticket Reservation Event Page GUI includes an event comment thread (e.g., 1830).
- Functionality 1840 for accessing additional information relating to the event including, for example, similar upcoming shows.

Different embodiments of Ticket Reservation Event Page GUI may be configured or designed to display a "group ticketing" or "ticket reservation" link or button (e.g., 1818) that is placed on an event or ticketing website, whether within the MAGNIFI platform, on a venue's website, on a ticketing company's website, or elsewhere. The "ticket reservation" button/link can be separate and distinct from a "buy tickets" button/link, or the ticket reservation functionality could be accessed by a user once the user clicks a "buy tickets" button/link. When a user clicks the "ticket reservation" button/link, one or more computer-implemented "Reservation Host" protocols may be automatically initiated.

Figure 19:
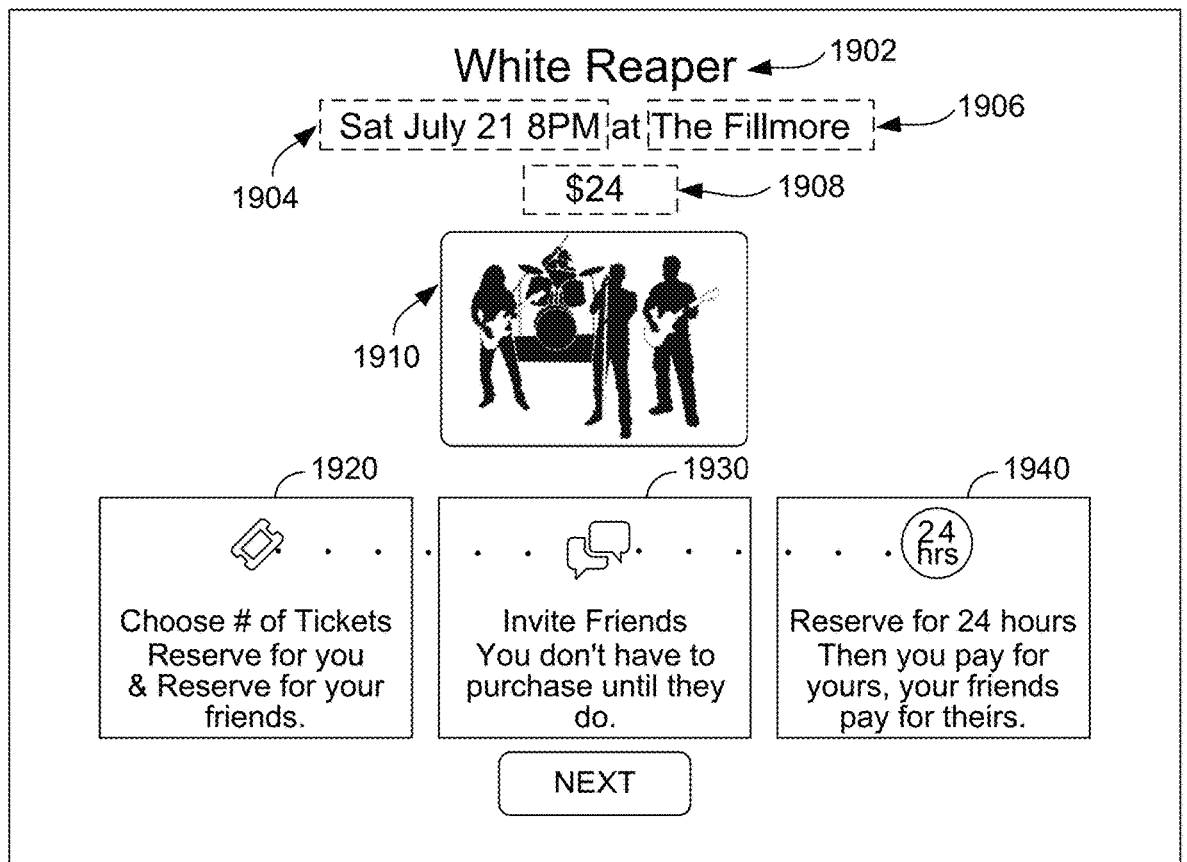

FIG. 19 illustrates an example screenshot of a User Onboarding GUI 1901 which may be configured or designed to include group ticketing related functionality which, for example, may include providing an overview of the ticketing reservation process for the group ticketing "Host" or initiator. As illustrated in the example embodiment of FIG. 19, the Host is presented with event information such as, for example, one or more of the following (or combinations thereof): artist name 1902, event date 1904, event location/venue 1906, ticket price 1908 (if available), artist image or video 1910, etc.

In the specific example embodiment of FIG. 18, it is assumed that the ticket reservation process includes at least 3 primary steps:

- Choosing 1920 the number of tickets they wish to reserve for themselves and for their friends/invitees.
- Sending 1930 invitations to those invitees; and
- Reserving 1940 the tickets for a window of time by entering their payment information.

In at least one embodiment, the ticket reservation functionality is configured or designed such that the Host only pays for the number of tickets they reserve for themselves, and any Invitees pay for tickets claimed by such Invitees during the reservation acceptance process. Once the Host is ready, they click the "Next" button to advance to the first step in the group ticketing process. It is notable that the display and ordering of the text and graphics on FIG. 19 may vary, as variations may be user tested to determine optimum adoption, and as displays are reconfigured and optimized for various electronic communication devices (such as laptops, PCs, mobile phones and other handheld devices) and for mobile applications. It should also be noted that the number of steps (and substeps) involved in initiating and/or completing a ticket reservation group may vary depending on the embodiment.

FIGS. 20-33 describe one example embodiment of the various steps and substeps which may be involved for initiating and completing a group ticket reservation transaction for an identified reservation group.

Figure 20:
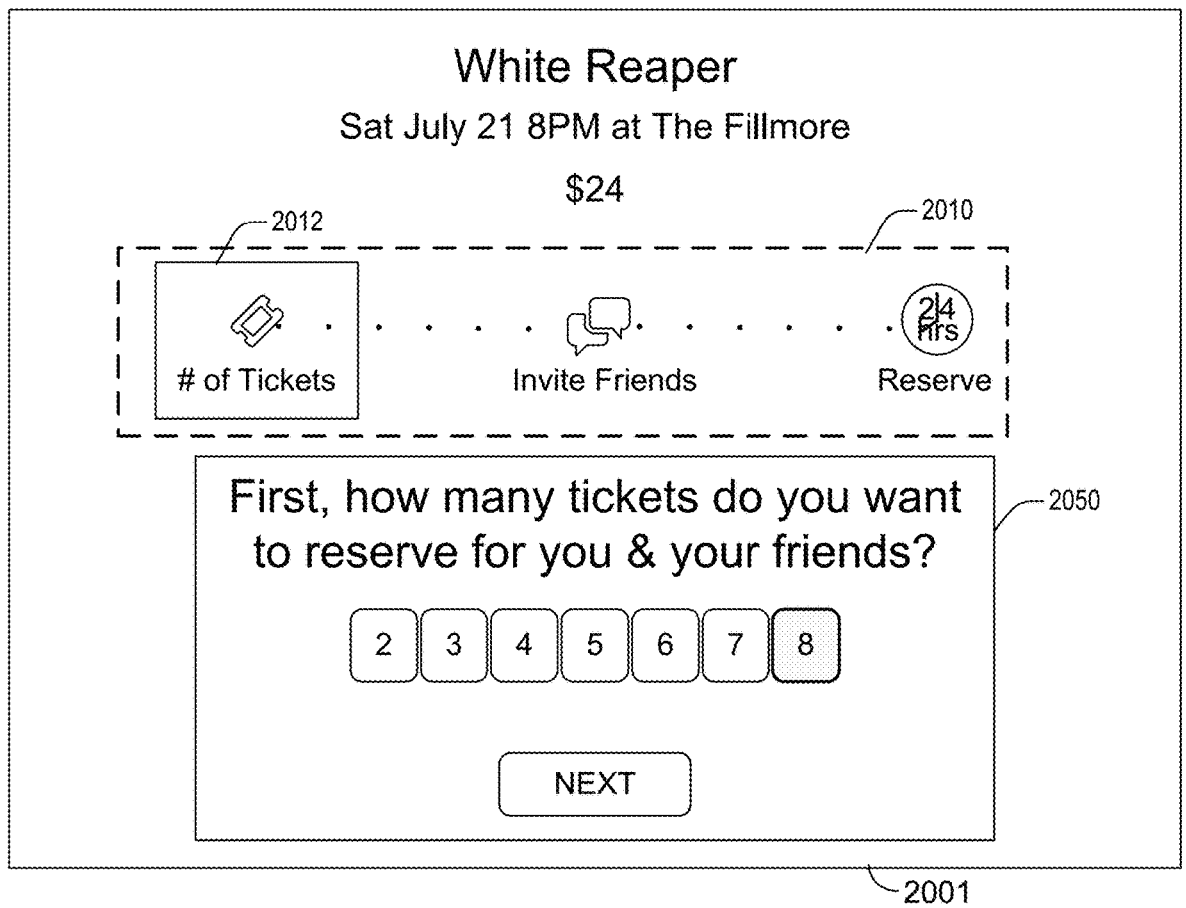

FIG. 20 illustrates an example screenshot of a graphical user interface (GUI) 2001 which may be used to facilitate, initiate and/or perform various operation(s) and/or action(s) relating to a group ticketing reservation transaction such as, for example, enabling the Host to specify the number of tickets which the Host desires to reserve for his/her friends (e.g., via GUI portion 2050). In the specific embodiment of FIG. 20, it is assumed that the Host specifies that he wishes to reserve a total of eight tickets for his friends and Invitees. In some embodiments, the reserved tickets may only be purchased by Invitees who were invited (or identified) by the Host. For example, in some embodiments, the reserved tickets may only be purchased by persons who are direct friends with the Host. In other embodiments, at least a portion of the reserved tickets may be purchased by persons who were invited (or identified) by one or more of the Invitees. For example, in some embodiments, at least a portion of the reserved tickets may be purchased by persons who are friends of friends of the Host. In at least some embodiments, this feature may be separately and/or independently configurable by the Host for each different group ticketing reservation transaction initiated by the Host.

As illustrated in the example embodiment of FIG. 20, the group ticketing reservation initiation process may involve the Host selecting the total number of tickets that the Host wishes to reserve for himself and his Invitees. The progress of the group ticketing reservation transaction may be graphically displayed via the "progress bar" 2010, which shows that the host is currently at the "# of Tickets" step 2012.

According to different embodiments, the number of tickets available to be reserved (as displayed on the interface) may vary depending on configurations, as well as ticket allotments provided by venues, ticketing companies, artists and/or promoters. The interface may default automatically to a selection when the page is loaded by the user. In this image, the Host has selected to reserve 8 tickets. When the Host is satisfied with their selection, they may click the "Next" button to advance to the next step in the process.

FIG. 21 illustrates an example screenshot of a graphical user interface (GUI) 2101 which may be configured or designed to enable the Host to input or specify how many tickets from the reservation should be reserved for the Host to claim. In at least one embodiment, the number of reserved tickets available to be claimed by the Host would be the total number of tickets in the reservation minus one ticket. In the specific example embodiment of FIG. 21, it is assumed that the host elects to claim for himself, two tickets from the reserved group of eight tickets.

Additionally, as illustrated in the example embodiment of FIG. 21 GUI 2101 may also include functionality for enabling the Host to dynamically select whether: (i) the two reserved tickets to be claimed by the Host should be purchased conditionally (e.g., 2114) (e.g., conditioned upon reservation acceptance and ticket purchase by one or more Invitees); or (ii) whether the two reserved tickets to be claimed by the Host should be purchased unconditionally (e.g., 2112) (e.g. without regard to any Invitee behavior) either immediately or automatically at the end of the reservation window.

In at least some embodiments, the Ticket Reservation/Purchasing System may be configured or designed to enable the Host to configure or define one or more conditional purchase parameters (e.g., to be satisfied for triggering automatic conditional purchasing of the Host's reserved tickets), such as, for example one or more of the following (or combinations thereof):

Specifying a minimum number of Invitees which to complete their reservation acceptance and ticket purchase(s) before conditional purchasing of the Host's reserved tickets is triggered. For example:
number of friends who must accept reserved ticket(s),
number of friends who must purchase reserved ticket(s).

Identifying one or more specific Invitees who need to complete their respective reservation acceptance and ticket purchase(s) before conditional purchasing of the Host's reserved tickets is triggered. For example:
specific friends who must accept reserved ticket(s),
specific friends who must purchase reserved ticket(s).

Specifying a time window by which one or more Invitees need to complete their reservation acceptance and ticket purchase(s) before conditional purchasing of the Host's reserved tickets is triggered. For example:
time frame for accepting reserved ticket(s),
time frame for purchasing reserved ticket(s).

Specifying a tiered pricing structure for purchasing one or more reserved tickets. For example:
tiered reserved ticket pricing based on time (e.g., price of purchasing reserved ticket is $5 if purchased w/in 24 hours, price of purchasing reserved ticket is $7 if purchased after 24 hours, price of purchasing reserved ticket is $10 if purchased on day of event, price of purchasing reserved ticket is $3 if purchased 5 minutes after start of event).
tiered reserved ticket pricing based on availability (e.g., two reserved tickets available for purchase for $5 each, three reserved tickets available for purchase for $7 each).

Etc.

Based on the Host's selection of 8 total tickets to be held in the reservation in FIG. 20, the Host is providing additional input in FIG. 21 that 2 of these 8 tickets should be reserved for the Host and that these 2 tickets should be purchased unconditionally (2112). When the Host is satisfied with their selection, they click the "Next" button to advance to the next screen.

FIG. 22 illustrates an example screenshot of a graphical user interface (GUI) 2201 which may be configured or designed to enable the Host to create (or log into) a MAGNIFI account (or other ticket reservation account, as appropriate) to continue the ticket reservation transaction. In some embodiments, the Host may be required to to create (or log into) a ticket reservation account for a variety of reasons, including, for example, verifying that the Host is an actual person and not a ticket scalper bot. In some embodiments, the Host's reservation information may be stored in account dedicated to the Host. Such account registration may be accomplished via social network verification, including but not limited to Facebook account login, or by directly creating a MAGNIFI account with the sign up prompts such as first name, last name, email address, username, password. The Host may also have the ability to return to and edit their previous selections (depicted in FIGS. 20 and 21). Once the Host has created or log into a suitable ticket reservation account, the Host may advance to the next screen by clicking the button labeled "Next".

Figure 23:
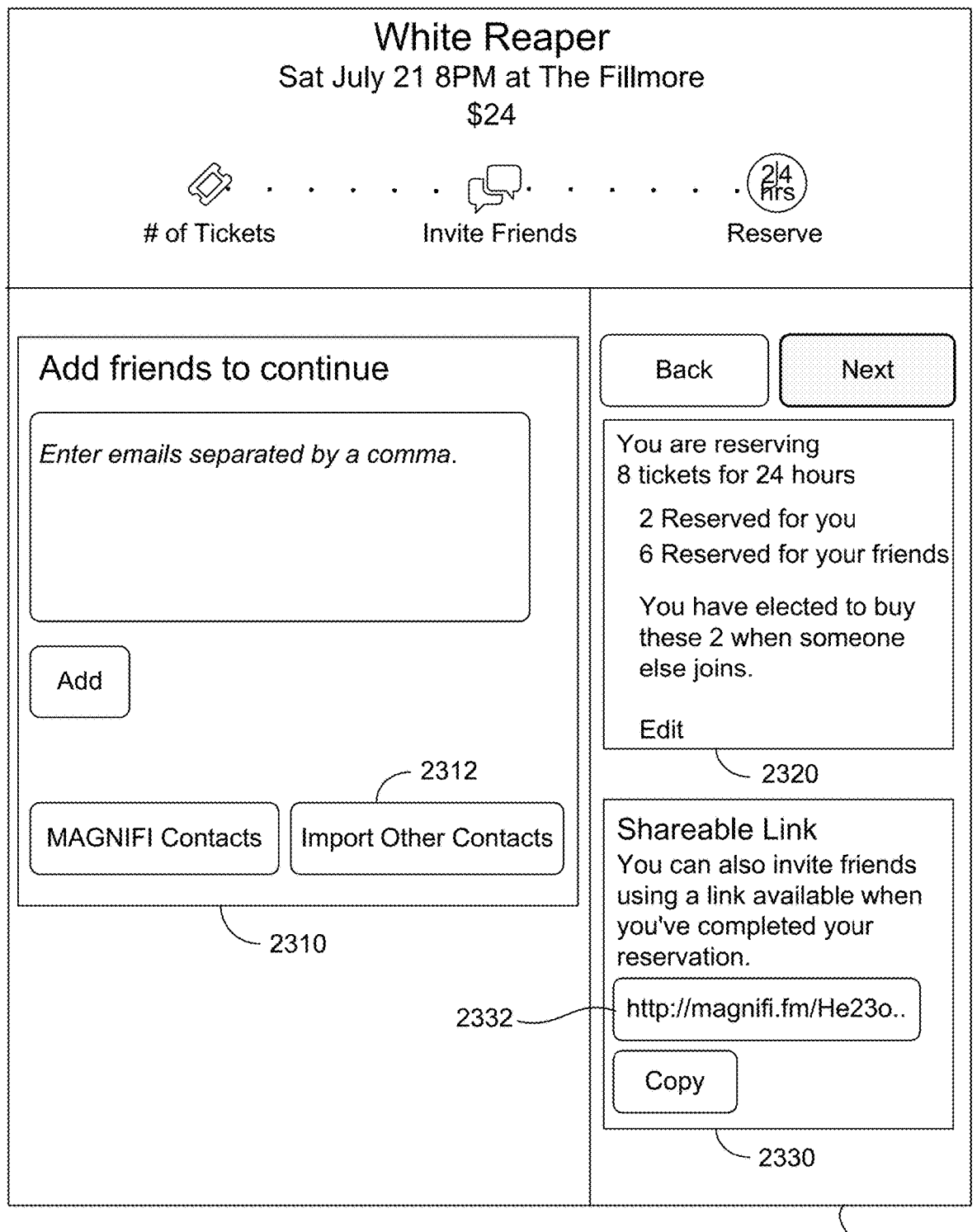
Figure 24:
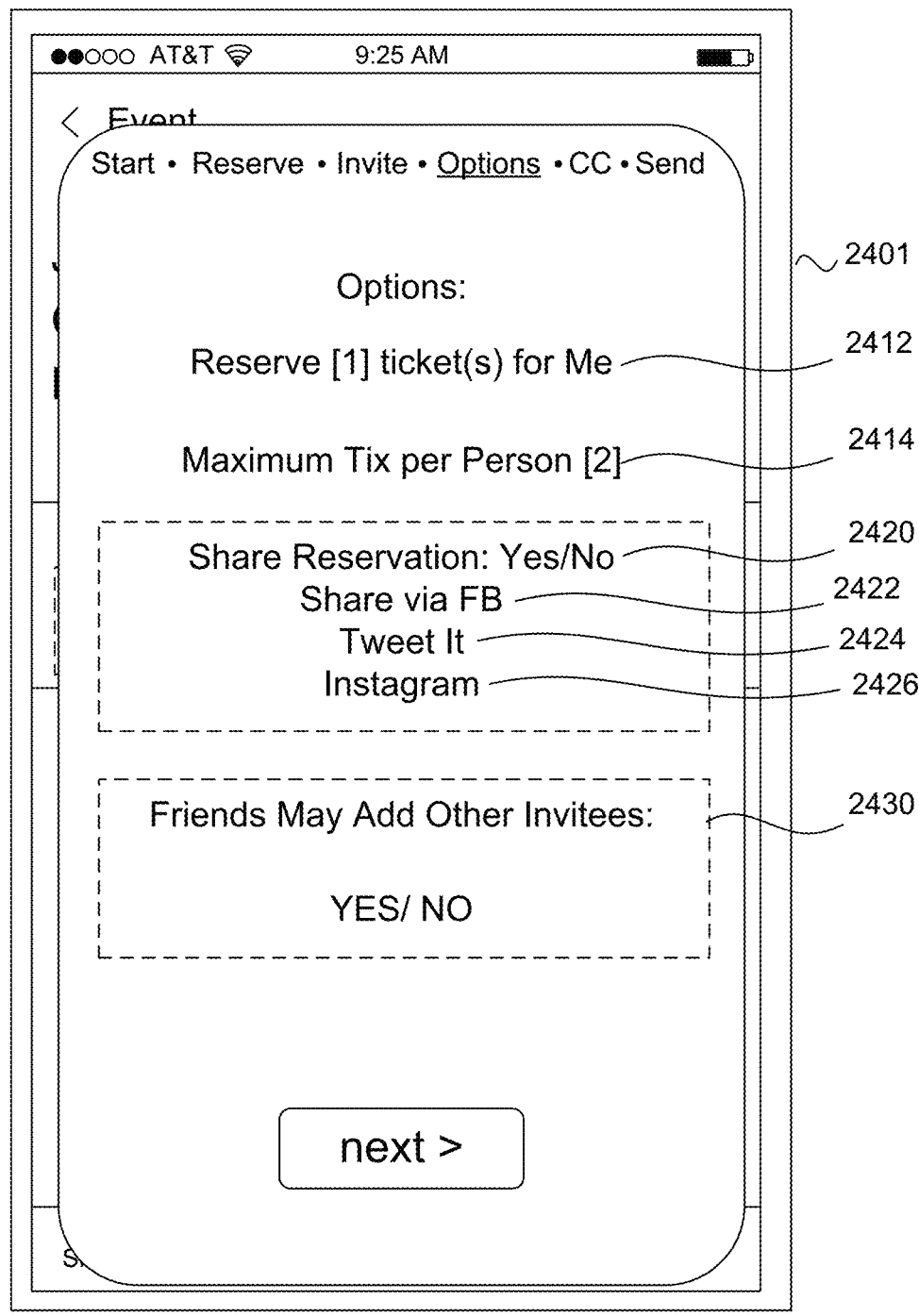

FIG. 23 illustrates an example screenshot of a graphical user interface (GUI) 2301 which may be configured or designed to enable the Host to input or otherwise provide access to contact information (e.g., 2310) for the identified Invitees that the Host wishes to invite to join the Reservation Group. The Host may manually type in Invitee email addresses, select specific contacts within the MAGNIFI platform, import contacts from other online sources (2312), etc. The Host may also have the ability to return to and edit their previous selections. The Host may also share a link (2332) to the ticket reservation group invitation online via social channels such as Facebook and Twitter. In an alternate embodiment, the Host may be able to access previous Invitee lists from previous Reservation Groups in order to copy some/all of those Invitees into the current Reservation Group. Additionally, as illustrated in the example embodiment of FIG. 22, GUI FIG. 24 illustrates an example screenshot of a graphical user interface (GUI) 2401 which may be configured or designed to enable the Host to dynamically select/configure various aspects of the group ticket reservation such as, for example the number of tickets reserved for the themselves 2412, the number of tickets reserved for Invitees 2414, enable/disable sharing 2420 of the Reservation Group invitation through social channels such as Facebook 2422, Twitter 2424 and Instagram 2426; enable/disable ability for Invitees to add Additional Invitees to the Reservation Group 2430.

FIG. 25 illustrates an example screenshot of a graphical user interface (GUI) 2501 which may be configured or designed to enable the Host to view, edit and/or modify the Group Reservation Invitee list (e.g., 2514). According to different embodiments, editing/modifying the Group Reservation Invitee list may include, but are not limited to, one or more of the following (or combinations thereof):
Adding Invitees to the Reservation Group;
Deleting Invitees from the Reservation Group;
Import other contacts 2512 from other sources, such as, for example, Facebook,
Gmail, MAGNIFI, etc.
Etc.

Figure 26:
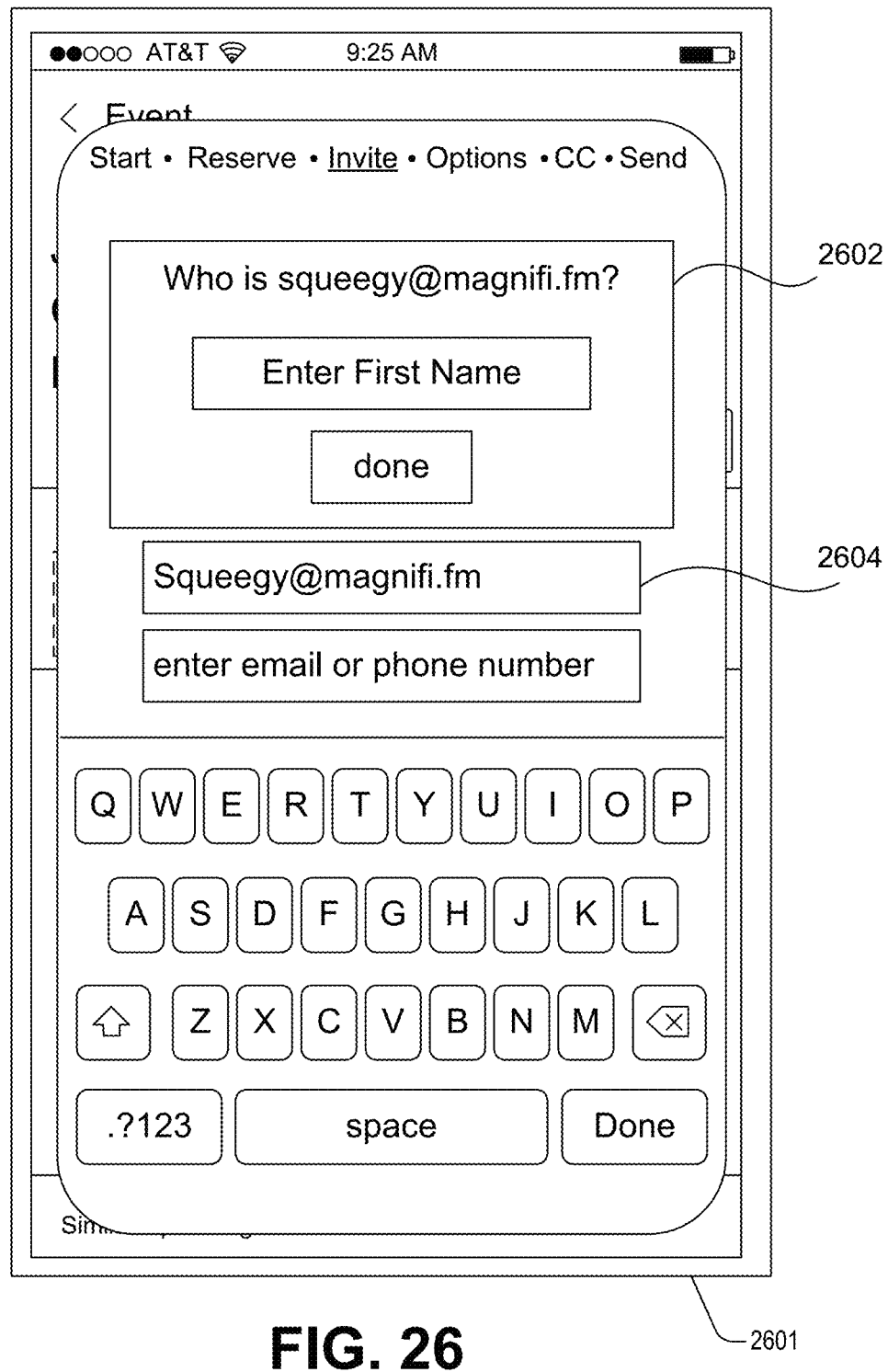

FIG. 26 illustrates an example screenshot of a graphical user interface (GUI) 2601 which may be configured or designed to enable the Host to associate a name with a specific Invitee email address or phone number (e.g., as shown at 2602, 2604), so that this information may be saved in the Host's MAGNIFI account (and/or other network account) for future Reservation Groups. In at least some mobile device environments, the Host may invite Invitees by entering the phone numbers of the Invitees to cause one or more text/SMS invitation message(s) to be sent to the identified Invitee(s).

Figure 27:
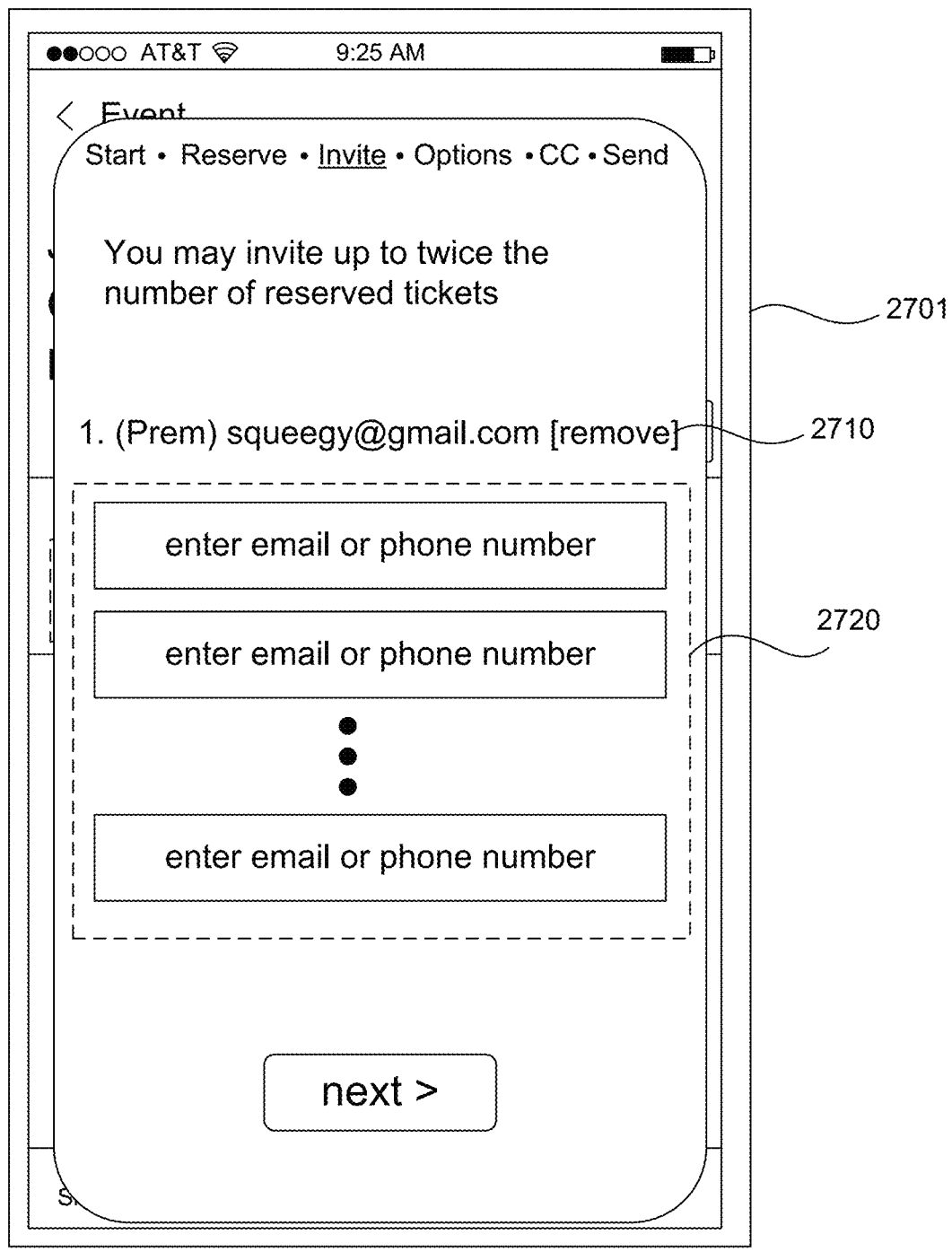

FIG. 27 illustrates an example screenshot of a graphical user interface (GUI) 2701 which may be configured or designed to enable the Host to add additional Invitees to the Group Reservation. In at least some embodiments, the MAGNIFI System may restrict the number of Invitees of a given Group Reservation, which may be based at least partially on the number of tickets being reserved. For example, as illustrated in the example embodiment of FIG. 27, the Ticket Reservation/Purchasing System (e.g., MAGNIFI) System may allow the Host to invite up to twice the number of reserved tickets. In at least some mobile device environments, the Host may invite Invitees by entering the phone numbers of the Invitees to cause one or more text/SMS invitation message(s) to be sent to the identified Invitee(s) (e.g., as shown at 2720).

Figure 28:
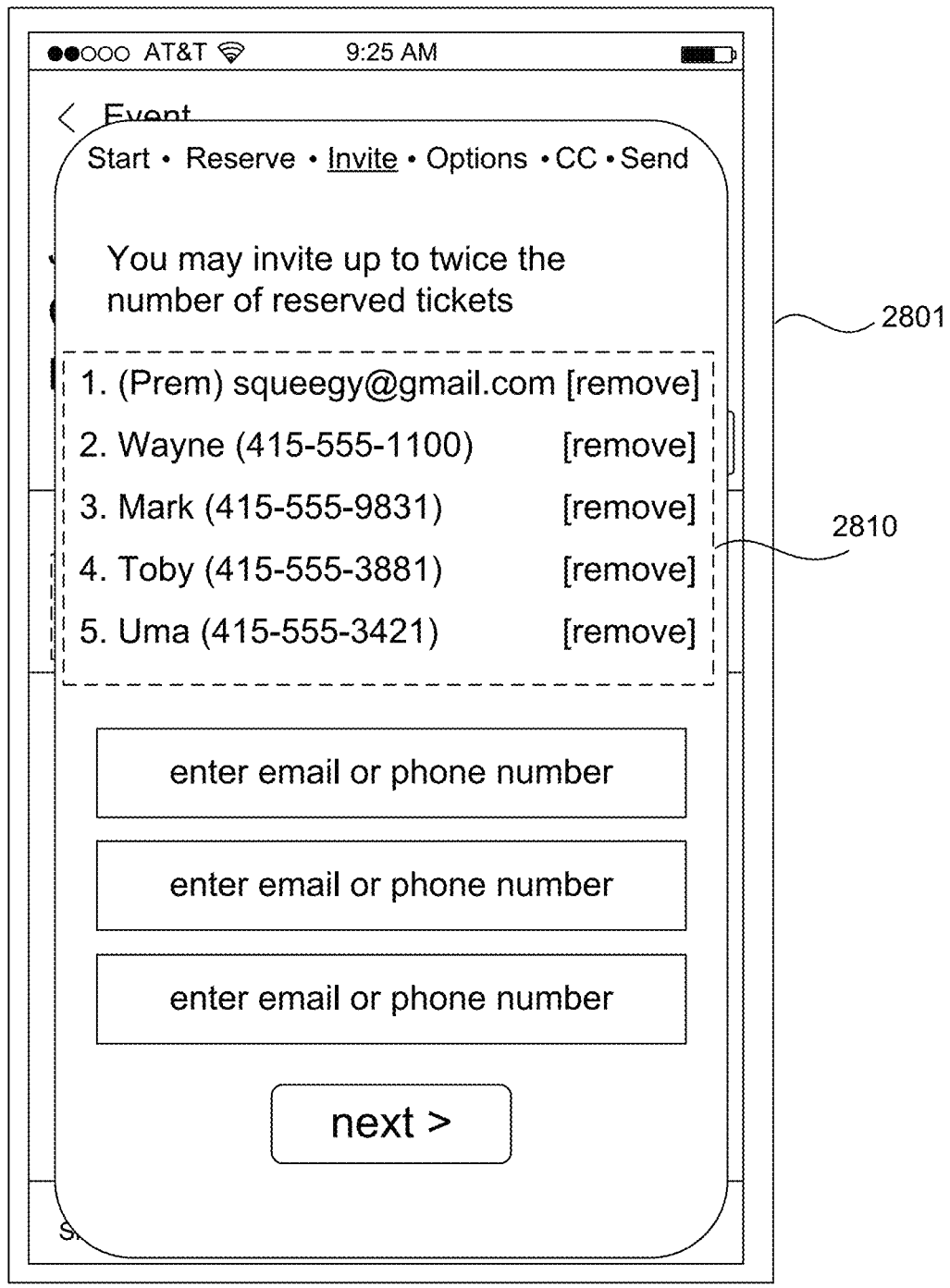

FIG. 28 illustrates an example screenshot of a graphical user interface (GUI) 2801 which may be configured or designed to enable the Host to review, update, and/or modify the Group Reservation Invitee list. As illustrated in the example embodiment of FIG. 28, it is assumed that the Host has entered contact information for five Invitees 2810. One of the Invitees will receive a Reservation Group invitation via email, and four of the Invitees will receive a Reservation Group invitation via SMS.

FIG. 29 illustrates an example screenshot of a graphical user interface (GUI) 2901 which may be configured or designed to enable the Host to view ticket purchase pricing information (2930) for one or more tickets reserved by the Host. In the specific example embodiment of FIG. 29, it is assumed that the Host has reserved a total of 8 tickets (2910), 2 of which the Host has reserved for himself (2920), and 6 of which the Host has reserved for Invitees. GUI 2901 also indicates (2910) that the purchasing of the Host's 2 reserved tickets is non-conditional. In at least some embodiments, the Host may have another opportunity to edit or modify their selection of total tickets reserved, tickets reserved for the Host, and/or whether Host-reserved tickets should be purchased conditionally or unconditionally. If the Host makes a change to the number of Host-reserved tickets, the ticket purchase information may be automatically and dynamically adjusted to implement/reflect the new selection(s)/modification(s).

Figure 30:

FIG. 30 illustrates an example screenshot of a graphical user interface (GUI) 3001 which may be configured or designed to enable the Host to enter their payment information (e.g., via GUI portion 3010) in order to reserve and/or purchase their Host-reserved tickets. The Host may have the Ticket Reservation/Purchasing System (e.g., MAGNIFI System) store the Host's payment information for future Reservation Group initiations. In the specific example embodiment of FIG. 30 (e.g., as shown at 3020), it is assumed that the Host has previously indicated that they wish to purchase their Host-reserved tickets conditionally (e.g., when a minimum specified number of Invitees join the Reservation Group and purchase Invitee tickets). The Host may "follow" the venue and/or the artist performing at the Reservation Group event (e.g., as shown at 3010), in order to receive notifications about future events involving the venue and/or the performing artist. The window of time (e.g., as shown at 3020) in which the Reservation must be converted into a ticket purchase may be displayed, such that the Host understands the time constraint. According to different embodiments, this window of time may vary event by event depending on configurations and requirements of artists, venues, ticketing companies, promoters, Ticket Reservation/Purchasing System, etc.

Figure 31:
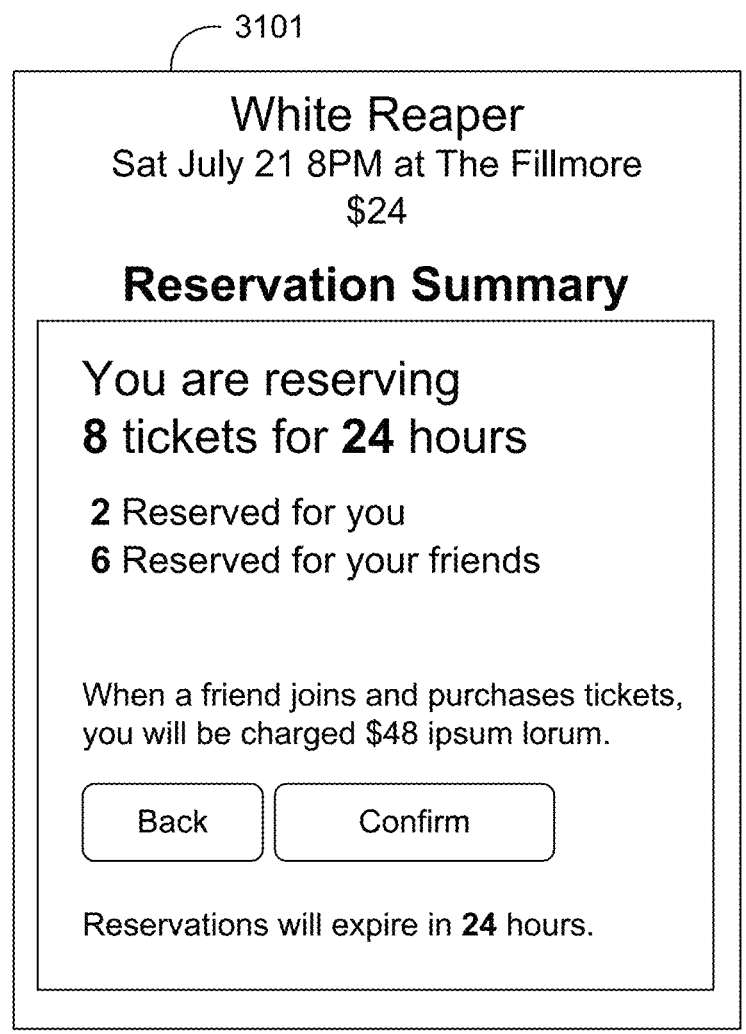

FIG. 31 illustrates an example screenshot of a graphical user interface (GUI) 3101 which may be configured or designed to enable the Host to view a summary page providing the details of the Reservation Group they are about to initiate. Such confirmation page may indicate, for example, one or more of the following (or combinations thereof):

The total number of tickets reserved, the window of time in which the reservations must be converted into ticket purchases;

How many of the total reserved tickets are Host-reserved tickets;

How many of the total reserved tickets are Invitee-reserved tickets;

Whether the Host-reserved tickets should be purchased conditionally upon the reservation acceptance and ticket purchase of one or more Invitees, or unconditionally regardless of whether an Invitee purchases tickets or not.

Whether Invitees may add Additional Invitees to the Reservation Group and whether a Reservation Group invitation may be shared publicly online.

And/or other details about the Host's configuration of the Reservation Group.

Figure 32:
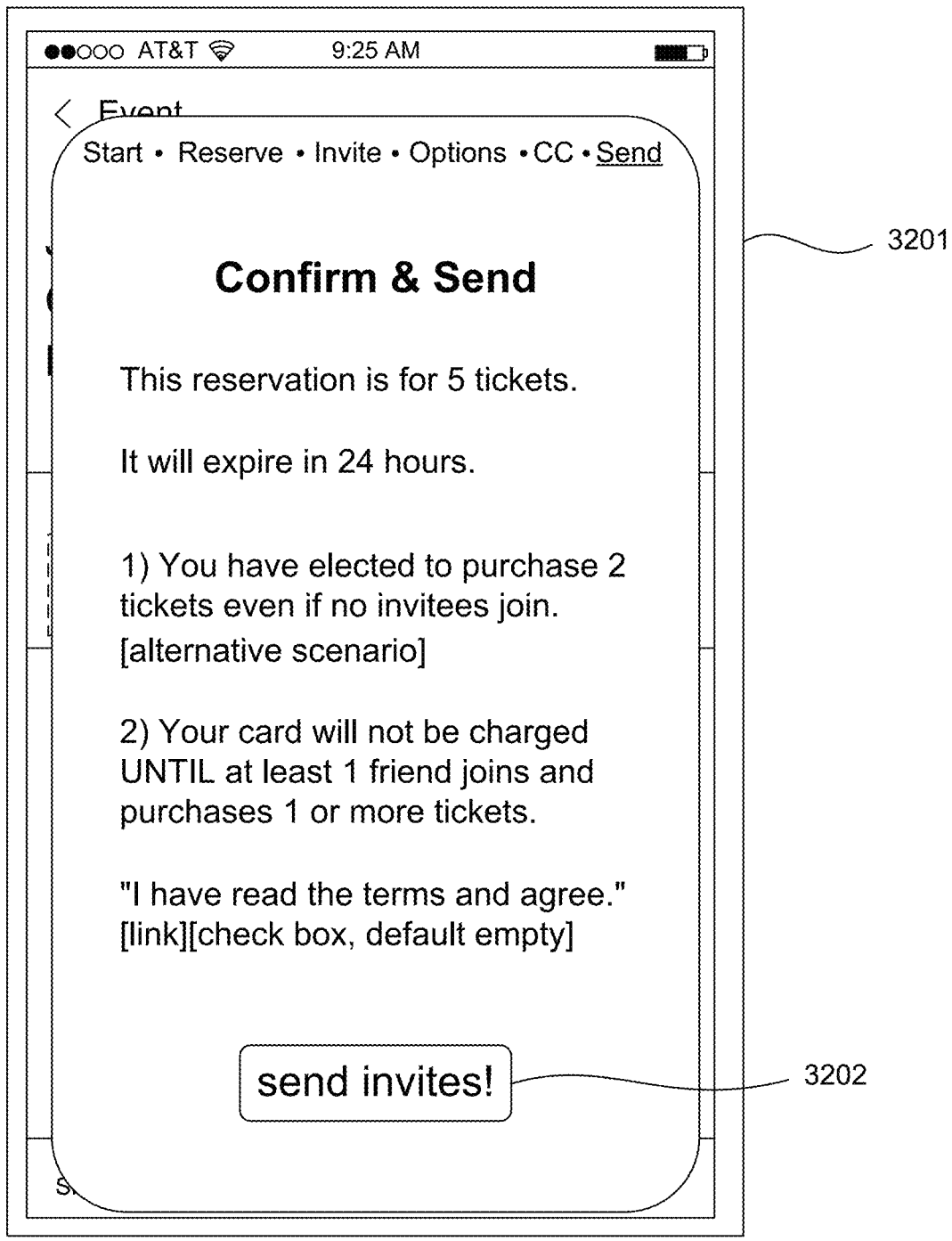

FIG. 32 illustrates alternate embodiment of a Reservation Group Summary Page GUI 3201 in which the Host has either previously indicated that they wish to purchase their Host-reserved tickets unconditionally (e.g., regardless of whether any Invitee accepts the Reservation and purchases one or more tickets), or conditionally (e.g., only if one or more Invitees accepts the Reservation and purchases one or more tickets). In at least some embodiments, one or more of the GUIs described herein may be configured or designed to enable the Host to configure or define one or more conditional purchase parameters (e.g., to be satisfied for triggering automatic conditional purchasing of the Host's reserved tickets).

Figure 33:
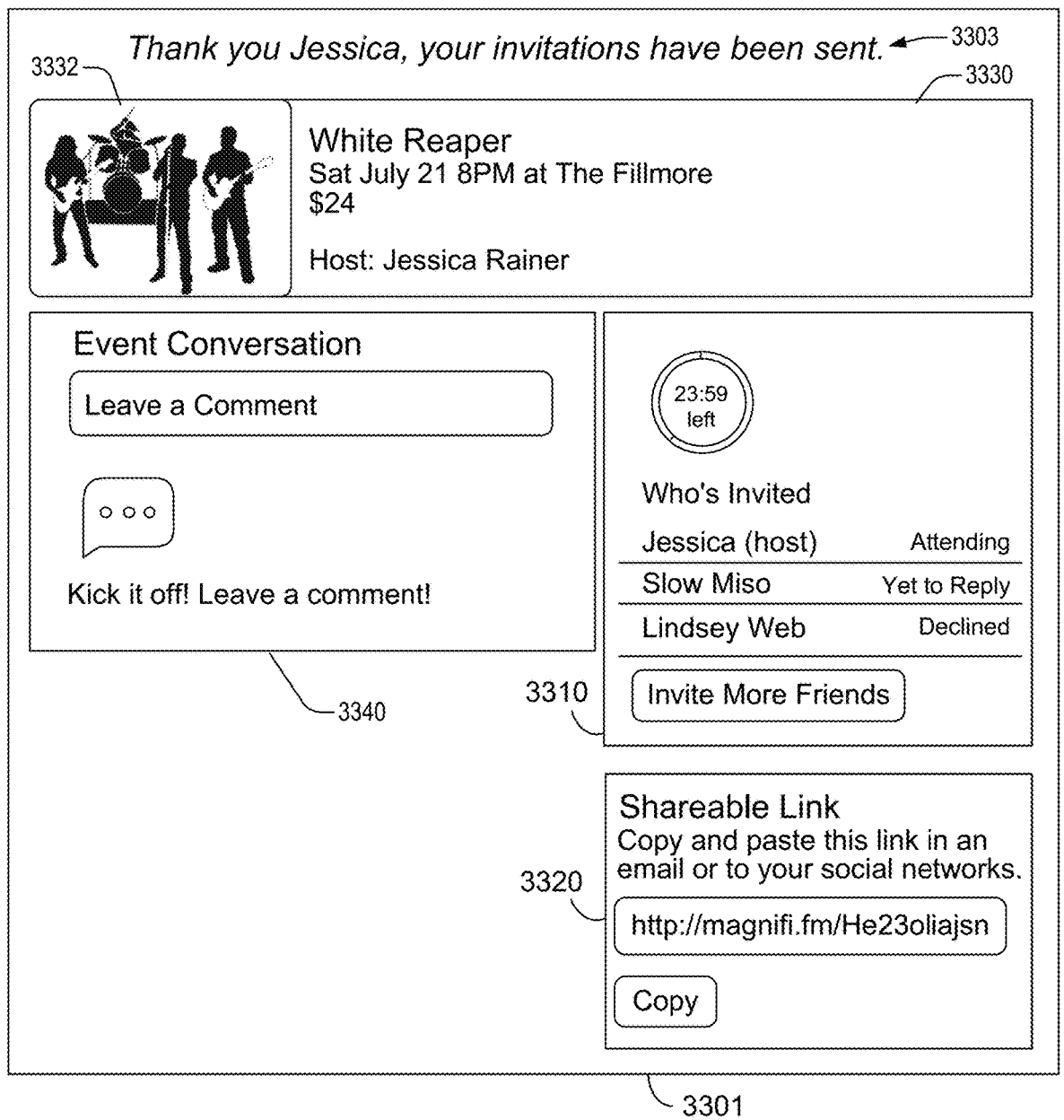

FIG. 33 illustrates an embodiment of a Reservation Group Event Page GUI 3301 which may be displayed to the Host after confirming the initiation of the Reservation Group. According to different embodiments, Reservation Group Event Page GUI 3301 may be configured or designed to indicate or provide functionality for one or more of the following (or combinations thereof):

Confirmation 3303 that the Host-designated Invitees have been successfully invited to the Reservation Group.

Event details 3330 (e.g., performer/team, date, venue, location, ticket price).

Event media 3332 (e.g., performer/team image, music, video).

Name of the Reservation Group Host.

Event conversation/commenting functionality 3340.

Time remaining to convert reserved tickets into ticket purchases 3310.

Invitee names 3310.

Invitee reservation acceptance status (attending, declined, yet to reply, maybe) 3310.

The ability for the Host to invite additional Invitees (this functionality may not be enabled for Invitees, depending on the Host's configuration of the Reservation Group) 3310.

Shareable link 3320 for the Reservation Group event page, such that this link may be posted on social channels (e.g., Facebook, Twitter, etc.), in emails, in SMS messages, etc. for others to come to the event page and join the Reservation Group.

And/or other types of content/features described and/or referenced herein.

FIG. 34 illustrates an example scenario (showing selected GUI portions) in which it is assumed that that Host has elected to only reserve 2 tickets for the Reservation Group. In this example, the Ticket Reservation/Purchasing System need not require that the Host provide input regarding how many tickets to reserve for the Host vs. how many to reserve for Invitees, because, in this example scenario, the Host must always reserve at least one ticket for himself. Accordingly, in some embodiments one or more portions of the Ticket Reservation Group Invitation process may be omitted, as appropriate. For example, in the specific example embodiment of FIG. 34, the Host may not be prompted to provide input regarding how many tickets to reserve for the Host vs. how many to reserve for Invitees, but may still be prompted by the Ticket Reservation/Purchasing System to provide input regarding whether the Host's reserved ticket is to be purchased conditionally or unconditionally.

Figure 35:
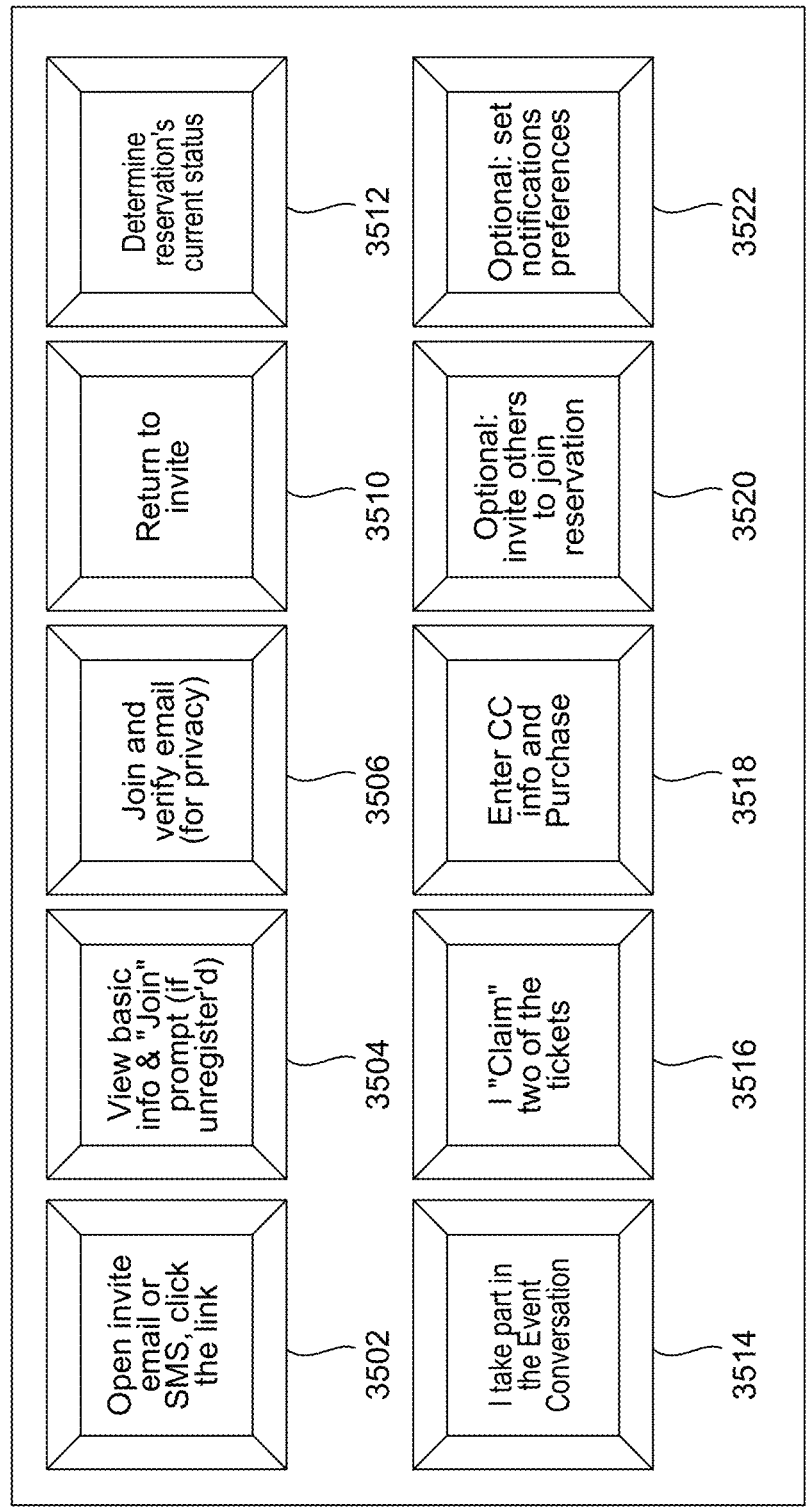

FIG. 35 depicts an overview of one embodiment of various actions or operations which may occur during an Event Ticket Reservation Group process conducted for one or more Reservation Group Invitee(s), which, for example, may include, but are not limited to, one or more of the following (or combinations thereof):

- The Invitee receives 3502 a Reservation Group invitation via email or SMS, and clicks the associated invitation link.
- The Invitee may view 3504 basic information about the event and the Reservation Group, and may be prompted to join MAGNIFI (if the Invitee does not have a MAGNIFI account)
- The Invitee creates 3506 a MAGNIFI account and verifies their email
- The Invitee is then returned 3510 to the Reservation Group event page
- The Invitee is able to view 3512 the current status of the Reservation Group, including whether there are any remaining reserved tickets available.
- The Invitee may participate 3514 in a comment thread regarding the Reservation Group and the event on the event page.
- The Invitee may claim 3516 available reserved tickets, subject to the Reservation Group parameters if any.
- The Invitee may enter 3518 their payment information and purchase the reserved ticket(s) they claimed for themselves.
- Subject to Reservation Group parameters, the Invitee may have the option 3520 of inviting Additional Invitees to the Reservation Group.
- Subject to Reservation Group parameters, the Invitee may have the option 3522 of setting their preferences regarding Reservation Group notifications, including updates on the attendance status of other Invitees and event-related information, and/or muting all (or selected) Reservation Group notifications.

Figure 36:
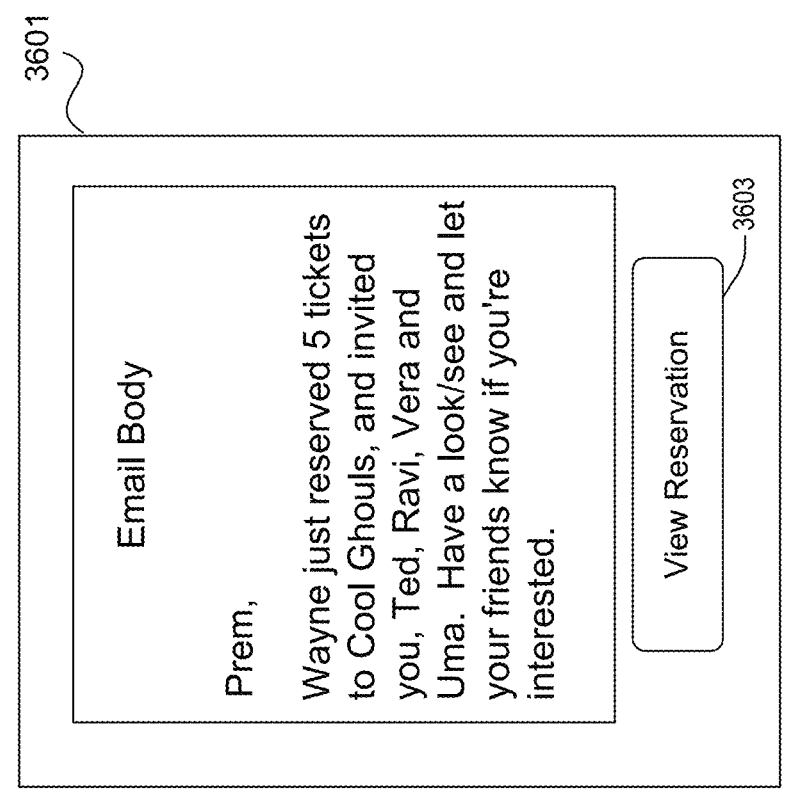

FIG. 36 illustrates an example screenshot of a Host to Reservation Group invitation 3601 as seen by Invitees via email notification. As illustrated in the example embodiment of FIG. 36, the invitation may also display a hyperlinked button/link 3603 for enabling the Invitee to access the Reservation Group event page.

Figure 37:
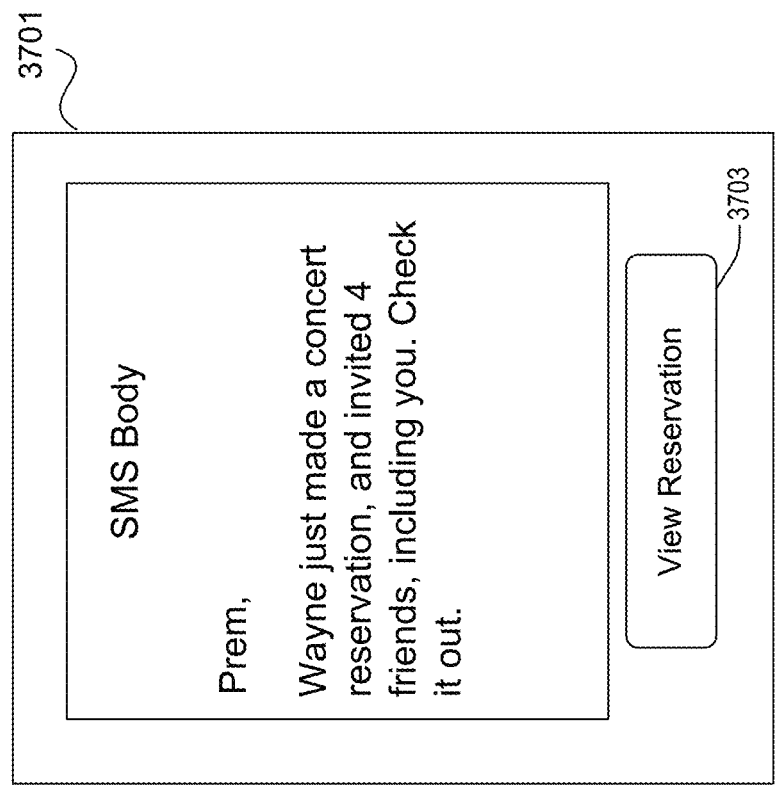

FIG. 37 illustrates an example screenshot of a Host to Reservation Group invitation 3701 as seen by Invitees via SMS notification. As illustrated in the example embodiment of FIG. 37, the invitation may also display a hyperlinked button/link 3703 for enabling the Invitee to access the Reservation Group event page.

Figure 38:
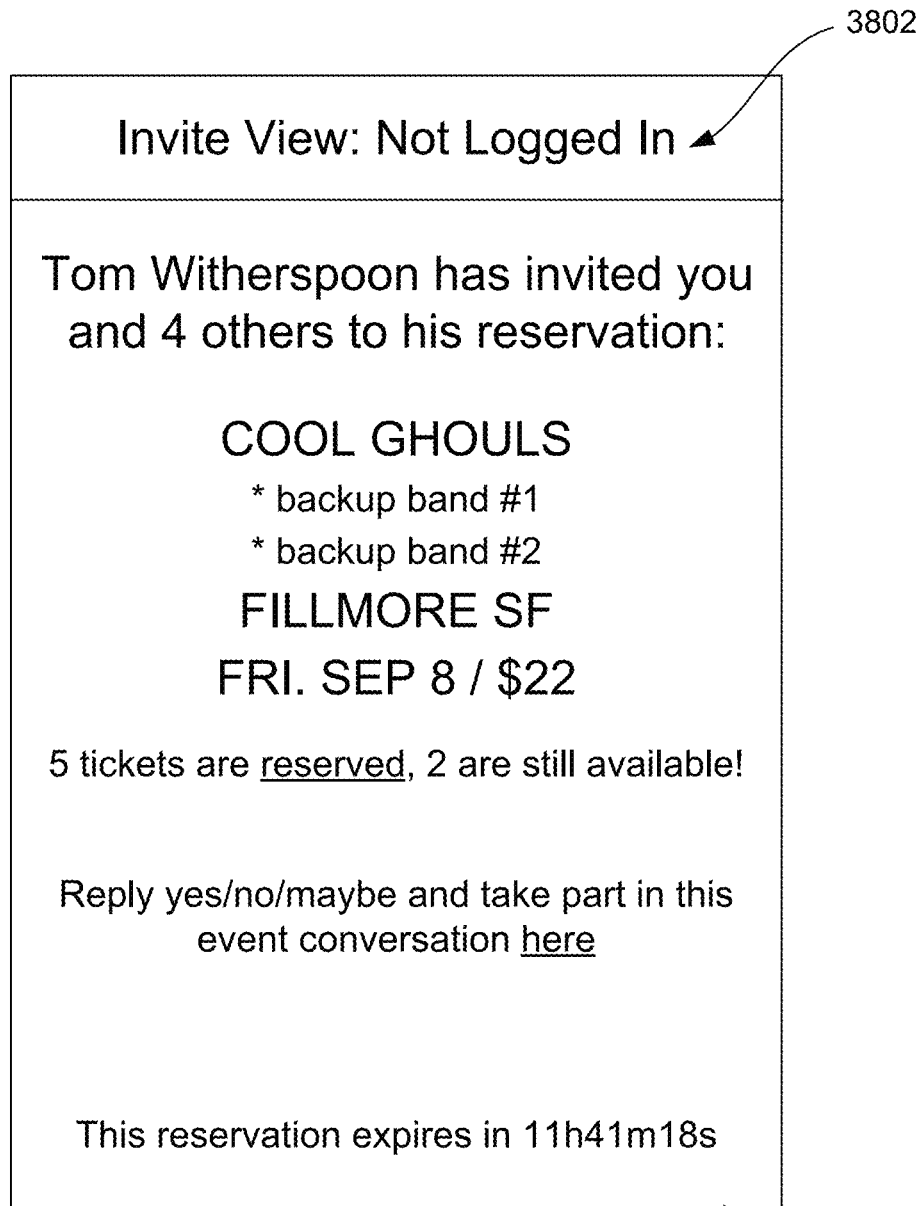

FIG. 38 illustrates an example embodiment of a Reservation Group event page 3801 as seen by an Invitee, for a specific scenario in which the Invitee either does not have a MAGNIFI user account or is not currently logged in (3802) to their MAGNIFI account. In this embodiment, because the Invitee is not logged in to an existing MAGNIFI account, the user may only see basic information about the Reservation Group, such as, for example:

- the Host's name;
- artist/performer/team name(s);
- venue name;
- location;
- event date/time;
- ticket price;
- total number of Invitees;
- total number of reserved tickets;
- total number of claimed reserved tickets;
- total number of available reserved tickets;
- time window remaining to accept and claim reserved tickets.

In some embodiments, the Invitee may be prompted or have the ability to log-in to their user account or create a user account in order to see more complete Reservation Group details, including, for example, the names or identities of Invitees of the Reservation Group.

Figure 39:
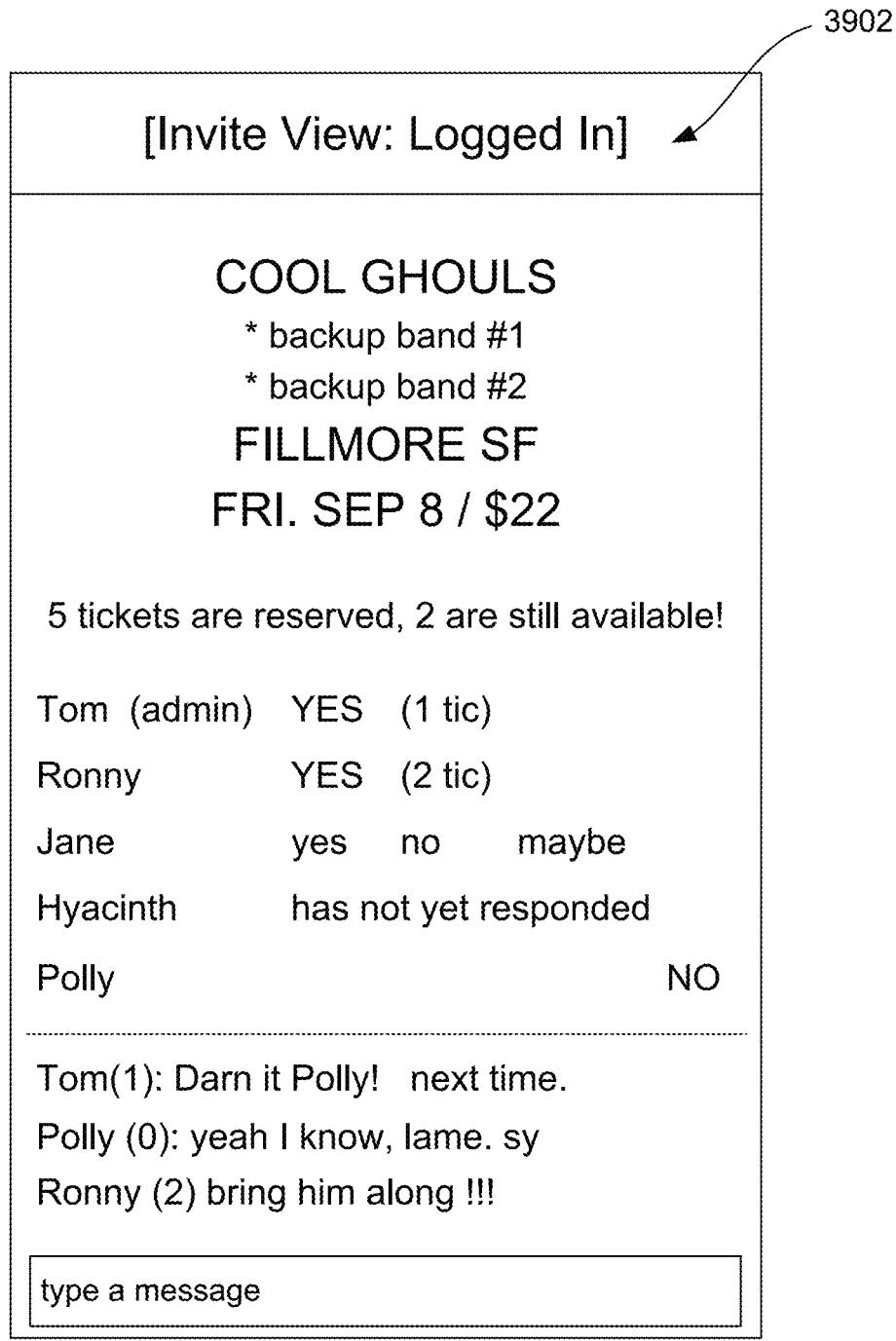

FIG. 39 illustrates an embodiment of a Reservation Group event page 3901 as seen by an Invitee, for a specific scenario in which the Invitee is currently logged in (3902) to their MAGNIFI user account. In this embodiment, because the Invitee is logged in to an existing MAGNIFI user account, the user may view and/or access comprehensive information about the Reservation Group, such as, for example, one or more of the following (or combinations thereof):

- the Host's name;
- artist/performer/team name(s);
- venue name;
- location;
- event date/time;
- ticket price;
- total number of Invitees;
- total number of reserved tickets;
- total number of claimed reserved tickets;
- total number of available reserved tickets;
- time window remaining to accept and claim reserved tickets;
- name of each Invitee in the Reservation Group;
- acceptance status of each Invitee;
- number of reserved tickets claimed by each Invitee;
- any comments posted by Invitees in the Reservation Group event page;
- etc.

In some embodiments, the logged-in Invitee may also be provided with the ability to add comments to a comment thread for Invitees on the Reservation Group event page.

Figure 40:
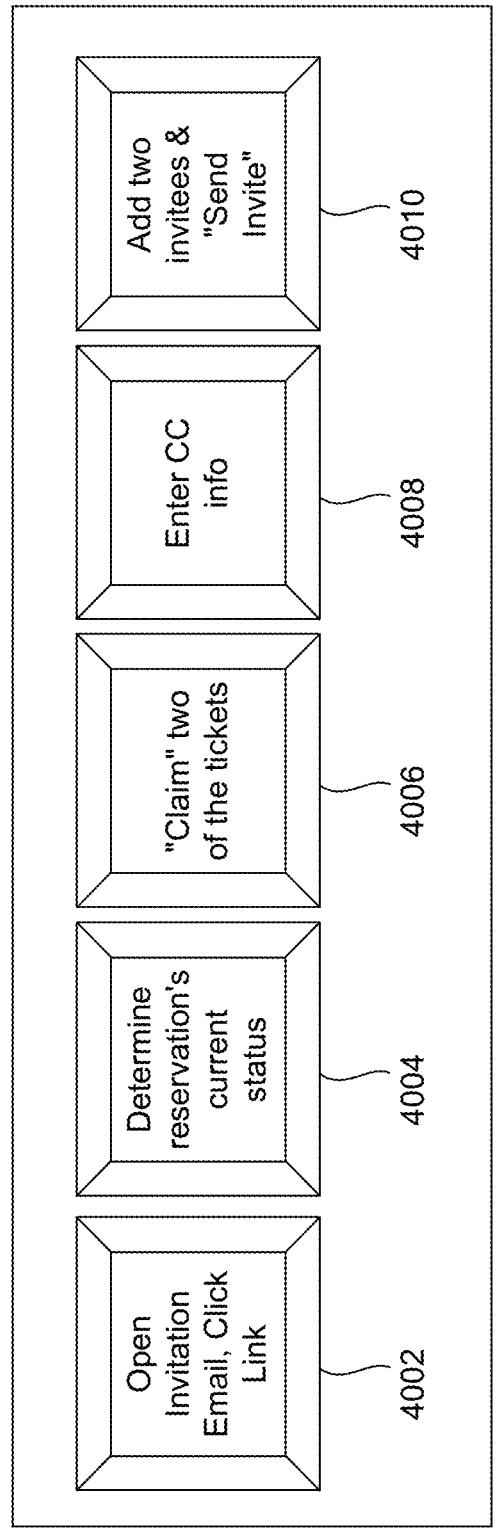

FIG. 40 depicts an overview of an alternate embodiment an Event Ticket Reservation Group process conducted for one or more Reservation Group Invitee(s), which, for example, may involve initiating and/or performing various actions or operations such as, for example, one or more of the following (or combinations thereof):

- The Invitee receives 4002 a Reservation Group invitation via email or SMS, and clicks the associated invitation link.
- The Invitee is able to view 4004 the current status of the Reservation Group, including whether there are any remaining reserved tickets available.
- The Invitee may claim 4006 available reserved tickets, subject to the Reservation Group parameters if any.
- The Invitee may enter 4008 their payment information and purchase the reserved ticket(s) they claimed for themselves.
- Subject to Reservation Group parameters, the Invitee may add contact information for Additional Invitees and send 4010 Reservation Group invitation(s) to such Additional Invitees to join the Reservation Group.

FIG. 41 illustrates an example embodiment of an Alert-Notification Table 4101, which may be populated with notification/alert triggering criteria (4110) for the Reservation Group, and corresponding notification content (4120) (e.g., associated with one or more specific notification trigger(s)).

Figure 42:
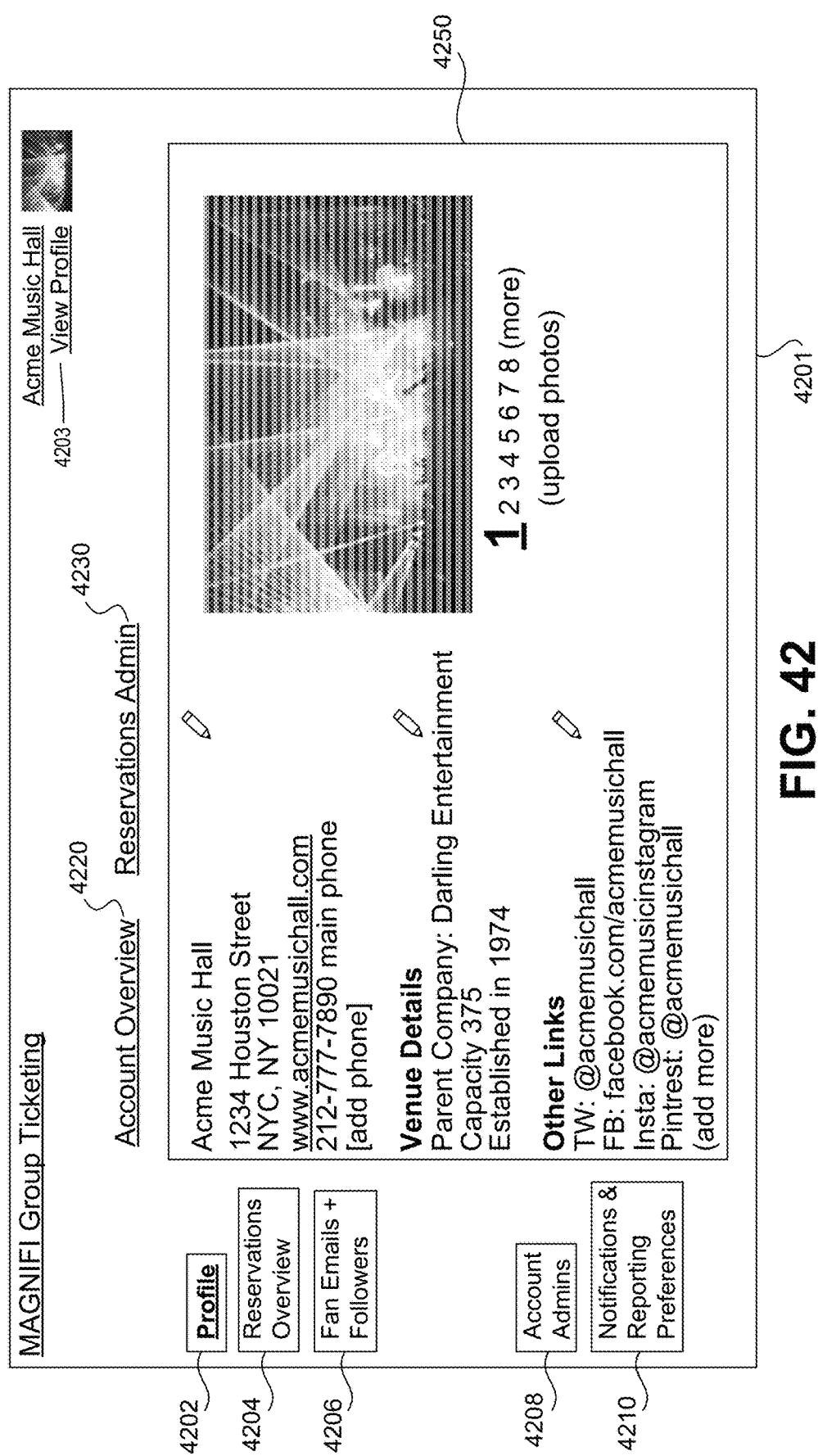

FIG. 42 illustrates an example screenshot of a Venue Dashboard GUI 4201. As illustrated in the example embodiment of Figure the Venue Dashboard GUI may be configured or designed to provide user access to different types of information relating to the identified Venue, such as, for example: Venue's "Profile" 4202, "Reservations Overview" 4204, "Fan Emails+Followers" 4206, "Account Admins" 4208, "Notification & Reporting Preferences" 4210, etc. As illustrated in the example embodiment of FIG. 42, the Venue "Profile" content is displayed, indicating general information regarding the Venue, including, for example, one or more editable fields for name, address, website, phone number, details, social network links, photos, etc. In at least one embodiment, the Venue Dashboard GUI may also provide a link (4203) for viewing the Venue's publicly facing profile on MAGNIFI. As illustrated in the example embodiment of FIG. 42, the Venue Dashboard GUI may also include functionality for providing access to Venue Account Overview information 4220, and Reservations Administration 4230.

In the example GUI of FIG. 43, representing one embodiment of a Venue Dashboard GUI 4301, Venue "Reservations Overview" information 4350 is displayed, indicating, for example:

For Confirmed Reservations—Over the last 7 days and the last 30 days—the number of tickets currently allocated, the number of confirmed reservations, the number of purchased tickets, the associated dollar amount of purchased tickets, etc.

For Outstanding Reservations—the number of active Reservation Groups, the number of tickets reserved, the number of remaining tickets available, etc.

Figure 44:
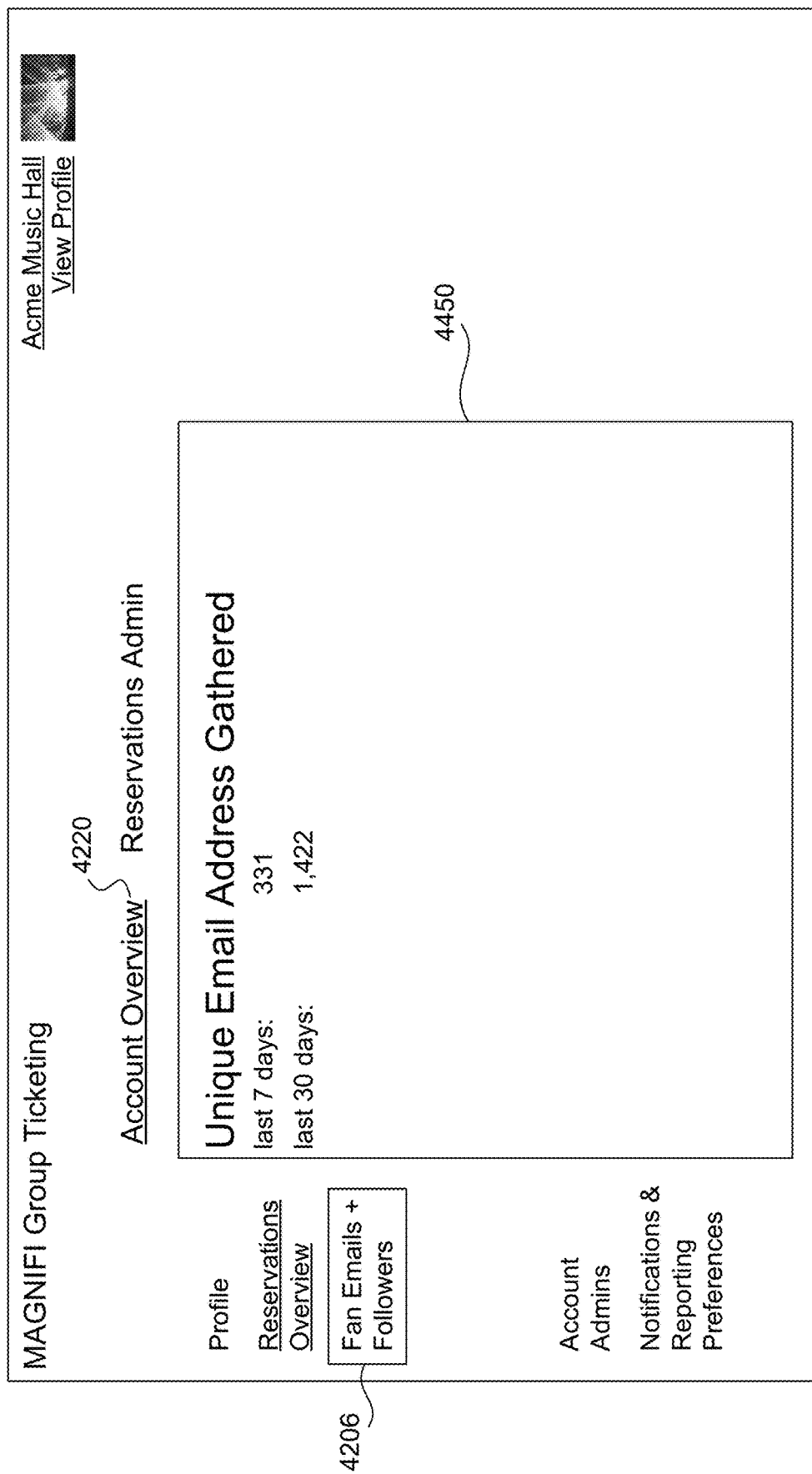

In the example GUI of FIG. 44, representing one embodiment of a Venue Dashboard GUI 4401, Venue "Fan Emails+Followers" information 4450 is displayed, indicating, for example, unique Host and/or Invitee email addresses collected by the Venue via the Ticket Reservation/Purchasing System (e.g., over the last 7 days and the last 30 days).

In the example GUI of FIG. 45, representing one embodiment of a Venue Dashboard GUI 4501, "Account Admins" information 4450 is displayed, and includes various types of information relating to users who are authorized to access the Venue Dashboard GUI, including, for example, names, usernames, permissions, phone numbers, email addresses, etc. for each such authorized user.

In the example GUI of FIG. 46, representing one embodiment of a Venue Dashboard GUI 4601, "Reservations Admin" information is displayed, which may include event ticketing data for each event at the Venue (e.g., organized by event date), including, for example: date, artist, number of tickets allocated to MAGNIFI TRPS, tickets sold, tickets pending, tickets available, etc. In some embodiments, there is also an option to pause, recall, resume and stop offering tickets through the MAGNIFI TRPS platform for each event. In some embodiments, the GUI may include calendaring functionality, which may be configured or designed to enable a Venue user to identify a particular month and view all (or selected) events at that Venue which are enabled for MAGNIFI TRPS and/or for which advanced ticket reservations are available.

Figure 47:
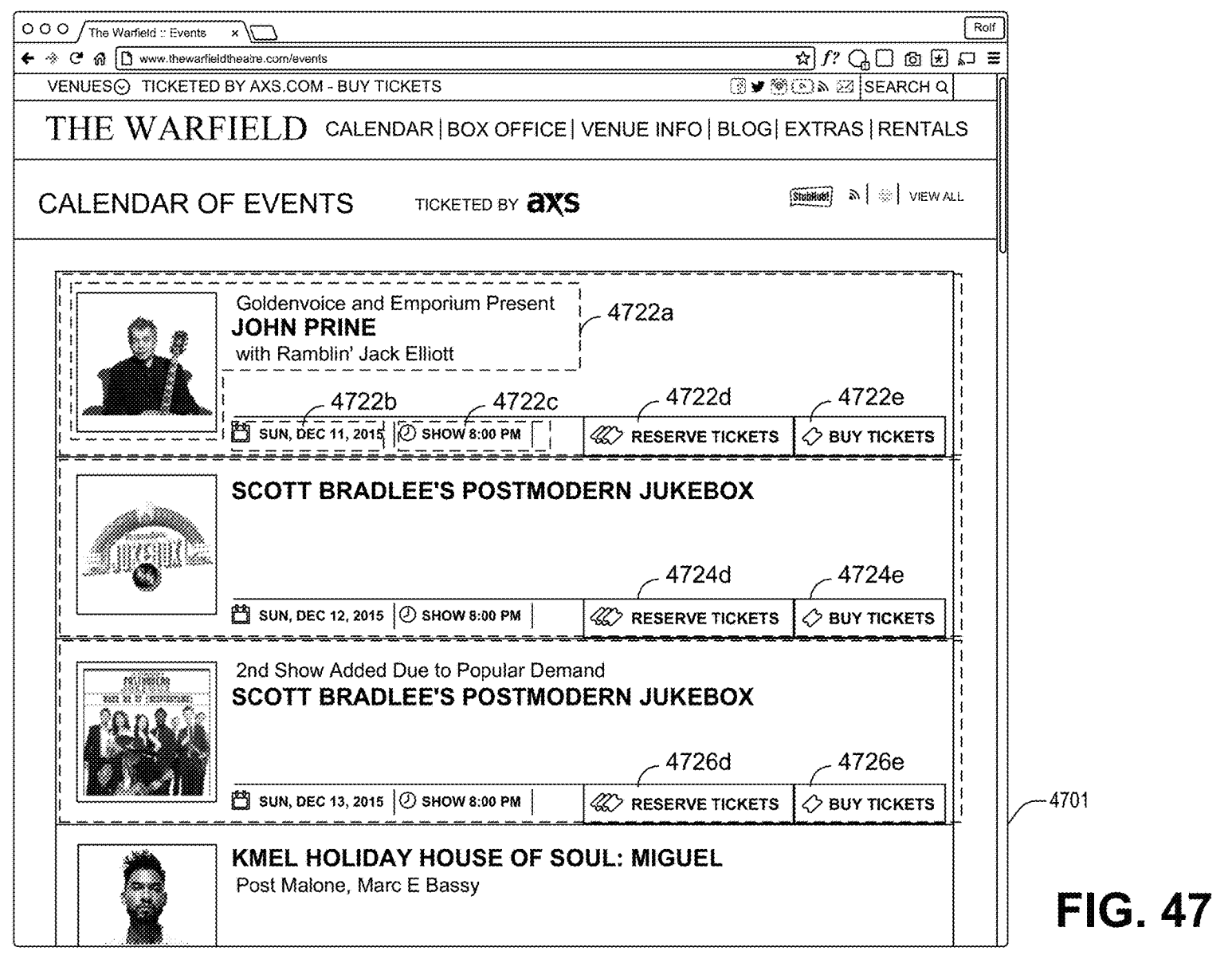

FIG. 47 illustrates one embodiment of a third party web-page GUI 4701 which has been configured or designed to include embedded Ticket Reservation functionality. In at least one embodiment, the third party web-page GUI 4701 may be associated with a third party venue website that is outside of the MAGNIFI platform. For each event listed at this venue, website visitors have the option of buying tickets immediately/outright, and/or reserving tickets by creating a Reservation Group.

Figure 48:
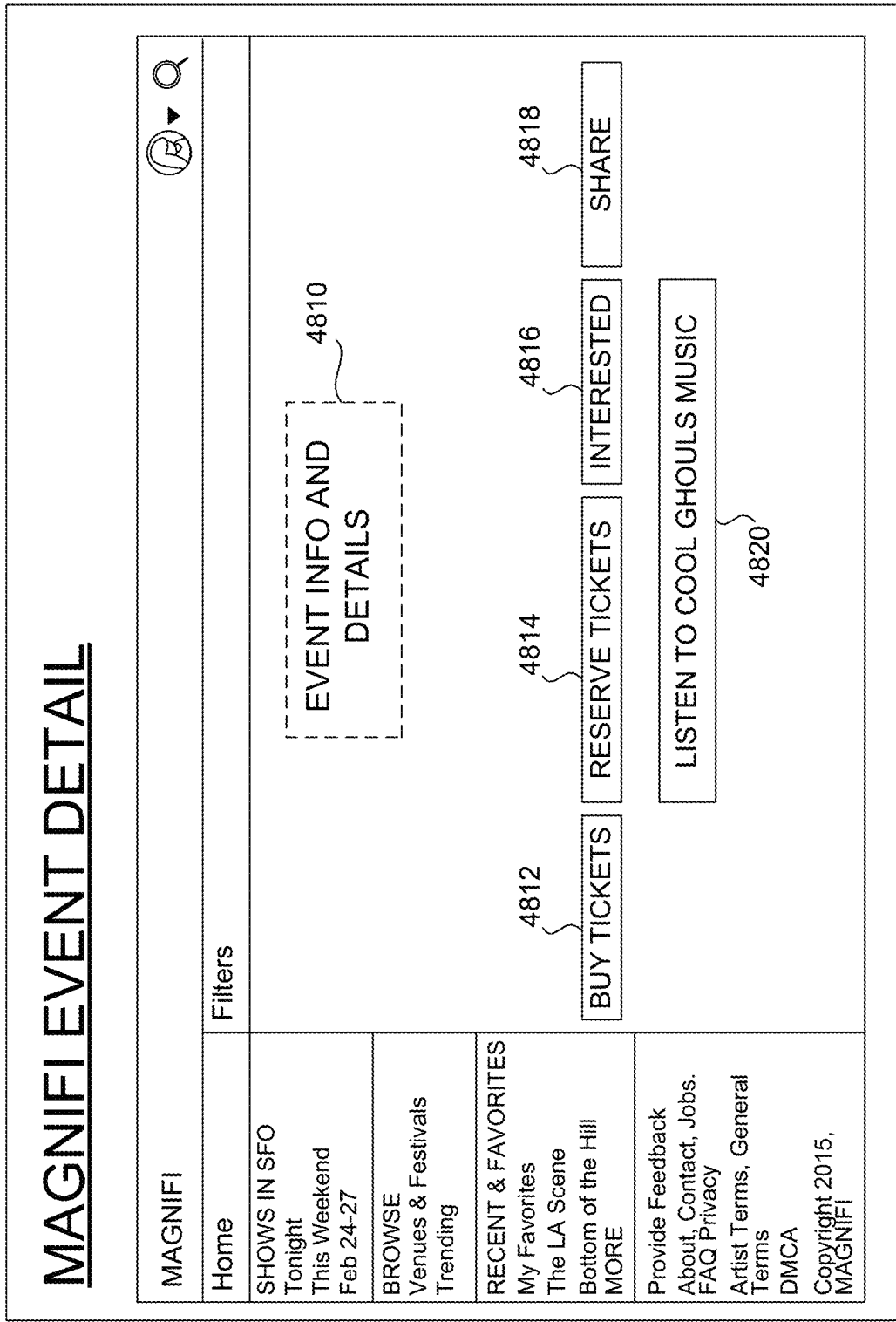

FIG. 48 illustrates one embodiment of an Event Detail GUI 4801, which may be configured or designed to provide various types of group ticket reservation/purchasing functionality (e.g., provided by the Ticket Reservation/Purchasing System or MAGNIFI System) including, for example: "Reserve Tickets" functionality 4814, ticket purchasing functionality 4812, functionality for enabling a user to indicate interest in the event 4816, share event details 4818, listen 4820 to dynamically streamed music performed by artist(s) who will be performing at the event, etc.

Figure 49:

FIG. 49 illustrates one embodiment of a Venue-Events Page GUI 4901, which may be configured or designed to provide information 4910 relating to different upcoming events at the identified venue, as well as group ticket reservation/purchasing functionality for enabling users to reserve tickets 4912 and/or buy tickets 4914.

Figure 50:
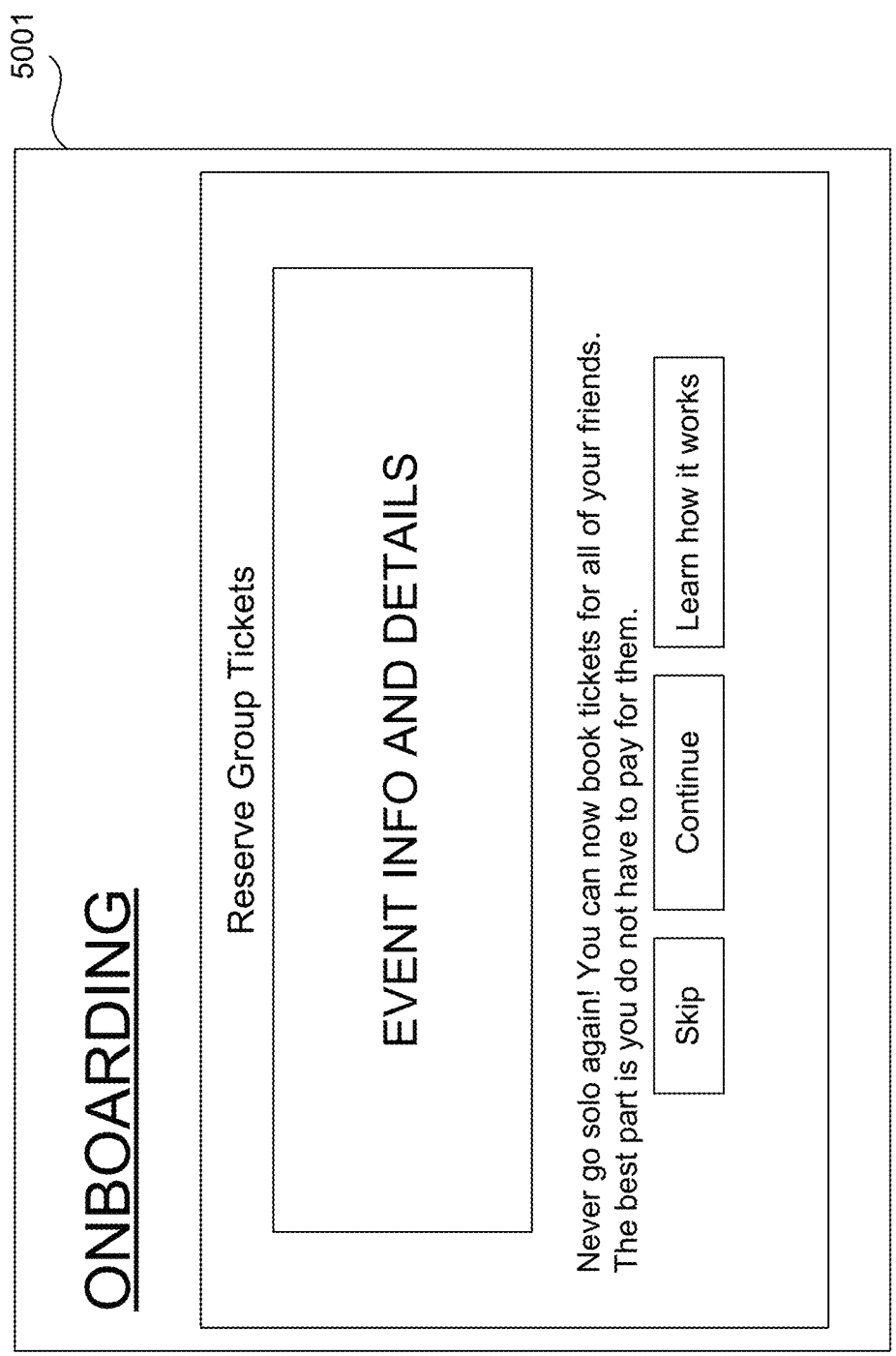

FIG. 50 depicts one embodiment of a Ticket Reservation "Onboarding" GUI 5001. If the user selects the option to "reserve tickets", they may be taken to the reservation initiation page, and presented with information about what to expect in the ticket reservation initiation experience.

Figure 51:
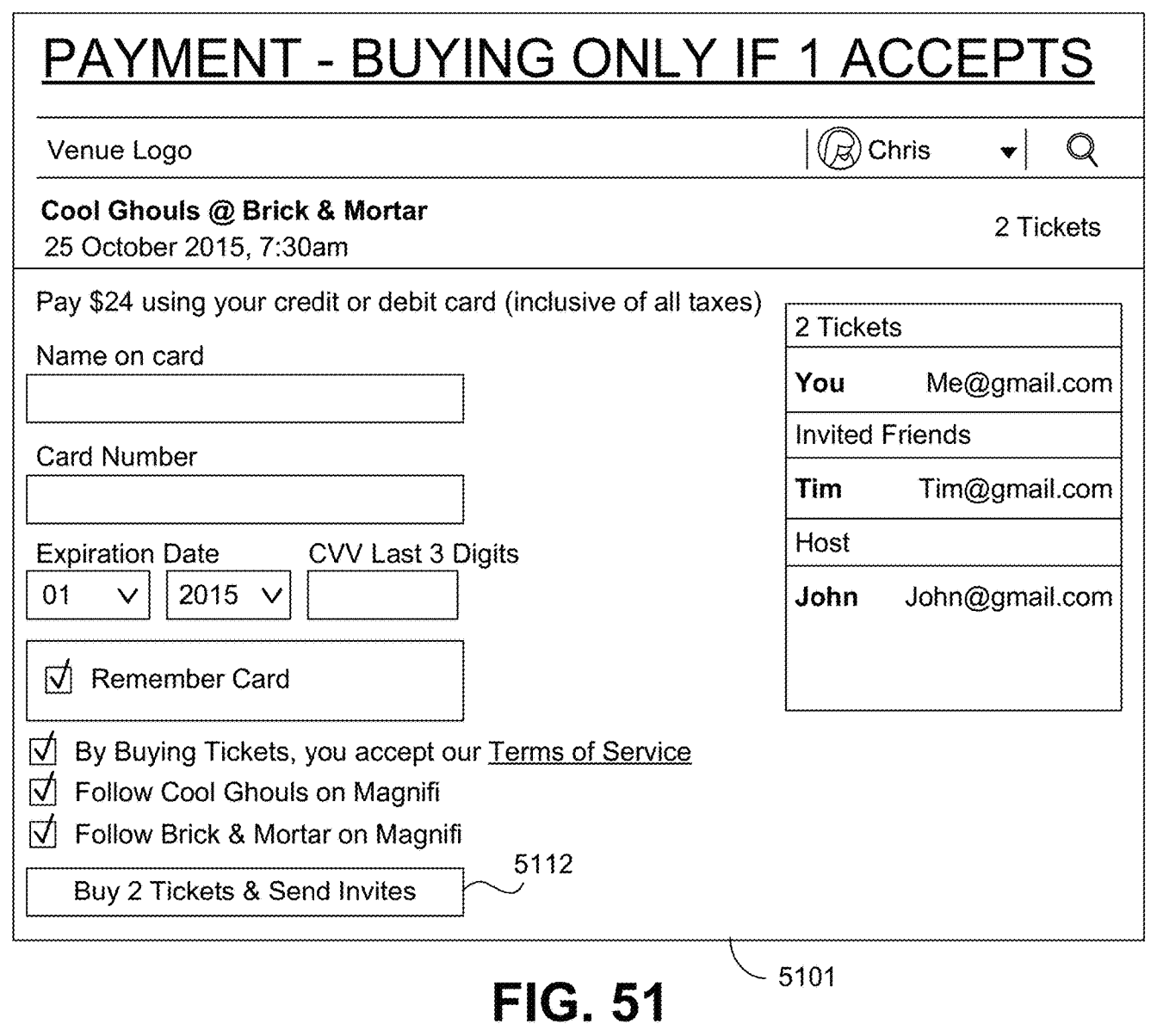

FIG. 51 illustrates one embodiment of a Ticket Purchase Page GUI 5101 as part of the ticket reservation process. This embodiment depicts the ability for the database to store the user's credit card for future Reservation Group initiations. It also depicts sensitive messaging, such that the messaging dynamically adjusts to reflect the selected ticket options.

Figure 52:
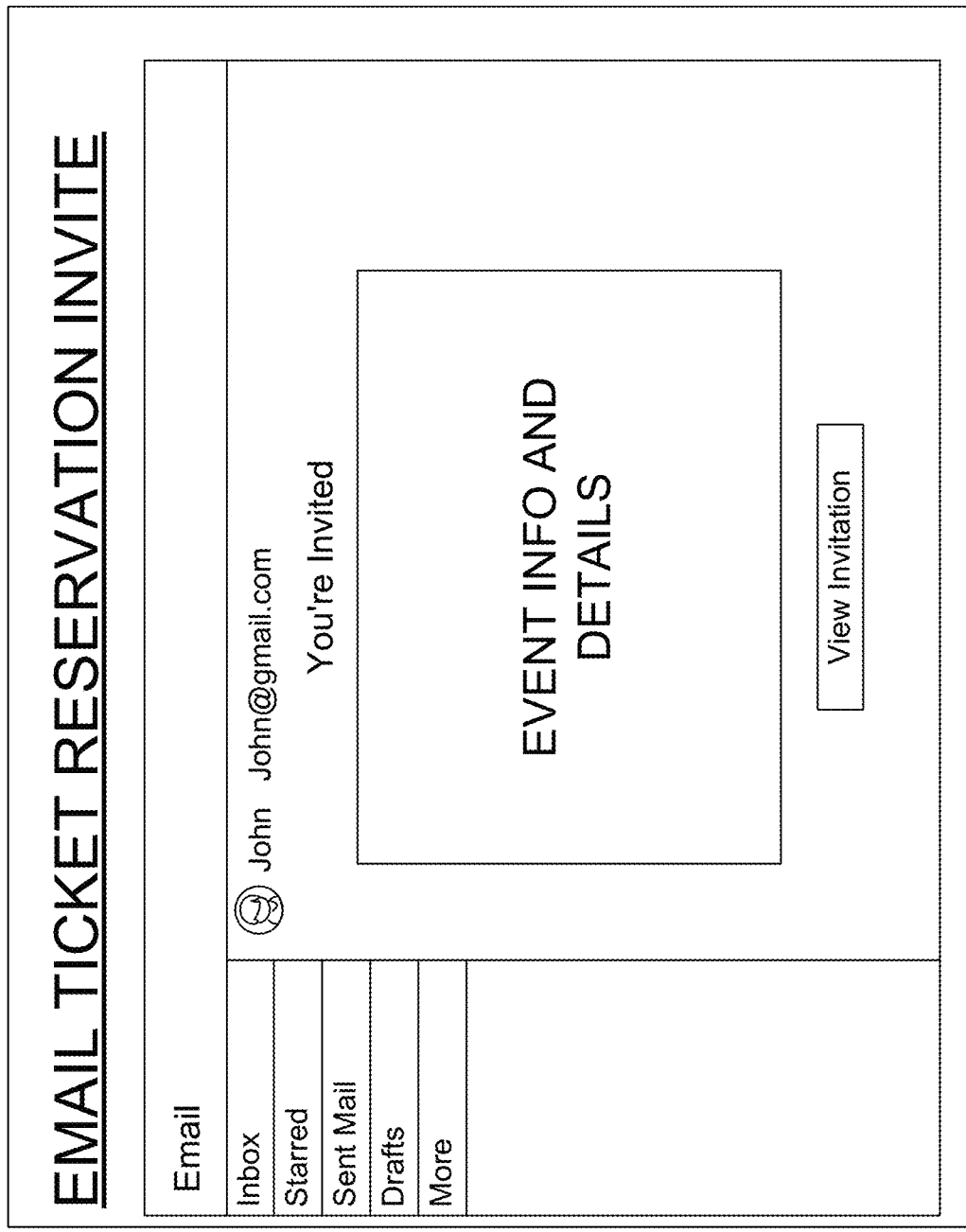

FIG. 52 depicts one embodiment of how a Reservation Group invitation 5201 may appear to an Invitee via an email message or SMS message.

Figure 53:

FIG. 53 illustrates one embodiment of an example Reservation Group Event Page GUI 5301 which may be displayed to an Invitee once they have clicked the invitation link. As illustrated in the example embodiment of FIG. 53, the Invitee can view information about the event, indicate their status (yes, no, maybe), view other invitees, and view a comment thread by other Invitees.

Figure 54:
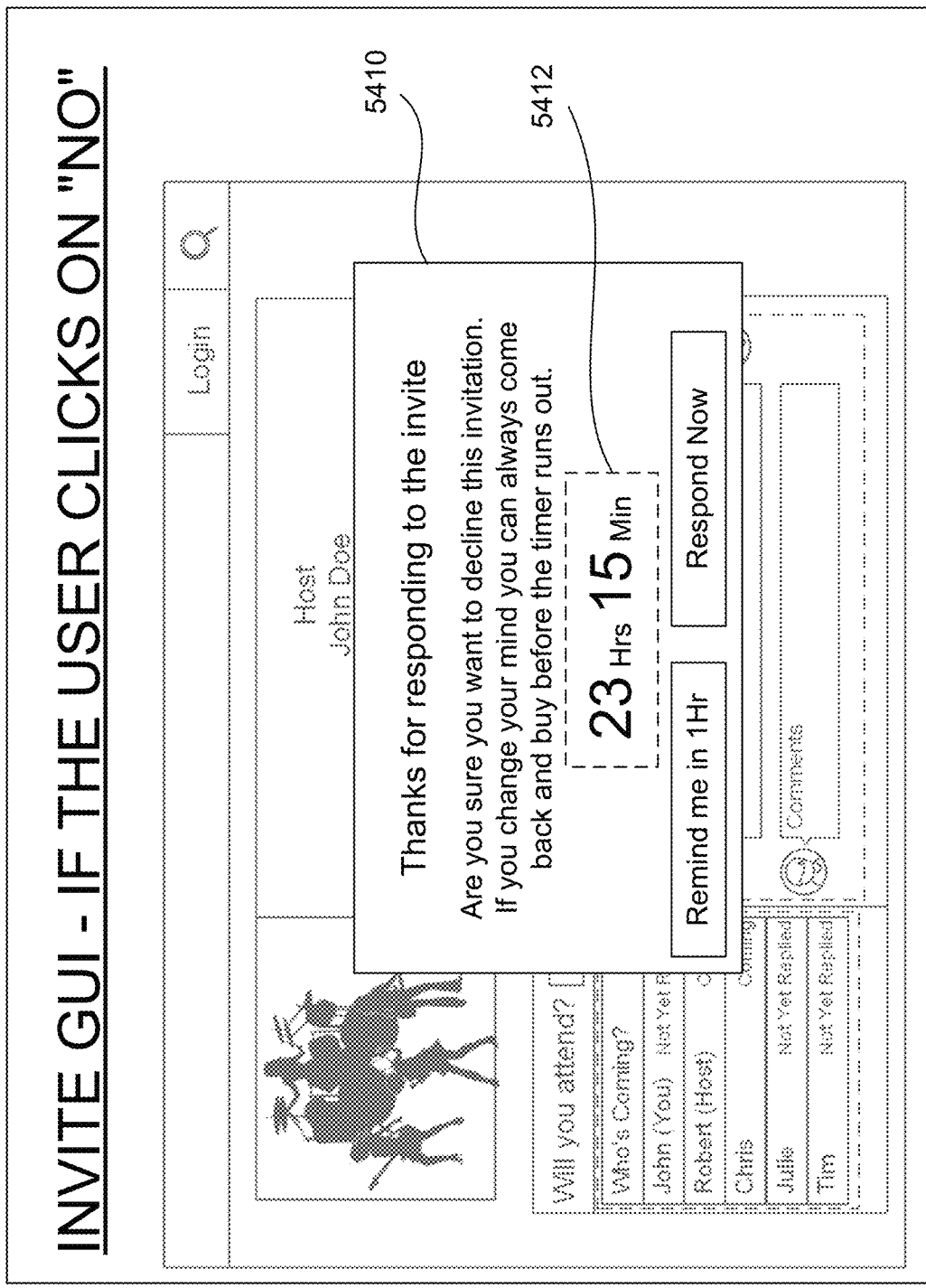

FIG. 54 illustrates an embodiment of the Reservation Group Event Page GUI 5401, in a specific scenario in which the Invitee has clicked "no" as their attendance status. Upon indicating "no", the Invitee may be automatically prompted 5410 (e.g., by the MAGNIFI System) to change their mind, go to the MAGNIFI home page, and/or view a time frame 5412 in which they may be able to change their mind and adjust their attendance status.

Figure 55:
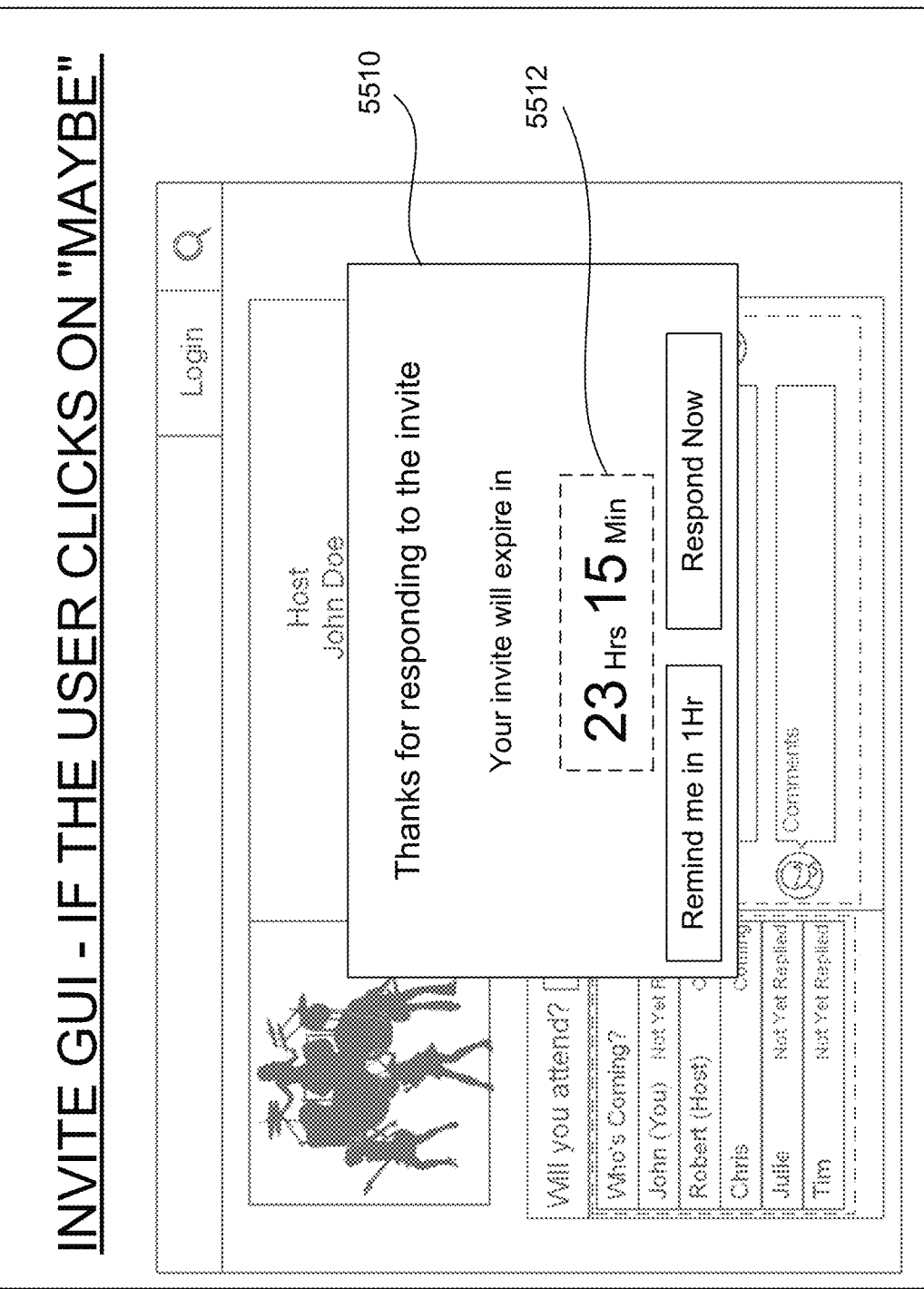

FIG. 55 illustrates an embodiment of the Reservation Group Event Page GUI 5501, in a specific scenario in which the Invitee has clicked "maybe" as their attendance status. Upon indicating "maybe", the Invitee may be automatically prompted 5510 (e.g., by the MAGNIFI System) to set a notification to be reminded to return to the event page and reset their attendance status, or change their attendance status at the moment of the prompt, as well as view a time frame 5512 in which they need to decide by.

Figure 56:
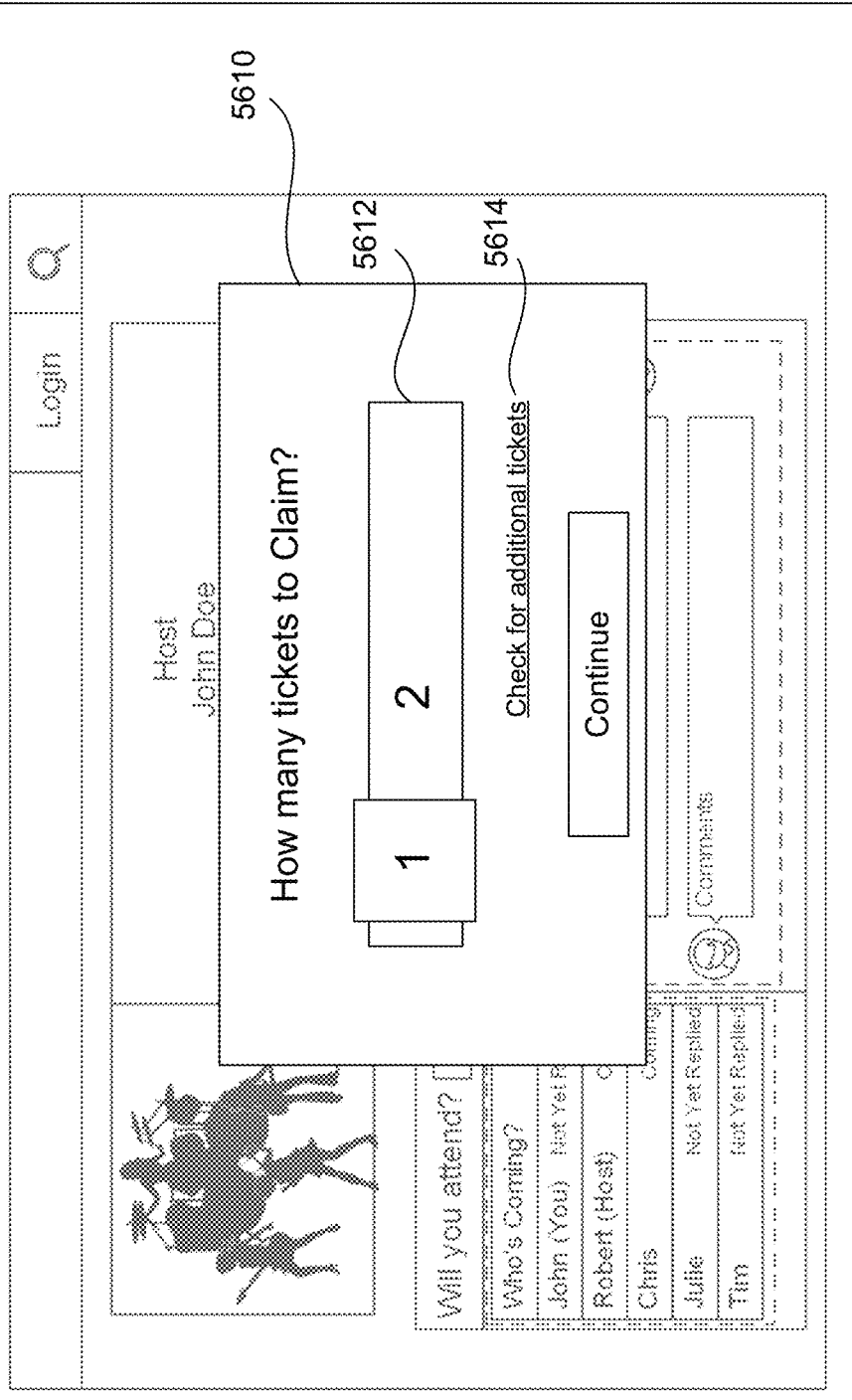

FIG. 56 illustrates an embodiment of the Reservation Group Event Page GUI 5601, in a specific scenario in which the Invitee has clicked "yes" as their attendance status. Upon indicating "yes", the Invitee may be automatically prompted 5610 (e.g., by the MAGNIFI System) to indicate the number of reserved tickets 5612 they wish to claim. They may also have the option of initiating an automated query to the Host regarding the option of adding additional tickets 5614 to the reservation to be made available to Invitees.

Figure 57:
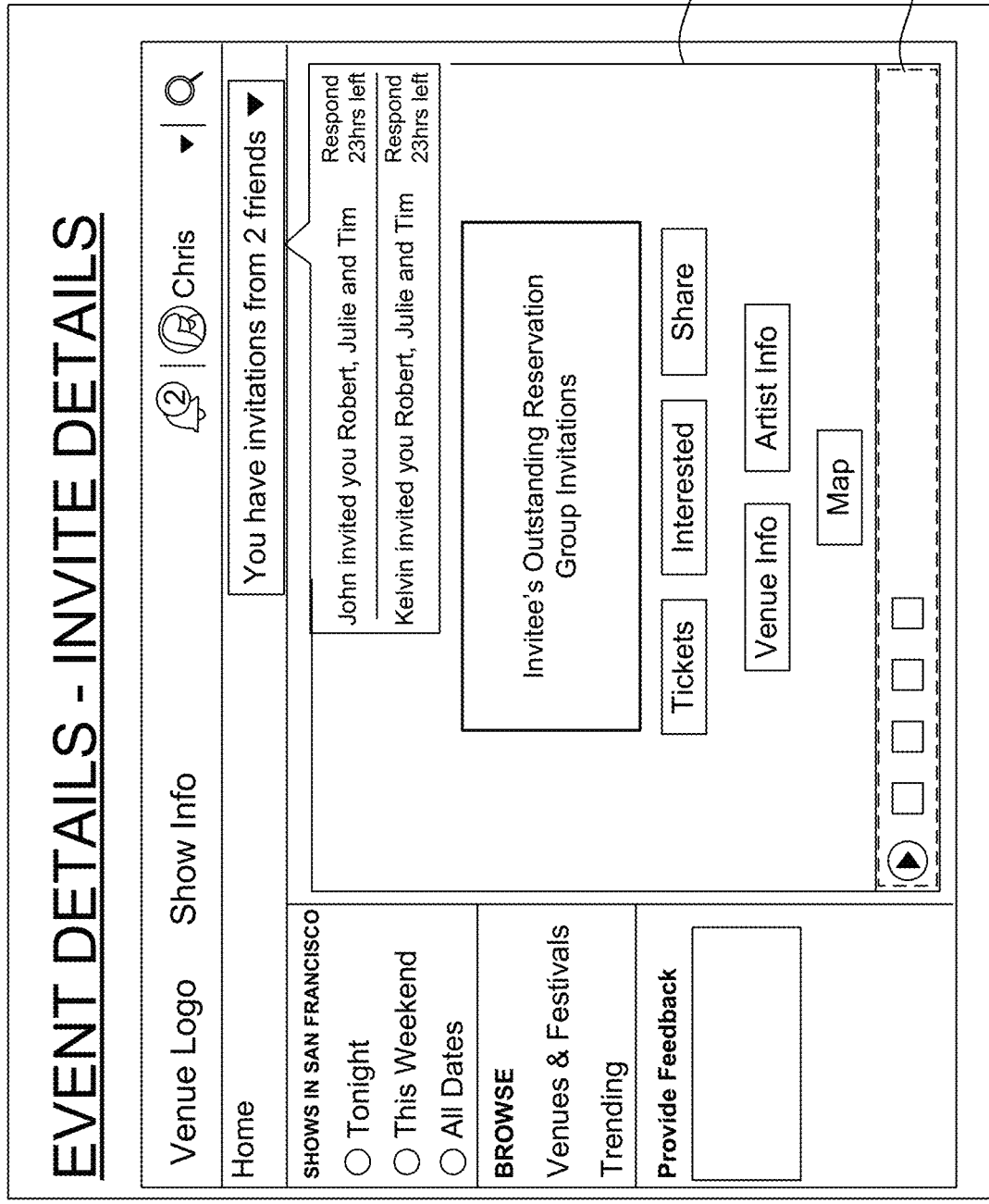

FIG. 57 illustrates one embodiment of an Invite Details GUI 5701, in a specific scenario in which an Invitee is logged in with their user account. In at least one embodiment, the Invite Details GUI may be configured or designed to display information relating to the Invitees outstanding Reservation Group invitations. In some embodiments, the Invitee may click a link to take them to the Reservation Group event page for each respective event, where they can indicate, view, and/or modify their attendance status.

Figure 58:
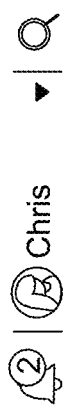

FIG. 58 illustrates one embodiment of a Reservation Group Event Page GUI 5801, where an Invitee may view event details, indicate, view, modify their attendance status, view other Invitees, view and participate in a comment thread regarding the Reservation Group and the upcoming event, and set notification preferences for Reservation Group and event updates.

Figure 59:
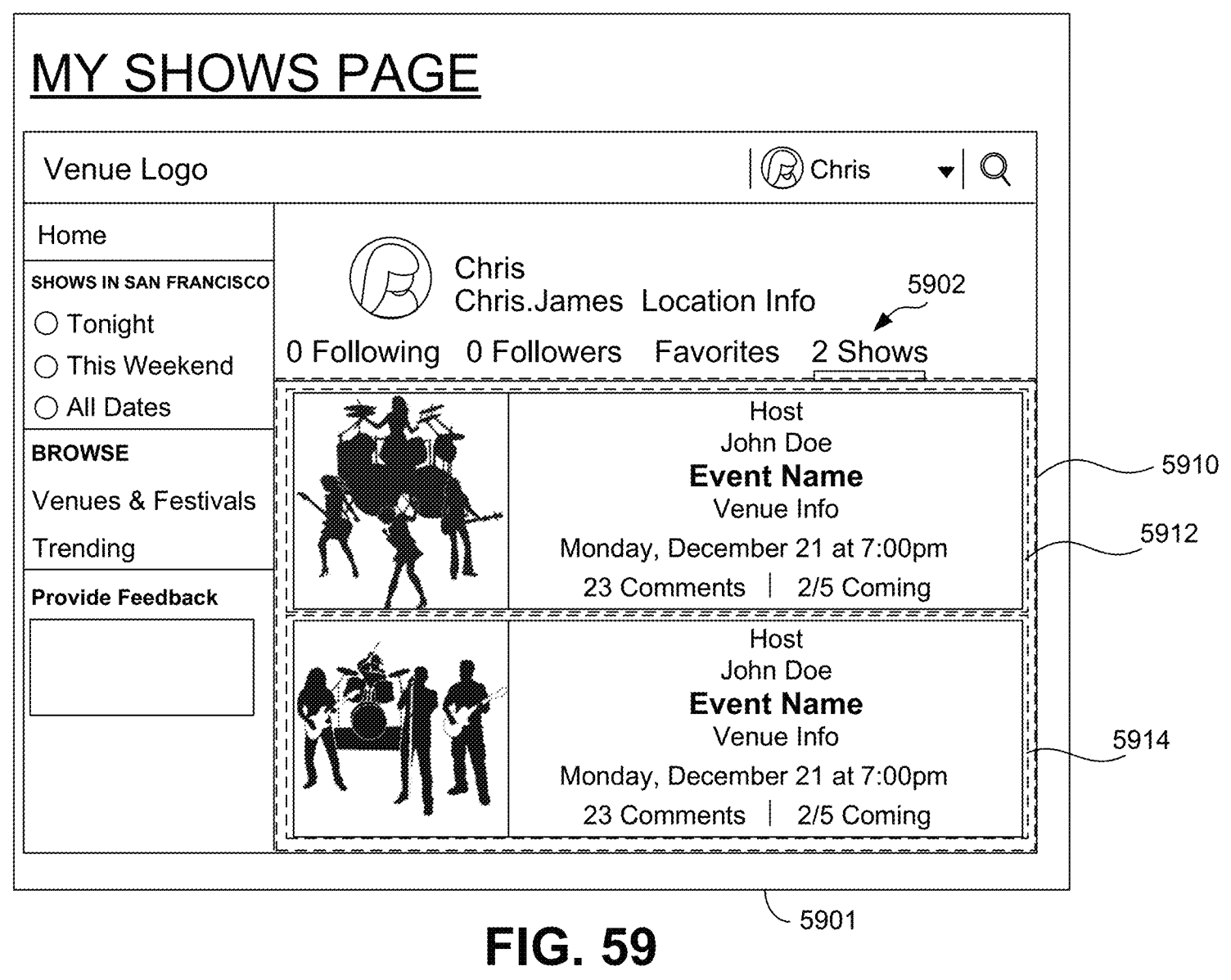

FIG. 59 illustrates one embodiment of a "My Shows" GUI 5901, which, for example, may be generated by the MAGNIFI System. In the specific example embodiment of FIG. 59, it is assumed that the "My Shows" GUI has been configured or designed to present information as viewed by a logged in MAGNIFI user who has accepted invitations to Reservation Groups.

Other Features/Benefits/Advantages

According to different embodiments, at least some of the conditional ticket reservation and purchasing functionality described herein may be configured, designed, and/or operable to provide, enable and/or facilitate one or more of the following features, functionalities, benefits and/or advantages (or combinations thereof):

- Functionality for enabling a user to initiate Group Ticket Reservations of tickets for one or more upcoming events at one or more venues.
- Functionality for enabling a user to generate and send Group Ticket Reservation invitations to one or more selected Invitees.
- Functionality for enabling a user to initiate conditional automated ticket purchasing of reserved tickets, wherein the condition(s) for triggering the automated ticket purchasing may be based (at least in part) on the actions (e.g., reserved ticket purchases) initiated or performed by one or more of the Group Ticket Reservation Invitees.
- Functionality for enabling a user to dynamically configure or define the set of condition(s) to be satisfied for triggering conditional automated ticket purchasing of reserved tickets.
- Functionality for enabling a user to dynamically define, input, and/or select one or more conditional ticket purchasing triggering parameters/criteria such as, for example, one or more of the following (or combinations thereof):
  - number of friends who must accept reserved ticket(s),
  - number of friends who must purchase reserved ticket(s),
  - specific friends who must accept reserved ticket(s),
  - specific friends who must purchase reserved ticket(s),
  - time frame for accepting reserved ticket(s),
  - time frame for purchasing reserved ticket(s),
  - tiered reserved ticket pricing based on time (e.g., price of purchasing reserved ticket is $5 if purchased w/in 24 hours, price of purchasing reserved ticket is $7 if purchased after 24 hours, price of purchasing reserved ticket is $10 if purchased on day of event, price of purchasing reserved ticket is $3 if purchased 5 minutes after start of event).
  - tiered reserved ticket pricing based on availability (e.g., two reserved tickets available for purchase for $5 each, three reserved tickets available for purchase for $7 each).
  - etc.
- Functionality for enabling a user to set up automated conditional or unconditional ticket purchases via use of a Ticketing GUI.
- "Bill Splitting" Functionality which, for example, may be configured or designed to enable, manage, track and facilitate the splitting or sharing of reserved ticket purchasing costs among one or more selected members of a Group Ticket Reservation (e.g., splitting reserved ticket purchasing costs among Host and/or Invitees). For example, in at least some embodiments, the system may be configured or designed to enable one or more Invitees of a Group Ticket Reservation to each purchase their own ticket(s) separately (e.g., using his/her personal payment funding sources), or to split the costs of the group ticket reservation/purchase transaction(s) among the members of their group. In other embodiments, the Host(s) may fund the payments for purchasing at least some of the reserved tickets, and the system may be configured or designed to include functionality for assisting the Host(s) (or other payment funding entities) in collecting reimbursement from members of the group.
- Functionality for enabling a user to initiate inviting friends or other identified Invitees to the Group Ticket Reservation.
- Functionality for enabling a user to dynamically configure whether or not to allow/permit one or more Invitees to invite other persons to the Group Ticket Reservation.
- Functionality for enabling a user to dynamically configure whether or not to allow/permit one or more Invitees of Invitees to purchase reserved tickets associated with the Group Ticket Reservation.
- Functionality for enabling a user to post or share online (e.g., at one or more online social media sites) details relating to the Group Ticket Reservation in a publicly accessible way so that anyone can join (e.g., Host posts the Group Ticket Reservation invite on Facebook and allows anyone who can view the invite to join the Group Reservation and purchase reserved tickets.)
- Functionality for enabling a user to configure or set parameter(s) for how many reserved tickets each Invitee can claim/purchase.
- Functionality for enabling a user to define one or more time window(s) for accepting a Group Ticket Reservation invitation.
- Functionality for enabling a user to define one or more time window(s) for purchasing one or more reserved ticket associated with a Group Ticket Reservation.
- Functionality for enabling a user to define one or more time window(s) for allowing selected Invitees to purchase one or more reserved tickets before opening up purchasing of the reserved tickets to other Invitees, groups, and/or general public.
- Functionality for enabling a user to create and save one or more Reservation Groups (e.g., enabling a user to create and save multiple different lists of Invitees, which the user can access and utilize for initiating subsequent Group Ticket Reservations).
- Functionality for enabling a user to receive promotions, rewards, deals and/or discounts based on fulfilled ticket reservation (e.g., 5 tix for price of 4; Host attends free; comp'd merchandise; comp'd food/drinks; reserved tickets for future events; reservation priority for future events; frequent flyer points earned for attending shows; etc.)

Functionality for enabling private and/or public communication threads associated with a given Group Ticket Reservation.

Functionality for enabling a user to initiate notifications to be sent out regarding ticket reservation status, Invitee status, event updates, etc.

Functionality for enabling the Ticket Reservation/Purchasing System to manage, track and allocate event-associated reserved tickets for group reservations and real-time inventory tracking.

Event Attendee Management functionality, which, for example, may be configured or designed to provide one or more of the following types of features (or combinations thereof):
 facilitating group and conditional reserved ticket purchases;
 tracking event attendance interest (RSVPs) across different groups of Invitees;
 manage communication and coordination between and among event;
 attendees, performers, event promoters, venues, and reserved ticket sellers;
 etc.

Presale Reservation functionality which, for example, may be configured or designed to provide one or more of the following types of features (or combinations thereof):
 create a reservation group before reserved tickets go on sale;
 create a reservation group before reserved tickets go on presale;
 automatically initiate a reserved ticket transaction at a point when reserved tickets go on sale to the general public for event; and/or
 automatically initiate a reserved ticket transaction at a point when reserved tickets go on sale to a limited number of people prior to the general public (e.g., essentially reserving a place in line for interested superfans).

Functionality for enabling a user or host to selectively choose when to fund the ticket purchase transaction, including, for example:
 Pay now.
 Conditional Pay—user or host defines a set of conditions which are required to be satisfied in order to trigger automated payment of ticket purchase transaction(s). (see, e.g., "Conditional Purchase Triggers" below).

Functionality for providing a user or host with different options for initiating and/or configuring Conditional Purchases of Host's reserved tickets and/or reserved group ticket(s). For example, according to different embodiments, the Ticket Reservation/Purchasing System may be configured or designed to provide functionality for enabling the user or Host to define one or more sets of conditional ticket purchasing triggers. Various examples of such conditional ticket purchasing triggers may include, but are not limited to, one or more of the following (or combinations thereof):
 Conditional Invitee Purchase Triggers such as, for example:
  Automatically purchase Host's reserved ticket(s) upon detecting that one or more specified invitee(s) has purchased at least one of the reserved group tickets.
  Automatically purchase Host's reserved ticket(s) upon detecting that at least one invitee has purchased at least one of the reserved group tickets.
  Automatically purchase Host's reserved ticket(s) upon detecting that a majority of invitees (or a specified minimum number of invitees) has purchased at least one of the reserved group tickets.
  Automatically purchase Friend's reserved ticket(s) upon detecting that one or more specified invitee(s) has purchased at least one of the reserved group tickets.
  Automatically purchase Friend's reserved ticket(s) upon detecting that at least one invitee has purchased at least one of the reserved group tickets.
  Automatically purchase Friend's reserved ticket(s) upon detecting that a majority of invitees (or a specified minimum number of invitees) has purchased at least one of the reserved group tickets.
  Etc.
 Conditional Invitee Interest Triggers such as, for example:
  Automatically purchase Host's reserved ticket(s) upon detecting that one or more specified invitee(s) have expressed interest in attending event and/or expressed interest in purchasing at least one reserved ticket.
  Automatically purchase Host's reserved ticket(s) upon detecting that at least one invitee has expressed interest in attending event and/or expressed interest in purchasing at least one reserved ticket.
  Automatically purchase Host's reserved ticket(s) upon detecting that a majority of invitees (or a specified minimum number of invitees) have expressed interest in attending event and/or expressed interest in purchasing at least one reserved ticket.
  Automatically purchase Friend's reserved ticket(s) upon detecting that one or more specified invitee(s) have expressed interest in attending event and/or expressed interest in purchasing at least one reserved ticket.
  Automatically purchase Friend's reserved ticket(s) upon detecting that at least one invitee has expressed interest in attending event and/or expressed interest in purchasing at least one reserved ticket.
  Automatically purchase Friend's reserved ticket(s) upon detecting that a majority of invitees (or a specified minimum number of invitees) have expressed interest in attending event and/or expressed interest in purchasing at least one reserved ticket.
  Etc.
 Conditional Time Based (Invitee Agnostic) Triggers such as, for example:
  Automatically purchase Host's reserved ticket(s) X Time before Reservation Window closes. In some embodiments, the conditional ticket purchase may be initiated automatically regardless of Invitee interest or purchase.

Automatically purchase Host's reserved ticket(s) Upon Reservation Cancellation (no Invitees purchased).

Automatically purchase Host's reserved ticket(s) X Time before Reservations (generally) end.

Automatically purchase Friend's reserved ticket(s) X Time before Reservation Window closes. In some embodiments, the conditional ticket purchase may be initiated automatically regardless of Invitee interest or purchase.

Automatically purchase Friend's reserved ticket(s) Upon Reservation Cancellation (no Invitees purchased).

Automatically purchase Friend's reserved ticket(s) X Time before Reservations (generally) end.

Etc.

Conditional Overall Inventory of reservable tickets drops below threshold value.

Automatically purchase Host's reserved ticket(s) upon detecting that Overall Inventory of reservable tickets drops below specified threshold value (e.g., X %)

Automatically purchase Friend's reserved ticket(s) upon detecting that Overall Inventory of reservable tickets drops below specified threshold value (e.g., X %)

Etc.

Conditional Price Triggers for Host (+Invitees)

In at least one embodiment, Ticket Reservation/Purchasing System may automatically and/or dynamically adjust individual ticket price(s) may change based on "rewards" factors, such as, for example Ex A: if all invitees in group purchase tickets:
Discount applied across all tickets
Discount applied to Host ticket
Fees waived for each ticket
Fees waived for Host ticket Implementation options:
Delay CC Transaction until Final Ticket Price is locked in
Partial Refund to reflect Reduced Price Ticket or "Fee-Free" Ticket Functionality for providing a user or host with different options for making and/or initiating one or more ticket reservations, including, for example:

Reserve tickets for one or more friends. User may input number of tickets to be reserved.

Don't reserve tickets for friends (e.g., Number of tickets to be reserved=0)
Single purchaser option
No reservations/no invitees/pay now Combine the standard single purchaser option with the option to reserve a block of tickets and invite friends. In at least some embodiments, such functionality may be implemented within a unified or common flow (e.g., as opposed to being two separate flows/processes).

Functionality for providing a user or host with different options for selectively assigning one or more purchased tickets and/or reserved tickets, including, for example:

Assign # of tickets to specific invites. For example:
Friend A gets 2 of the ticket reservations
Friend B gets 1 of the ticket reservations Display # of reserved tickets remaining as user assigns; Assign specific seat numbers to specific invites
e.g., Host choses who sits next to whom First Come, First Served
E.g., X tickets reserved=>invitees come and claim or purchase as many as they want (subject to ticket cap parameters).

Functionality for providing a user or host with different options for modifying or expanding Ticket Reservations, including, for example:

Host can add tickets and/or invitees to the group ticket reservation after initially created.

Invitees can request Host to add tickets and/or invitees to a group ticket reservation.

Functionality for providing a user or host with access to "Promoter" Reservation(s) features.

In at least one embodiment, Promoter Reservation(s) may correspond to reservations created by someone involved in hosting, performing and/or promoting a given event.

Example: The Ticket Reservation/Purchasing System may be configured or designed to provide functionality for enabling an Artist to allocate and/or provide Promoter Reservations access to valued members of the Artist's fan club.

Host Tickets may be set to "0" (e.g., Host may not be required to purchase a ticket)

Host doesn't have to reserve or buy a ticket for themselves—but they can invite other people to the reservation.

Promoter Reservation functionality may be accessible via Admin Dashboard for venue, artist, etc.

Various promotions may be added to (and/or removed from) a Promoter Reservation such as, for example, VIP tickets, backstage passes, meet & greet, drink tickets, advanced ticket purchase, discounted ticket price, etc.

Auto-Adjust Time Window Functionality

Automatically and dynamically decrease reservation time window (e.g., time window to purchase reserved ticket(s)) as regular tickets sell out.

Automatically and dynamically increase reservation time window as more invitees added to reservation.

Automatically and dynamically increase reservation time window or reset clock as people accept & buy tickets.

Automatically and dynamically increase reservation time window if Host or Invitee shares the Reservation or Show Info on social networks (e.g., if they promote the show publicly).

Availability Clock Functionality

If someone arrives to Host a reservation and all reservable tickets are on 'hold' in reservations—the system may display a counter for when the next bucket of reservable tickets will open up (e.g., when the next reservation is due to expire).

Flow Initiation Buttons (e.g., deployed/displayed on Event Websites/webpages/end user GUIs, etc.)

Automatically and dynamically insert "Buy" button next to "Reserve+Invite" button.

Automatically and dynamically insert "Buy" button only=>clicking it opens a modal that gives user 2 options: Just Me Going (individual purchaser flow) vs. Go with Friends (reserve+invite flow)

Automatically and dynamically insert "Tickets" button, which, when selected by user, opens flow that incorporates both individual purchase option s and group ticket reservation functionality, such as, for example:
Select Tickets for Host.
Reserve Tickets for Friends (can be "0").
Host chooses "pay now" or "pay when"=>If "pay when"—Provide list of conditional purchase triggers.)

Host enters CC info=>if "pay now" selected, Host transaction processed and completed at that time.

Host invites friends (e.g., 1st come vs. Assigned tickets)

Rewards Features and Functionality

Tiered Reward Functionality

Tiered Reward may be automatically Targeted to Group Size

Promoter (e.g., venue, artist, ticketing company, Magnifi) may create tiered rewards based on Group Size The larger the potential group, the more valuable the reward bestowed if all or some % of the invitees purchase tickets.

Multiple rewards may be available. In some embodiments, one or more rewards may be "unlocked" as more invitees purchase tickets.

When Host creates reservation:

System may list out all possible rewards/offers for each group size. In some embodiments, the Host may select/configure aspects relating to one or more rewards.

In some embodiments, system may automatically detect how large group is based on number of tickets reserved by Host, and then System tells Host which rewards/offers are available for group of that size (and what might be available if Host increases Group size)

System presents Rewards info to Host and to Invitees

System monitors purchase status of invitees

When enough invitees have converted to attendees in the group—notificationsre: reward/offer automatically generated sent to Host and/or invitees.

Examples of different Rewards/Offers may include, but are not limited to, one or more of the following (or combinations thereof):

Ticket Discounts
  Reduced price for Host Ticket(s)
  Reduced price for each Group Ticket
Ticket Fees Waived
  Convenience fees waived for Host Ticket(s)
  Convenience fees waived for each Group Ticket
Redeemable Points
  Merch
  Drinks
  Experiences
Discounts on Sponsor/Affiliate goods/services
Contests & Sweepstakes
Exclusive Experiences Influencer Database Functionality Example Embodiment A: Attendee Profiles When an Attendee (e.g., Host or Invitee) purchases tickets through Ticket Reservation/Purchasing System, information about the attendee is collected:

Full Name
Username
Email Address
Age
Sex
CC Billing ZIP Code
Number of Tickets purchased
Group Member Status (Host vs. Invitee)
Info collected from Facebook if Facebook login Over time—as attendee attends more events, a more full "Event Profile" for this Attendee is created, including:

Event history (each show they attended)
Event "taste" profile (avg. venue size, artist genre, show-going days of the week, etc.)
Average number of tickets moved
Average size of group they attend shows with
Whether they are typically the Host or the Invitee Based on specified criteria (such as, for example, event history, tickets moved, etc.), system automatically and/or dynamically calculates and assigns identified Attendee with an "Influencer Score" which may generally indicate how effective a promoter the Attendee is Persons with relatively higher Influencer Scores may receive more and/or better rewards Example Embodiment B: Group Profiles In addition to tracking individual attendee data—the Ticket Reservation/Purchasing System may also maintain a database which tracks group or "herd" data, such as:

The attendee groups that most often go out together
The types of shows they go to
The days of the week they go out
How much they typically spend on tickets With attendee opt-in, this information could be made available to 3rd parties outside the artist-venue-ticketing company-promoter sphere. Examples of such $3^{rd}$ parties may include: restaurants, bars, Uber/Lyft, merchandise vendors, etc.

These Third parties could make offers or bid on the business of this group before or after an upcoming show Example Embodiment C: Venue Centric Venue creates account at Ticket Reservation/Purchasing System (e.g., MAGNIFI account)

Venue creates Reservation Allotment of tickets for Show A with Artist

Host creates reservation for n others for Show A with Artist (e.g., n=7)

All 7 Invitees accept and purchase tickets

Host is responsible for 8 tickets for Show A with Artist at Venue

This info is logged in Ticket Reservation/Purchasing System Database

Subsequently, Venue creates Reservation Allotment of tickets for Show B with Artist Venue accesses Ticket Reservation/Purchasing System Influencer Database—searches for:

All Host Patrons: patrons of Venue who have hosted reservations at Venue previously
All Invitee Patrons: patrons of Venue who have attended events as invitees of a reservation
Patrons who attended Artist Shows previously
Patrons who have previously attended Shows by artists similar to Artist (e.g., Based on Artist Affinity Data created by cross-referencing fans who go see Artist A and who also go see Artist B).

Venues can rank the results based on criteria such as age, location, number of groups hosted, average number of tickets moved System can assign "scores" to Patrons based on their Event History Scores can be overall—ie, most tickets sold, most friends invited, etc.

Scores can be criteria-based—ie, who are the best male fans of a heavy metal band that's playing this Thursday night Venue contacts these Patrons about hosting reservation groups for Show B with Artist—and presents/offers rewards to these Patrons as incentives.

In some embodiments, Venue may partner with Artist to reach out to specifically selected Venue Patrons and/or Artist Fans about hosting reservation groups, and may present/offer rewards to these Patrons/Fans as incentives Example Embodiment D: Artist Centric Artist creates Ticket Reservation/Purchasing System account (e.g., MAGNIFI account)

Artist creates Reservation Allotment of tickets for Show at Venue A

Host creates reservation for n others for Show A in City A (e.g., n=7)

All 7 Invitees accept and purchase tickets

Host is responsible for 8 tickets for Show A with Artist in City A

This info is logged in Database

Subsequently, Artist creates Reservation Allotment of tickets for Show B in City A (or City B)

Artist accesses Ticket Reservation/Purchasing System Influencer Database—searches for:
All Host Fans in City A (or B): fans who have hosted reservations previously in City A (or B)
All Invitee Fans: fans who have attended Artist events as invitees of a reservation in City A (or B)

Artist can rank the results based on criteria such as age, location, number of groups hosted, average number of tickets moved System can automatically and/or dynamically generates and assigns respective "Influencer Scores" to Fans based on their Event History
Calculation of Influencer Scores may be configured to be based on selected criteria such as, for example, one or more of the following (or combinations thereof):
aggregate/accumulated data such as, for example, most tickets sold, most friends invited, etc.
filtered criteria/data such as, for example, who are the best male fans in City A, which fans w/in the age range of 18-35 move the most tickets in City B, etc.

In some embodiments, Artist contacts these Fans about hosting reservation groups for Show B with Artist—and may present/offer rewards to these Fans as incentives In some embodiments, Artist partners with Venue/Promoter to reach out to Artist Fans+Venue Patrons about hosting reservation groups and may present/offer rewards to these Patrons/Fans as incentives Example Embodiment E: Event Attendee Data Clearinghouse Parties can access and data on show attendees from other parties, but only if they share their own data with others in the system. Accessable data may be anonymized to protect user privacy.

In at least one embodiment, Parties may include one or more of the following (or combinations thereof): artists, venues, promoters, ticketing companies, etc.

Accessible data may include, but are not limited to, one or more of the following (or combinations thereof):
Anonymized data such as, for example:
Demographic distribution (age, sex, zip codes)
Group information (avg. group size, avg tickets per group)
Etc.
Personal Data (for attendees who have opted in to being contacted by 3rd party artists, venues, sponsors), such as, for example:
User Name
Email Address
Zip Code
Age
Sex
Phone number
Event history
Event "taste" profile (venue size, artist genre, day of the week, etc.)
Average number of tickets moved
Etc.

Using this Data Clearing House—Venues could get a sense for the fanbase of an Artist who will be playing at their Venue, and promote the show accordingly Using this Data Clearing House—Artists may tap into potential fans who have opted-in to being contacted and who reside in the cities where the artist is touring Using this Data Clearing House—Venue could contact fans of Artist before Artist comes to town, even if Artist played at a different venue last time they were in city Although several example embodiments of one or more aspects and/or features have been described in detail herein with reference to the accompanying drawings, it is to be understood that aspects and/or features are not limited to these precise embodiments, and that various changes and modifications may be effected therein by one skilled in the art without departing from the scope of spirit of the invention(s) as defined, for example, in the appended claims.

It is claimed:

1. A computer implemented method for facilitating automated conditional purchasing of event tickets via a computer network, the method comprising causing at least one processor to execute a plurality of instructions to:
identify a first upcoming event which is scheduled to occur at a first venue;
generate a first set of instructions to cause a Ticketing graphical user interface ("Ticketing GUI") for display at an end user's device, wherein the first set of instructions include instructions to configure the Ticketing GUI to enable a first end user to initiate a ticket reservation invitation transaction for inviting at least one identified invitee to accept at least one reserved ticket for the first upcoming event;
notify the at least one identified invitee of the ticket reservation invitation transaction;
monitor the ticket reservation invitation transaction;
cause, in response to detecting a first condition or event, at least one component of the computer network to fund at least one reserved ticket purchase transaction relating to a purchase of at least one reserved ticket for the first upcoming event;

wherein the ticket purchase transaction corresponds to at least one transaction selected from a group consisting of:
a ticket purchase transaction relating to purchase of a ticket for the end user; and
a ticket purchase transaction relating to purchase of a ticket for at least one invitee; and
wherein the first condition or event corresponds a condition or event selected from a group consisting of:
detecting that a specific invitee has expressed interest in attending the first upcoming event;
detecting that a specific invitee has expressed interest in purchasing at least one of the reserved tickets;
detecting at least one invitee has expressed interest in purchasing at least one of the reserved tickets;
detecting that at least one invitee has expressed interest in attending the first upcoming event;
detecting that a specific invitee has purchased ticket for the first upcoming event; and
detecting that at least one invitee has purchased ticket for the first upcoming event.

2. The computer implemented method of claim 1 further comprising causing the at least one processor to execute additional instructions to:
enable the first end user to reserve, via use of the Ticketing GUI, a first set of reserved tickets for the first upcoming event; and
wherein the at least one purchased ticket corresponds to at least one reserved ticket from the first set of reserved tickets.

3. The computer implemented method of claim 1 wherein the funding of the at least one reserved ticket purchase transaction includes automatically fund, using a funding source provided by the first end user, a first reserved ticket purchase transaction relating to a purchase of a first reserved ticket for the first end user for the first upcoming event.

4. The computer implemented method of claim 1 further comprising causing the at least one processor to execute additional instructions to:
enable the first end user to reserve, via use of the Ticketing GUI, a first set of reserved tickets for the first upcoming event;
wherein the funding of the at least one reserved ticket purchase transaction includes automatically fund, using a funding source provided by the first end user, a first reserved ticket purchase transaction relating to a purchase of a first reserved ticket of the first set of reserved tickets for the first end user; and
cause the at least one processor to execute additional instructions to automatically fund, using a funding source provided by a first invitee, a second reserved ticket purchase transaction relating to a purchase of a second reserved ticket of the first set of reserved tickets for the first invitee.

5. The computer implemented method of claim 1 wherein the funding of the at least one reserved ticket purchase transaction includes:
automatically fund a first reserved ticket purchase transaction relating to a purchase of a first reserved ticket for the first end user; and
automatically fund a second reserved ticket purchase transaction relating to a purchase of a second reserved ticket for the at least one identified invitee.

6. The computer implemented method of claim 1 wherein the funding of the at least one reserved ticket purchase transaction includes automatically fund a plurality of ticket purchase transactions for the first upcoming event relating to purchase of tickets for the first end user and for the at least one identified invitee.

7. The computer implemented method of claim 1 further comprising causing the at least one processor to execute additional instructions to:
cause the at least one reserved ticket associated with the ticket reservation invitation transaction to automatically expire in response to determining that a first amount of time has elapsed without detecting confirmation of the at least one identified invitee's acceptance of the at least one reserved ticket.

8. The computer implemented method of claim 1 further comprising causing the at least one processor to execute additional instructions to:
receive a first set of user input instructions, the first set of user input instructions being generated from the end user's device in response to user interaction with the Ticketing GUI, the first set of user input instructions including a request to access ticketing information relating to the first upcoming event; and
generate, in response to the first set of user input instructions, a third set of instructions to cause a Ticketing graphical user interface ("Ticketing GUI") to be displayed at an end user's device, wherein the third set of instructions include instructions to configure the Ticketing GUI to enable an end user to:
initiate a ticket reservation transaction relating to a reservation of a first set of reserved tickets for the first upcoming event;
initiate a ticket purchase transaction relating to a purchase of a second set of reserved tickets for the first upcoming event;
initiate a ticket reservation invitation transaction for inviting at least one identified invitee to accept at least one reserved ticket for the first upcoming event;
access updated ticket reservation status information relating to one or more of the end user's ticket reservations; and
access updated ticket reservation invitation status information relating to one or more of the end user's ticket reservation invitations.

9. The computer implemented method of claim 1 further comprising causing the at least one processor to execute additional instructions to:
receive a first set of user input instructions, the first set of user input instructions being generated from the end user's device in response to a first user's interaction with the Ticketing GUI, the first set of user input instructions including instructions to initiate a ticket reservation transaction relating to a reservation of a first set of reserved tickets for the first upcoming event;
initiate, in response to the first set of user input instructions, a first reserved ticket reservation transaction relating to a reservation of a first reserved ticket for the first upcoming event;
associate the reserved first reserved ticket with a first identifier representing the first user;
initiate, in response to the first set of user input instructions, a second reserved ticket reservation transaction relating to a reservation of a second reserved ticket for the first upcoming event;
determine, using input provided by the first user, a second identifier for identifying a specific person who is to be associated with the reserved second reserved ticket; and
associate the reserved second reserved ticket with the second identifier.

10. The computer implemented method of claim 1 further comprising causing the at least one processor to execute additional instructions to:
   automatically track ticket reservation invitation responses from the at least one identified invitee; and
   generate a third set of instructions to cause a Ticketing graphical user interface ("Ticketing GUI") to be displayed at an end user's device, wherein the third set of instructions include instructions to configure the Ticketing GUI to enable an end user to access updated ticket reservation status information relating to one or more of the end user's ticket reservations, and to access updated ticket reservation invitation status information relating to one or more of the end user's ticket reservation invitations, wherein the ticket reservation invitation status information includes information identifying which ticket reservation invitations have been accepted, which ticket reservation invitations have not yet been accepted, and/or which ticket reservation invitations have been declined.

11. A computer implemented system for facilitating automated conditional purchasing of event tickets via a computer network, the system comprising:
   at least one processor;
   at least one interface;
   a memory storing a plurality of instructions;
   the at least one processor being operable to execute the plurality of instructions stored in the memory, and being operable to operate with the memory and the at least one interface for:
   identify a first upcoming event which is scheduled to occur at a first venue;
   generate a first set of instructions to cause a Ticketing graphical user interface ("Ticketing GUI") to be displayed at an end user's device, wherein the first set of instructions include instructions to configure the Ticketing GUI to enable a first end user to initiate a ticket reservation invitation transaction for inviting at least one identified invitee to accept at least one reserved ticket for the first upcoming event;
   notify the at least one identified invitee of the ticket reservation invitation transaction;
   monitor the ticket reservation invitation transaction;
   automatically causing, in response to detecting a first condition or event, at least one component of the computer network to fund at least one reserved ticket purchase transaction relating to a purchase of at least one reserved ticket for the first upcoming event;
   wherein the ticket purchase transaction corresponds to at least one transaction selected from a group consisting of:
   a ticket purchase transaction relating to purchase of a ticket for the end user; and
   a ticket purchase transaction relating to purchase of a ticket for at least one invitee; and
   wherein the first condition or event corresponds a condition or event selected from a group consisting of:
   detecting that a specific invitee has expressed interest in attending the first upcoming event;
   detecting that a specific invitee has expressed interest in purchasing at least one of the reserved tickets;
   detecting at least one invitee has expressed interest in purchasing at least one of the reserved tickets;
   detecting that at least one invitee has expressed interest in attending the first upcoming event;
   detecting that a specific invitee has purchased ticket for the first upcoming event; and
   detecting that at least one invitee has purchased ticket for the first upcoming event.

12. The computer implemented system of claim 11 being further operable to cause the at least one processor to execute additional instructions to:
   enable the first end user to reserve, via use of the Ticketing GUI, a first set of reserved tickets for the first upcoming event; and
   wherein the at least one purchased ticket corresponds to at least one reserved ticket from the first set of reserved tickets.

13. The computer implemented system of claim 11 wherein the funding of the at least one reserved ticket purchase transaction includes automatically fund, using a funding source provided by the first end user, a first reserved ticket purchase transaction relating to a purchase of a first reserved ticket for the first end user for the first upcoming event.

14. The computer implemented system of claim 11 being further operable to cause the at least one processor to execute additional instructions to:
   enable the first end user to reserve, via use of the Ticketing GUI, a first set of reserved tickets for the first upcoming event;
   wherein the funding of the at least one reserved ticket purchase transaction includes automatically fund, using a funding source provided by the first end user, a first reserved ticket purchase transaction relating to a purchase of a first reserved ticket of the first set of reserved tickets for the first end user; and
   cause the at least one processor to execute additional instructions to automatically fund, using a funding source provided by a first invitee, a second reserved ticket purchase transaction relating to a purchase of a second reserved ticket of the first set of reserved tickets for the first invitee.

15. The computer implemented system of claim 11 wherein the funding of the at least one reserved ticket purchase transaction includes automatically fund a plurality of ticket purchase transactions for the first upcoming event relating to purchase of tickets for the first end user and for the at least one identified invitee.

16. The computer implemented system of claim 11 being further operable to cause the at least one processor to execute additional instructions to:
   cause the at least one reserved ticket associated with the ticket reservation invitation transaction to automatically expire in response to determining that a first amount of time has elapsed without detecting confirmation of the at least one identified invitee's acceptance of the at least one reserved ticket.

17. The computer implemented system of claim 11 being further operable to cause the at least one processor to execute additional instructions to:
   receive a first set of user input instructions, the first set of user input instructions being generated from the end user's device in response to user interaction with the Ticketing GUI, the first set of user input instructions including a request to access ticketing information relating to the first upcoming event; and
   generate, in response to the first set of user input instructions, a third set of instructions to cause a Ticketing graphical user interface ("Ticketing GUI") to be displayed at an end user's device, wherein the third set of instructions include instructions to configure the Ticketing GUI to enable an end user to:

initiate a ticket reservation transaction relating to a reservation of a first set of reserved tickets for the first upcoming event;

initiate a ticket purchase transaction relating to a purchase of a second set of reserved tickets for the first upcoming event;

initiate a ticket reservation invitation transaction for inviting at least one identified invitee to accept at least one reserved ticket for the first upcoming event;

access updated ticket reservation status information relating to one or more of the end user's ticket reservations; and access updated ticket reservation invitation status information relating to one or more of the end user's ticket reservation invitations.

18. The computer implemented system of claim 11 being further operable to cause the at least one processor to execute additional instructions to:

receive a first set of user input instructions, the first set of user input instructions being generated from the end user's device in response to a first user's interaction with the Ticketing GUI, the first set of user input instructions including instructions to initiate a ticket reservation transaction relating to a reservation of a first set of reserved tickets for the first upcoming event;

initiate, in response to the first set of user input instructions, a first reserved ticket reservation transaction relating to a reservation of a first reserved ticket for the first upcoming event;

associate the reserved first reserved ticket with a first identifier representing the first user;

initiate, in response to the first set of user input instructions, a second reserved ticket reservation transaction relating to a reservation of a second reserved ticket for the first upcoming event;

determine, using input provided by the first user, a second identifier for identifying a specific person who is to be associated with the reserved second reserved ticket; and associate the reserved second reserved ticket with the second identifier.

19. The computer implemented system of claim 11 being further operable to cause the at least one processor to execute additional instructions to:

automatically track ticket reservation invitation responses from the at least one identified invitee; and generate a third set of instructions to cause a Ticketing graphical user interface ("Ticketing GUI") to be displayed at an end user's device, wherein the third set of instructions include instructions to configure the Ticketing GUI to enable an end user to access updated ticket reservation status information relating to one or more of the end user's ticket reservations, and to access updated ticket reservation invitation status information relating to one or more of the end user's ticket reservation invitations, wherein the ticket reservation invitation status information includes information identifying which ticket reservation invitations have been accepted, which ticket reservation invitations have not yet been accepted, and/or which ticket reservation invitations have been declined.

* * * * *